United States Patent
Ito et al.

(10) Patent No.: US 10,851,012 B2
(45) Date of Patent: *Dec. 1, 2020

(54) GLASS PLATE PRODUCTION METHOD, GLASS PLATE, GLASS ARTICLE PRODUCTION METHOD, GLASS ARTICLE, AND GLASS ARTICLE PRODUCTION APPARATUS

(71) Applicant: AGC Inc., Chiyoda-ku (JP)

(72) Inventors: Jun Ito, Chiyoda-ku (JP); Ikuo Nagasawa, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/909,291

(22) Filed: Mar. 1, 2018

(65) Prior Publication Data

US 2018/0186677 A1    Jul. 5, 2018

Related U.S. Application Data

(63) Continuation of application No. PCT/JP2016/075415, filed on Aug. 31, 2016.

(30) Foreign Application Priority Data

Sep. 4, 2015 (JP) ................................. 2015-175177
Dec. 8, 2015 (JP) ................................. 2015-239733
(Continued)

(51) Int. Cl.
*C03B 33/09* (2006.01)
*B23K 26/352* (2014.01)
(Continued)

(52) U.S. Cl.
CPC ........ *C03B 33/091* (2013.01); *B23K 26/0006* (2013.01); *B23K 26/355* (2018.08);
(Continued)

(58) Field of Classification Search
None
See application file for complete search history.

(56) References Cited

U.S. PATENT DOCUMENTS

2004/0144231 A1    7/2004  Hanada
2006/0246302 A1    11/2006  Brady et al.
(Continued)

FOREIGN PATENT DOCUMENTS

JP    2004-217492 A    8/2004
JP    2009-539743 A    11/2009
(Continued)

OTHER PUBLICATIONS

International Search Report dated Oct. 11, 2016 in PCT/JP2016/075415 filed Aug. 31, 2016 (with English Translation).
(Continued)

*Primary Examiner* — Lisa L Herring
(74) *Attorney, Agent, or Firm* — Oblon, McClelland, Maier & Neustadt, L.L.P.

(57) ABSTRACT

A glass plate production method includes (1) preparing a glass material having a first main surface and a second main surface opposite to each other; (2) irradiating the first main surface of the glass material with a laser to form an in-plane void region having a plurality of voids arranged on the first main surface, and forming a plurality of internal void rows each having one void or two or more voids arranged from the in-plane void region toward the second main surface of the glass material; and (3) chemically strengthening the glass material having the internal void rows formed therein.

8 Claims, 25 Drawing Sheets

(30) Foreign Application Priority Data

| Dec. 8, 2015 | (JP) | 2015-239735 |
|---|---|---|
| Jan. 14, 2016 | (JP) | 2016-005616 |
| Aug. 8, 2016 | (JP) | 2016-156012 |
| Aug. 8, 2016 | (JP) | 2016-156013 |

(51) Int. Cl.
| *C03B 33/033* | (2006.01) |
| *B23K 26/53* | (2014.01) |
| *C03B 33/02* | (2006.01) |
| *B23K 26/55* | (2014.01) |
| *B23K 26/00* | (2014.01) |
| *C03C 21/00* | (2006.01) |
| *C03C 23/00* | (2006.01) |
| *C03B 33/04* | (2006.01) |
| *B23K 103/00* | (2006.01) |
| *B28D 1/22* | (2006.01) |

(52) U.S. Cl.
CPC ............ *B23K 26/53* (2015.10); *B23K 26/55* (2015.10); *B28D 1/22* (2013.01); *C03B 33/0222* (2013.01); *C03B 33/033* (2013.01); *C03C 21/002* (2013.01); *C03C 23/0025* (2013.01); *B23K 2103/54* (2018.08); *C03B 33/04* (2013.01); *Y02P 40/57* (2015.11)

(56) References Cited

U.S. PATENT DOCUMENTS

| 2012/0047957 | A1 | 3/2012 | Dannoux et al. |
| 2012/0135847 | A1 | 5/2012 | Fukasawa et al. |
| 2012/0196071 | A1* | 8/2012 | Cornejo ............... B28D 1/00 428/43 |
| 2013/0068505 | A1 | 3/2013 | Hong et al. |
| 2013/0126573 | A1 | 5/2013 | Hosseini et al. |
| 2014/0083983 | A1 | 3/2014 | Zhang et al. |
| 2014/0147624 | A1 | 5/2014 | Streltsov et al. |
| 2014/0151370 | A1 | 6/2014 | Chang et al. |
| 2015/0166393 | A1 | 6/2015 | Marjanovic et al. |
| 2015/0235869 | A1 | 8/2015 | Uehara |
| 2016/0009586 | A1* | 1/2016 | Bookbinder ............ C03B 33/06 65/112 |
| 2016/0060156 | A1* | 3/2016 | Krueger ............... B23K 26/064 65/31 |
| 2016/0200621 | A1* | 7/2016 | N'Gom ................. B23K 26/38 428/192 |
| 2016/0318796 | A1 | 11/2016 | Masuda |
| 2017/0174565 | A1* | 6/2017 | Kase ..................... C03C 3/085 |
| 2017/0197868 | A1* | 7/2017 | Gupta .................... B23K 26/53 |
| 2018/0186677 | A1 | 7/2018 | Ito et al. |

FOREIGN PATENT DOCUMENTS

| JP | 2012-526721 A | 11/2012 |
| JP | 2013-536081 | 9/2013 |
| JP | 2014-065624 | 4/2014 |
| JP | 2014-531391 A | 11/2014 |
| JP | 2015-156427 | 8/2015 |
| JP | 2016-506351 A | 3/2016 |
| TW | 201433554 A | 9/2014 |
| WO | WO 2009/084398 A1 | 7/2009 |
| WO | WO 2011/002089 A1 | 1/2011 |
| WO | WO 2011/037167 A1 | 3/2011 |
| WO | WO 2014/161535 A2 | 10/2014 |
| WO | WO 2015/079849 A1 | 6/2015 |
| WO | WO 2015/080043 A1 | 6/2015 |
| WO | WO 2015/113024 A1 | 7/2015 |
| WO | WO 2015/113026 A2 | 7/2015 |
| WO | WO 2017/038853 A1 | 3/2017 |

OTHER PUBLICATIONS

Written Opinion dated Oct. 11, 2016 in PCT/JP2016/075415 filed Aug. 31, 2016.
International Search Report (with English translation) and Written Opinion dated Dec. 6, 2016, in PCT/JP2016/075475, citing documents AA-AB, AF and AR therein, 7 pages.
International Search Report (with English translation) and Written Opinion dated Oct. 31, 2017, in PCT/JP2017/028070, citing documents AD, AP, AS, AV, BA and BO therein, 8 pages.
International Search Report (with English translation) and Written Opinion dated Mar. 6, 2018, in PCT/JP2018/002938, citing documents AC, AG, AO, AT, AU and BP therein, 7 pages.
International Search Report (with English translation) and Written Opinion dated Mar. 6, 2018, in PCT/JP2018/002937, citing documents AC, AG, AO, AT, AU and BP therein, 7 pages.
Office Action dated Sep. 19, 2019, in co-pending U.S. Appl. No. 15/909,291, 12 pages.
Restriction requirement dated May 21, 2019, in co-pending U.S. Appl. No. 15/909,291, 7 pages.

\* cited by examiner

GLASS PLATE PRODUCTION METHOD, GLASS PLATE, GLASS ARTICLE PRODUCTION METHOD, GLASS ARTICLE, AND GLASS ARTICLE PRODUCTION APPARATUS

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/075415 filed on Aug. 31, 2016 and designating the U.S., which claims priority of Japanese Priority Application No. 2015-175177 filed on Sep. 4, 2015, Japanese Priority Application No. 2015-239733 filed on Dec. 8, 2015, Japanese Priority Application No. 2015-239735 filed on Dec. 8, 2015, Japanese Priority Application No. 2016-005616 filed on Jan. 14, 2016, Japanese Priority Application No. 2016-156012 filed on Aug. 8, 2016, and Japanese Priority Application No. 2016-156013 filed on Aug. 8, 2016. The entire contents of the foregoing applications are incorporated herein by reference.

BACKGROUND OF THE INVENTION

1. Field of the Invention

The disclosures discussed herein relate to a glass plate production method, a glass plate, a glass article production method, a glass article, and a glass article production apparatus.

2. Description of the Related Art

In the fields of cover glass of electronic apparatuses, window glass for building materials, glass members for vehicles, and the like, high strength may be required for glass articles to be used. A chemical strengthening treatment is often applied to such glass substrates which act as materials for such glass articles.

The chemical strengthening treatment is a process of immersing a glass substrate in a molten salt containing an alkali metal to replace alkali metal ions having a smaller atomic diameter present on the surface of the glass substrate with alkali metal ions having a larger atomic diameter present in the molten salt.

The application of the chemical strengthening treatment introduces alkali metal ions having an atomic diameter larger than that of the original atom to the surface of the glass substrate. As a result, a compressive stress layer is formed on the surface of the glass substrate, thereby improving the strength of the glass substrate.

Note that chemically strengthened glass articles are typically produced through the following steps.

(I) preparing a large-sized glass material;

(II) cutting and acquiring two or more glass substrates having a product shape from the large-sized glass material; and (III) chemically strengthening the acquired glass substrates.

CITATION LIST

Patent Literature

[PTL 1] U.S. Patent Application Publication No. 2015/0166393

[PTL 2] Japanese Translation of PCT International Application Publication No. 2013-536081

[PTL 3] U.S. Patent Application Publication No. 2012/0196071

SUMMARY OF THE INVENTION

Technical Problem

In the related-art production method, a large number of glass substrates having a final shape may need to be handled from the cutting in (II) to the chemical strengthening treatment in (III). However, the glass substrates at this stage are yet to be chemically strengthened, indicating that the glass substrates may be particularly prone to scratch on its end face. Thus, sufficiently careful handling may be required for these glass substrates. For example, to chemically strengthen a glass substrate having a final shape, sufficient measures may be required for supporting or identifying the glass substrate in the molten salt or for contacting the glass substrate with a glass substrate handling tool.

As described above, the related-art production method may have some difficulty in handling of glass substrates. In addition, the related-art production method may have some difficulty in ensuring mainly the quality of strength in the finally obtained glass articles, failing to exhibit much improvement in the producing yield of the glass articles.

In order to overcome such difficulties, the following production method may be considered; that is, a chemical strengthening treatment is applied to a large-sized glass material in advance, and the large-sized glass material is subsequently cut to thereby produce chemically strengthened glass articles.

However, such a production method may have a difficulty in cutting the glass articles from the glass material because the surface of the glass material has been chemically strengthened. Further, even when a glass article is assumed to have been successfully cut by the above-described production method, the glass articles obtained by this production method have an end face that will not be chemically strengthened, thereby failing to acquire sufficient strength.

The present invention has been made in view of such a background, and it is an object of the present invention to provide a glass article production method and a glass plate production method capable of providing a glass article having excellent strength while significantly controlling against deterioration in external appearance quality due to scratches. It is also an object of the present invention to provide a glass article and a glass plate produced by such production methods. In addition, it is still an object of the present invention to provide a glass article production apparatus capable of producing such a glass article.

Solution to Problem

A glass plate production method according to an embodiment of the present invention includes (1) preparing a glass material having a first main surface and a second main surface opposite to each other, the glass material having end faces connecting the first main surface and the second main surface;

(2) forming a splitting line composed of a laser modified region on the first main surface by irradiating the first main surface of the glass material with a laser; and (3) chemically strengthening the glass material having the splitting line formed therein, wherein in the step (2), the splitting line includes one product line or two or more product lines, and one release line or two or more release lines, the product line corresponds to an outline of a glass article separated from the glass material, the release line corresponds to a portion of the splitting line other than a portion corresponding to the product line, and the splitting line extends in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material.

Further, a glass plate production method according to an embodiment of the present invention includes (1) preparing a glass material having a first main surface and a second main surface opposite to each other, the glass material having end faces connecting the first main surface and the second main surface;

(2) forming a product line composed of a laser modified region on the first main surface by irradiating the first main surface of the glass material with a laser;

(3) forming a release line on the first main surface or the second main surface of the glass material before the step (2) or after the step (2); and (4) chemically strengthening the glass material having the product line and the release line, wherein in the step (2), the product line corresponds to an outline of a glass article separated from the glass material, the release line corresponds to a portion of the splitting line other than a portion corresponding to the product line, the product line extends in a depth direction from the first main surface toward the second main surface, and the release line extends in a depth direction from the first main surface to the second main surface or from the second main surface to the first main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material.

Moreover, a glass plate according to an embodiment of the present invention includes a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material, and a cut surface of a glass article obtained by cutting the glass material along the product line has a compression stress layer formed by chemical strengthening treatment.

Further, a glass plate according to an embodiment of the present invention includes a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponds to an outline of a glass article separated from the glass plate, the release line corresponds to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material, a cut surface of a glass article obtained by cutting the glass material along the product line has a concentration profile of predetermined alkali metal ions from the first main surface to the second main surface indicating concentration of the predetermined alkali metal ions being higher than bulk concentration of the glass material, and the predetermined alkali metal ions provide a compression stress layer to the first main surface and the second main surface to increase strength of the first main surface and the second main surface.

In addition, a glass plate according to an embodiment of the present invention includes a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting line extends in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass plate, a cut surface of a glass article obtained by cutting the glass plate along the product line has a concentration profile of predetermined alkali metal ions from the first main surface to the second main surface indicating concentration of the predetermined alkali metal ions becoming higher toward the first main surface and the second main surface of the glass plate, compared with a central portion in a thickness of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

Further, a glass plate according to an embodiment of the present invention includes a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass plate, a cut surface of a glass article obtained by cutting the glass plate along the product line has a substantially parabolic concentration profile of predetermined alkali metal ions from the first main surface to the second main surface indicating concentration of the predetermined alkali metal ions becoming higher toward the first main surface and the second main surface of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

Moreover, a glass plate production method according to an embodiment of the present invention includes (1) preparing a glass material having a first main surface and a second main surface opposite to each other;

(2) irradiating the first main surface of the glass material with a laser to form an in-plane void region having a plurality of voids arranged on the first main surface, and forming a plurality of internal void rows each having one void or two or more voids arranged from the in-plane void region toward the second main surface of the glass material; and (3) chemically strengthening the glass material having the internal void rows formed therein.

Further, a glass article production method includes producing a glass plate by the glass plate production method according to any one of the above features, the glass plate having a third main surface corresponding to the first main surface of the glass material and a fourth main surface corresponding to the second main surface of the glass material; and separating one glass article, or two or more glass articles from the glass plate along the in-plane void region and the plurality of internal void rows.

Note that in this glass article production method and other glass plate production methods, the glass material in the step (1) may be produced by a person who performs the glass article production method, or may be purchased from a third party.

Further, a glass plate according to an embodiment of the present invention includes a first main surface and a second main surface opposite to each other, wherein an in-plane void region having a plurality of voids is arranged on the first main surface, a plurality of internal void rows each having one void or two or more voids are arranged from the in-plane void region toward the second main surface, and a cut surface obtained by cutting the glass plate to pass through the in-plane void region and the plurality of internal void rows has a compressive stress layer formed by applying a chemical strengthening treatment in the center of the cut surface.

In addition, a glass plate according to an embodiment of the present invention includes a first main surface and a second main surface opposite to each other, wherein an in-plane void region having a plurality of voids is arranged on the first main surface, a plurality of internal void rows each having one void or two or more voids are arranged from the in-plane void region toward the second main surface, a cut surface obtained by cutting the glass plate to pass through the in-plane void region and the plurality of internal void rows has a concentration profile of predetermined alkali metal ions from the first main surface of the glass plate to the second main surface of the glass plate indicating concentration of the predetermined alkali metal ions being higher than bulk concentration of the glass plate, and the predetermined alkali metal ions provide a compression stress layer to the first main surface and the second main surface to increase strength of the first main surface and the second main surface.

Further, a glass plate according to an embodiment of the present invention includes a first main surface and a second main surface opposite to each other, wherein an in-plane void region having a plurality of voids is arranged on the first main surface, a plurality of internal void rows each having one void or two or more voids are arranged from the in-plane void region toward the second main surface, a cut surface obtained by cutting the glass plate to pass through the in-plane void region and the plurality of internal void rows has a concentration profile of predetermined alkali metal ions from the first main surface to the second main surface indicating concentration of the predetermined alkali metal ions becoming higher toward the first main surface and the second main surface of the glass plate, compared with a central portion in a thickness of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

Moreover, a glass plate according to an embodiment of the present invention includes a first main surface and a second main surface opposite to each other, wherein an in-plane void region having a plurality of voids is arranged on the first main surface, a plurality of internal void rows each having one void or two or more voids are arranged from the in-plane void region toward the second main surface, a cut surface obtained by cutting the glass plate to pass through the in-plane void region and the plurality of internal void rows has a substantially parabolic concentration profile of predetermined alkali metal ions from the first main surface to the second main surface indicating concentration of the predetermined alkali metal ions becoming higher toward the first main surface and the second main surface of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

In addition, a glass article according to an embodiment of the present invention includes a first main surface and a second main surface opposite to each other; and at least one end face joining the first and second main surfaces, wherein the end face has a compressive stress layer formed by chemical strengthening treatment, and a crack depth in a direction perpendicular to the end face is shallower than a depth of the compressive stress layer in a direction perpendicular to the end face.

Further, a glass article according to an embodiment of the present invention includes a first main surface and a second main surface opposite to each other; and at least one end face joining the first and second main surfaces, wherein in the end face, a concentration profile of predetermined alkali metal ions from the first main surface to the second main surface indicates concentration of the alkali metal ions being higher toward the first main surface and the second main surface compared with a central portion in a thickness direction, the predetermined alkali metal ions provide a compression stress layer to the first main surface and the second main surface to increase strength of the first main surface and the second main surface, and the concentration profile of the end face indicates concentration of the alkali metal ions being higher than bulk concentration of the glass article.

Moreover, a glass article according to an embodiment of the present invention includes a first main surface and a second main surface opposite to each other; and at least one end face joining the first and second main surfaces, wherein in the end face, a concentration profile of predetermined alkali metal ions from the first main surface to the second main surface is a substantially parabolic concentration profile indicating concentration of the predetermined alkali metal ions becoming higher toward the first main surface and the second main surface of the glass article, the predetermined alkali metal ions provide a compression stress layer to the first main surface and the second main surface to increase strength of the first main surface and the second main surface, and the concentration profile of the end face indicates concentration of the alkali metal ions being higher than bulk concentration of the glass article.

Further, a glass article production apparatus according to the present invention includes a separation unit configured to separate one glass article or two or more glass articles from a glass plate, the glass plate having any one of the above features, wherein the separation unit separates the one glass article or two or more glass articles by one or more operations selected from a) applying a pressing force along the in-plane void area to the glass plate, b) deforming the glass plate to convexly curve the first main surface or the second main surface, and c) applying a tensile stress to the glass plate due to thermal stress along the in-plane void region.

Advantageous Effect of Invention

The present invention may provide a glass article production method and a glass plate production method capable of providing a glass article having excellent strength while significantly controlling against deterioration in external appearance quality due to scratches. The present invention may further provide a glass article and a glass plate produced by such production methods. In addition, the present invention may still further provide a glass article production apparatus capable of producing such a glass article.

BRIEF DESCRIPTION OF THE DRAWINGS

Other objects and further features of embodiments will become apparent from the following detailed description when read in conjunction with the accompanying drawings, in which.

DETAILED DESCRIPTION OF THE PREFERRED EMBODIMENTS

The following describes an embodiment of the present invention with reference to accompanying drawings.
(Glass Article Production Method According to One Embodiment of the Present Invention)

In the following, a method for producing a glass article according to an embodiment of the present invention will be described with reference to FIGS. 1 to 10.

Figure 1:
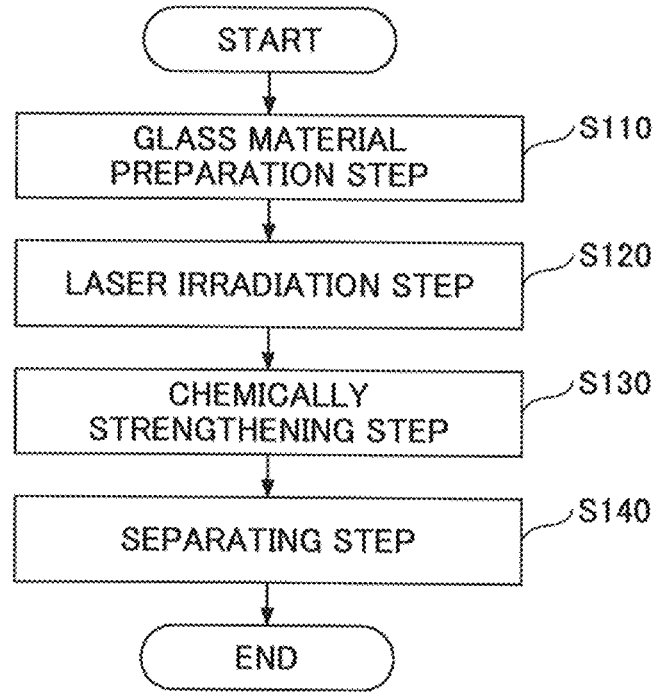
FIG. 1 is a flowchart schematically illustrating a method for producing a glass article according to an embodiment of the present invention.

FIG. 1 is a flowchart schematically illustrating a method for producing a glass article (hereinafter referred to as a "first production method") according to an embodiment of the present invention.

As illustrated in FIG. 1, the first production method includes a step of preparing a glass material having a first main surface and a second main surface opposite to each other (Glass material preparation step) (step S110);

a step of irradiating a first main surface of the glass material with a laser to form an in-plane void region in the first main surface and to form an internal void row inside the glass material (laser irradiation step) (step S120); and a step of chemically strengthening the glass material (chemical strengthening step) (step S130); and a step of separating a glass article from the chemically strengthened glass material of a glass plate along the in-plane void region and the internal void row (separating step) (step S140).

The respective steps will be described below with reference to FIGS. 2 to 10. FIGS. 2 to 10 are diagrams schematically illustrating respective steps of the first production method.
(Step S110)

First, a glass material having a first main surface and a second main surface opposite to each other is prepared.

A glass composition of the glass material is not particularly specified insofar as the glass composition is capable of being chemically strengthened. The glass material may be, for example, soda-lime glass, aluminosilicate glass, alkali aluminosilicate glass or the like.

At this stage, the glass material may be applied with a chemical strengthening treatment or may not be applied with a chemical strengthening treatment. Note that the chemical strengthening treatment noted above differs from the chemical strengthening treatment applied in the later-described step S130.

In order to clarify this difference, the chemical strengthening treatment at this stage is called a "preliminary chemical strengthening treatment" to be distinguished from the later-described chemical strengthening treatment.

The number of preliminary chemical strengthening treatments to be applied may be once, or twice or more; the number of preliminary chemical strengthening treatments to be applied is not particularly specified. When the preliminary chemical strengthening treatment is applied twice or more, a profile of a residual stress layer in a direction orthogonal to the main surface may be made different from a profile obtained when the preliminary chemical strengthening treatment is applied only once.

The thickness of the glass material is not particularly specified; the thickness of the glass material may be in a range of 0.03 to 6 mm, for example. The thickness of glass materials for buildings or vehicles may be in a range of 2 to 19 mm, for example.

The glass material may be provided in a plate form or in a roll form. A roll-form glass material may facilitate transportation compared to a plate-like glass material. In the plate-like glass material, the first and second main surfaces are not necessarily flat and may be curved.

Figure 2:
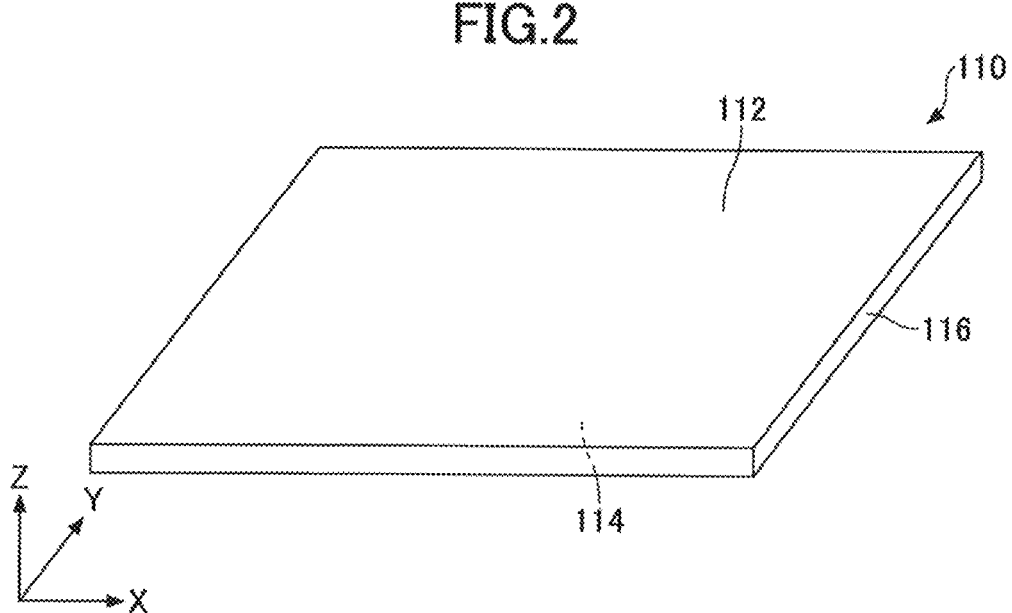
FIG. 2 is a diagram schematically illustrating a configuration of a glass material that may be used in a method for producing a glass article according to an embodiment of the present invention.

FIG. 2 is a diagram schematically illustrating a configuration of a plate-like glass material 110 as an example. The glass material 110 has a first flat main surface 112, a second flat main surface 114, and an end face 116.
(Step S120)

Next, the plate-like glass material 110 is irradiated with a laser. As a result, an in-plane void region is formed on the first main surface 112 of the glass material 110. Two or more internal void rows are formed from the in-plane void region toward a lower side, that is, toward the second main surface 114.

Note that the "in-plane void region" indicates a linear region having two or more surface voids formed in a predetermined arrangement. In addition, the "internal void row" indicates a linear region having one void or two or more voids formed in the glass material from the first main surface toward the second main surface.

Figure 3:
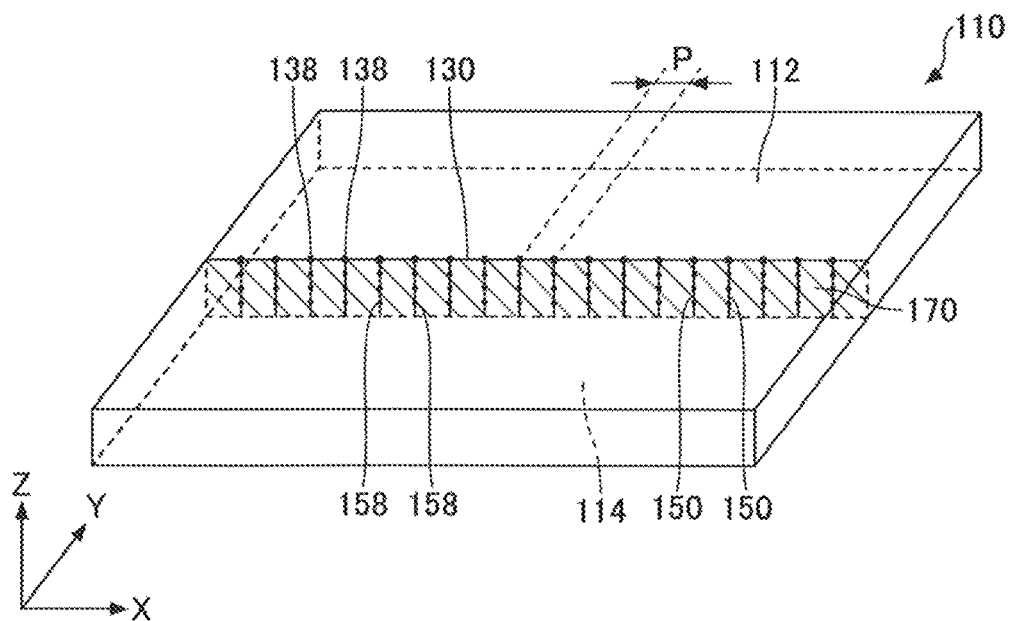
FIG. 3 is a schematic diagram describing respective configurations of an in-plane void region and internal void rows.

In the following, configurations of the "in-plane void region" and "internal void rows" will be described in more detail with reference to FIG. 3. FIG. 3 is a diagram schematically illustrating an in-plane void region and internal void rows formed in the glass material.

As depicted in FIG. 3, the glass material 110 includes one in-plane void region 130 and two or more internal void rows 150 formed corresponding to the in-plane void region 130.

As described above, the in-plane void region 130 indicates a linear region having two or more surface voids 138 formed in a predetermined arrangement. For example, in the example of FIG. 3, two or more surface voids 138 are arranged in a certain direction (X direction) in the first main surface 112 of the glass material 110, thereby forming an in-plane void region 130.

Each surface void 138 corresponds to the irradiation position of a laser on the first main surface 112, and has a diameter of, for example, 1 to 5 µm. Note that the diameter of the surface void 138 varies with a laser irradiation condition, a type of the glass material 110, and the like.

The distance P between the centers of the adjacent surface voids 138 may be determined based on the composition and thickness of the glass material 110, laser processing conditions, and the like. For example, the distance P between the centers of the adjacent surface voids 138 may be in a range of 2 to 10 µm. Note that the distance P between the centers of the surface voids 138 does not have to be equal at all positions, and may be different according to places. That is, the surface voids 138 may be arranged at irregular intervals.

As described above, the internal void row 150 indicates a linear region having one void 158 or two or more voids 158 in the glass material 110 from the first main surface 112 toward the second main surface 114.

The shape, size, and pitch of the voids 158 are not particularly specified. The void 158 may have a shape such as a circle, an ellipse, a rectangle, a triangle, or the like when viewed from the Y direction, for example. Further, the maximum dimension of the void 158 (typically corresponding to the length of the void 158 along an extending direction of the internal void row 150) when viewed from the Y direction may, for example, be in a range of 0.1 to 1000 µm.

Each of internal void rows 150 has a corresponding one of surface voids 138. For example, a total number of 18 internal void rows 150 corresponding to 18 surface voids 138 are formed in the example illustrated in FIG. 3.

In the example of FIG. 3, the voids 158 forming one internal void row 150 are arranged along the thickness direction (Z direction) of the glass material 110. That is, each of internal void rows 150 extends in the Z direction. Note that this is merely an example, and respective voids forming the internal void row 150 that are arranged from the first main surface 112 to the second main surface 114 may be inclined with respect to the Z direction.

Further, in the example of FIG. 3, each internal void row 150 is composed of a total number of three voids 158 apart from the surface void 138. Note that this is merely an example, and each internal void row 150 may be composed of one or two voids 158, or may be composed of four or more voids 158. Further, the number of voids 158 involved may be different in each of the internal void rows 150. In addition, some voids 158 may be coupled with surface voids 138 to form "long" surface voids 138.

Furthermore, each internal void row 150 may or may not have a void (second surface void) opened at the second surface 114.

As is apparent from the above description, note that the in-plane void region 130 represents a region that is not actually formed as a continuous "line" but a virtual linear region that is formed by connecting respective surface voids 138.

Similarly, note that the internal void row 150 represents a region that is not actually formed as a continuous "line" but a virtual linear region that is formed by connecting respective voids 158.

Furthermore, one in-plane void region 130 need not necessarily be recognized as a single "line" (a row of surface voids 138); one in-plane void region 130 may be formed as an aggregate of parallel "lines" arranged in mutually close proximity.

Figure 4:
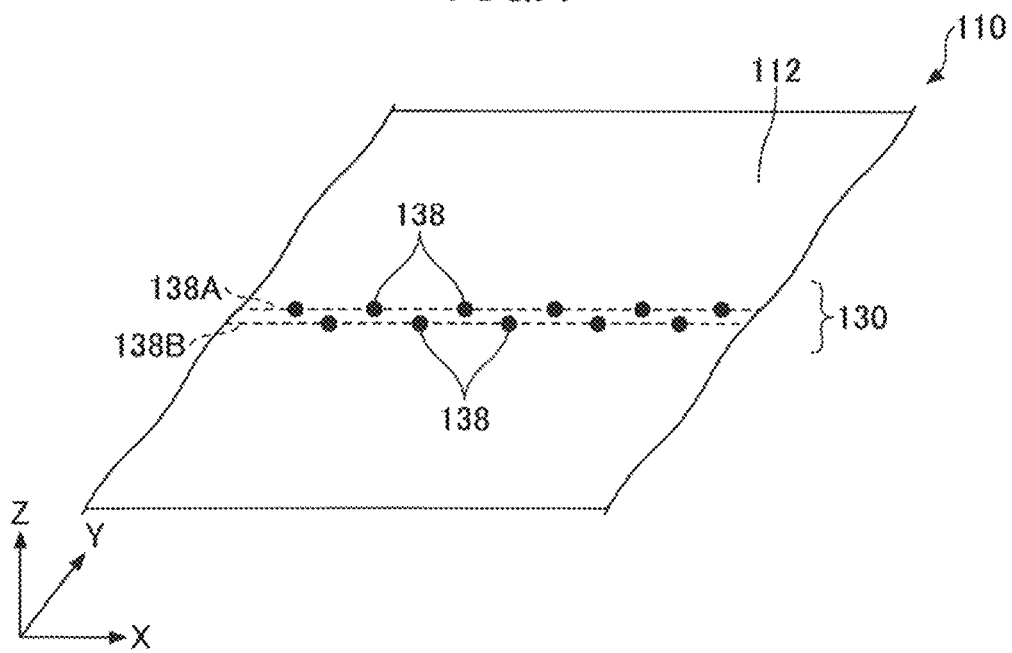
FIG. 4 is a diagram schematically illustrating a configuration of an in-plane void region.

FIG. 4 is a diagram depicting an example of the in-plane void region 130 recognized as an aggregate of two or more such "lines". In this example, two surface void rows 138A and 138B parallel to each other are formed on the first main surface 112 of the glass material 110, thereby forming one in-plane void region 130. The distance between the surface void rows 138A and 138B is, for example, 5 µm or less, and is preferably 3 µm or less.

In the example of FIG. 4, the in-plane void region 130 is composed of two surface void rows 138A and 138B. However, the in-plane void region 130 may be composed of a large number of surface void rows.

Hereinafter, such an in-plane void region composed of two or more surface void rows is specifically referred to as a "multiple line-in-plane void region". In addition, the in-plane void region 130 composed of one surface void row as depicted in FIG. 3 is specifically referred to as a "single line in-plane void region" to be distinguished from "multiple line in-plane void region".

The in-plane void region 130 and the internal void row 150 as described above may be formed by irradiating the first main surface 112 of the glass material 110 with a laser.

More specifically, first, a laser is applied to a first position of the first main surface 112 of the glass material 110 to form a first internal void row including surface voids from the first main surface 112 to the second main surface 114. Next, the laser application position with respect to the glass material 110 is changed such that a laser is applied to a second position of the first main surface 112 of the glass material 110 to form a second internal void row including second surface voids from the first main surface 112 to the second main surface 114. The in-plane void region 130 and the corresponding internal void rows 150 may be formed by repeating this operation.

In a case where an internal void row having voids 158 sufficiently close to the second main surface 114 is not formed by one laser application, i.e., in a case of the void closest to the second main surface 114 among the voids 158 being at a position sufficiently remote from the second main surface 114 (e.g., the void closest to the second main surface 114 has a distance equal to or less than a half of the thickness of the glass material 110 from the first main surface 112), a laser may be applied twice or more to substantially the same position. Note that the "substantially the same (laser application) position" indicates not only a case where the two positions perfectly match but also indicates a case where the two positions may slightly be deviated from each other (e.g., a deviation of 3 µm at maximum).

For example, a laser is applied two or more times along a first direction parallel to the first main surface 112 of the glass material 110 to form a first in-plane void region 130 and a corresponding internal void row 150 (first pass), and subsequently, a laser is applied to substantially the same direction and substantially the same position as the first pass (second pass), thereby forming a "deeper" internal void row 150 corresponding to the first in-plane void region 130.

The distance from the center of the void closest to the second main surface 114, among the voids 158 constituting the internal void row 150, to the second main surface 114 may preferably be in a range of 0 to 10 μm although such a distance may vary with the thickness of the glass material 110.

As a laser that may be used for such a process, a short pulsed-laser with a pulse width from an order of femtoseconds to an order of nanoseconds, i.e., $1.0 \times 10^{-15}$ to $9.9 \times 10^{-9}$ seconds may be given. Such a short pulsed-laser may further be preferable to have a burst pulse because internal voids may be efficiently formed. The mean output at the irradiation time of such a short pulsed-laser is, for example, 30 W or more. When this mean output of the short pulsed-laser is less than 10 W, sufficient voids may fail to be formed. As an example of laser light with a burst pulse, a burst laser having a pulse number of 3 to 10 may be applied to form one internal void row; the laser output is approximately 90% of the rating (50 W), the burst frequency is approximately 60 kHz, and the burst time width is 20 picoseconds to 165 nanoseconds. As a time width of the burst, a preferable range may be from 10 to 100 nanoseconds.

As a laser irradiation method, a method using self-convergence of beam based on Kerr-Effect, a method using Gaussian-Bessel beam together with axicon lens, or a method using linear focusing beam with aberration lens may be used. In any case, any method may be used insofar as an in-plane void region and an internal void row are formed.

For example, when a burst laser apparatus (Patent Document 2) is used, the dimensions of each of the voids forming the internal void row 150, the number of voids included in the internal void row 150, and the like may be changed to some extent by appropriately changing the irradiation conditions of a laser.

In the following description, it is assumed that a plane (a plane 170 indicated by hatching in FIG. 3) including the in-plane void region 130 and the internal void rows 150 corresponding to the in-plane void region 130 may also be referred to as a "virtual end face". This virtual end face 170 substantially corresponds to the end face of the glass article produced by the first production method.

Figure 5:
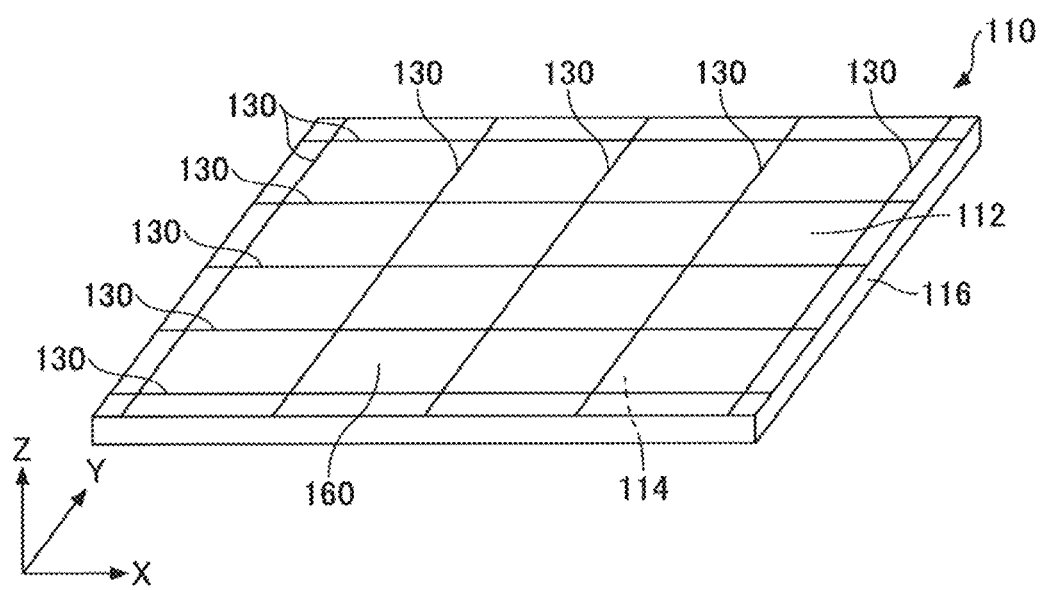
FIG. 5 is a diagram schematically illustrating a state in which two or more in-plane void regions are formed on a first main surface of a glass material.

FIG. 5 is a diagram schematically illustrating an example of a configuration of the glass material 110 having two or more in-plane void regions 130 formed on the first main surface 112 of the glass material 110 in step S120.

In the example of FIG. 5, five in-plane void regions 130 are formed in the horizontal direction (X direction) and five in-plane void region 130 are formed in the vertical direction (Y direction) of the first main surface 112 of the glass material 110. Further, though not viewable from FIG. 5, two or more internal void rows each having one void, or two or more voids intermittently arranged toward the second main surface 114 are formed on the lower side of each in-plane void region 130, that is, on the second main surface 114 side.

Virtual parts bounded by four in-plane void regions 130 and the corresponding internal void rows, that is, virtual parts bounded by four virtual end faces are each referred to as a "glass piece 160".

The shape of the in-plane void region 130, and the shape of the glass piece 160 substantially may correspond to the shape of a glass article obtained after step S140. For example, in the example of FIG. 5, 16 rectangular glass articles are ultimately produced from the glass material 110. Furthermore, as described above, each of the virtual end faces including the in-plane void region 130 and the corresponding internal void rows 150 corresponds to one end face of the glass article produced after step S140.

Note that the in-plane void regions 130 and the arrangement configuration of the glass pieces 160 depicted in FIG. 5 are merely examples, and these are formed in a predetermined arrangement according to the shape of the finally produced glass articles.

Figure 6:
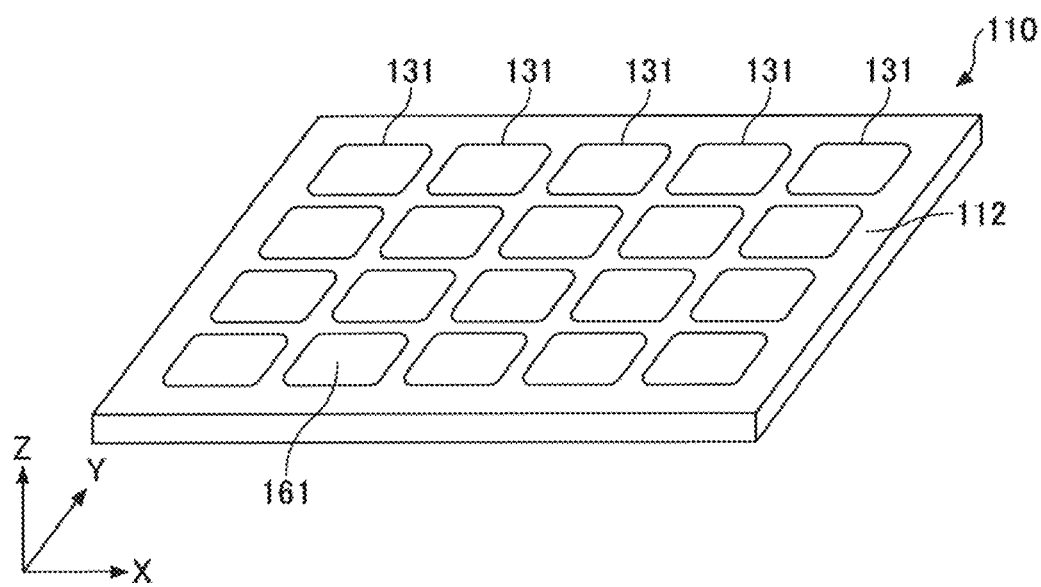
FIG. 6 is a diagram schematically illustrating a configuration of an in-plane void region.
Figure 7:
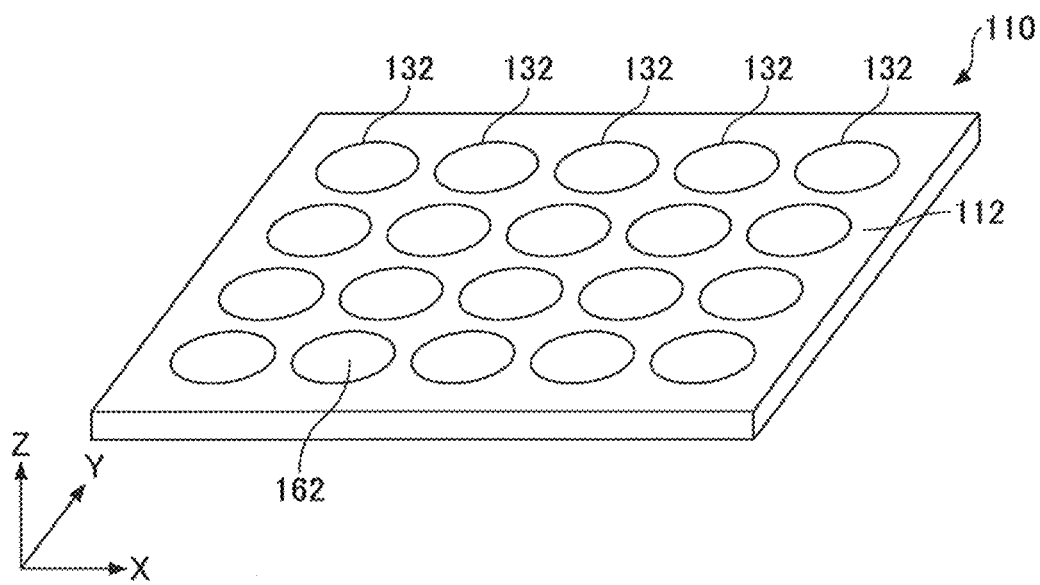
FIG. 7 is a diagram schematically illustrating another configuration of an in-plane void region.

FIG. 6 and FIG. 7 are diagrams schematically illustrating respective examples of another configuration of the in-plane void region.

In the example of FIG. 6, each in-plane void region 131 is arranged as one closed line (loop) having a substantially rectangular shape with curved corner portions. Accordingly, the glass piece 161 bounded by the in-plane void region 131 and the internal void rows (not viewable) has a substantially rectangular plate shape having the curved corner portions.

Further, in the example of FIG. 7, each in-plane void region 132 is arranged as one closed circular line (loop) having a substantially circular shape. Accordingly, each glass piece 162 has a substantially disk-like shape.

Further, in these examples, the end face of the glass article is composed of one virtual end face; the obtained glass articles have one end face for each.

As described above, the in-plane void regions 130, 131, and 132 may be formed in a linear shape, a curved shape, or a combination of both. In addition, the glass pieces 160, 161, and 162 may be bounded by a single virtual end face or may be bounded by two or more virtual end faces.

(Step S130)

Next, the glass material 110 is chemically strengthened.

The conditions of the chemical strengthening treatment are not particularly specified. The chemical strengthening may be performed, for example, by immersing the glass material 110 in a molten salt at 430 to 500° C. for 1 minute to 2 hours.

For the molten salt, nitrate may be used. For example, when replacing the lithium ions contained in the glass material 110 with larger alkali metal ions, a molten salt containing at least one of sodium nitrate, potassium nitrate, rubidium nitrate, and cesium nitrate may be used. Further, when replacing the sodium ions contained in the glass material 110 with larger alkali metal ions, a molten salt containing at least one of potassium nitrate, rubidium nitrate, and cesium nitrate may be used. Moreover, when replacing the potassium ions contained in the glass material 110 with larger alkali metal ions, a molten salt containing at least one of rubidium nitrate and cesium nitrate may be used.

In addition, one or more salts such as potassium carbonate may be further added to the molten salt. In this case, a low density layer having a thickness of 10 nm to 1 μm may be formed on the surface of the glass material 110.

The application of a chemical strengthening treatment to the glass material 110 will form a compressive stress layer on the first main surface 112 and the second main surface 114 of the glass material 110, resulting in improving the strength of the first main surface 112 and the second main surface 114. The thickness of the compressive stress layer corresponds to the penetration depth of alkali metal ions for substitution. For example, when replacing sodium ions with potassium ions using potassium nitrate, the thickness of the compressive stress layer for soda-lime glass may be 8 to 27 μm, and the thickness of the compressive stress layer for aluminosilicate glass may be 10 to 100 μm. In a case of aluminosilicate glass, the penetration depth of alkali metal ions may preferably be 10 μm or more, and may more preferably be 20 μm or more.

As described above, in the related-art production method of a chemically strengthened glass article, a glass article is produced through the following steps:

(I) preparing a large-sized glass material;

(II) cutting and acquiring a large number of glass substrates having a product shape from the large-sized glass material; and (III) chemically strengthening the acquired glass substrates.

In contrast, in the first production method, a chemical strengthening treatment is applied to the glass material 110 treatment subject. In this case, unlike the related-art production method of a chemically strengthened glass article having a product shape, handling of the treatment subject at the time of the application of chemical strengthening treatment will be facilitated.

For example, in a case where the end face 116 (see FIG. 5) of the glass material 110 is scratched, this scratched part is not included in the finally produced glass article. Further, at the time of the application of chemical strengthening treatment, it is possible to support or grip a treatment subject by utilizing, for example, the outer peripheral portion of the glass material 110 that is not used as a glass article.

Hence, in the first production method, as compared with the related-art production method, it is easier to ensure the quality of appearance and strength related to scratches on the glass article to be produced, which makes it possible to increase the producing yield.

Note that in the first production method, the chemical strengthening treatment is applied to the glass material 110 before forming the shape of the glass article. Accordingly, it may be possible for such a glass article obtained after the separating step S140 to have an end face that is not chemically strengthened. In such a case, the glass article may fail to acquire sufficient strength.

However, the inventors of the present invention have found that after the step S130 of the first production method, that is, in the glass material 110 after the application of chemical strengthening treatment, alkali metal ions (hereinafter referred to as "introduced ions") introduced by the chemical strengthening treatment are also present on the virtual end face (i.e., the end face of the cut glass article). In addition, since the virtual end face exhibited high smoothness, a step for improving the smoothness of the end face was also found to be unnecessary.

As will be described later, unlike the first main surface 112 and the second main surface 114, in the virtual end face, the introduced ions exhibit a non-uniform concentration distribution in a plane, representing that the closer to the central portion in the thickness direction of the glass material 110, the lower the concentration of the introduced ions. However, alkali metal ions introduced through the chemical strengthening treatment are present on the entire virtual face, and the introduced ions are also present in the central portion in the thickness direction. Accordingly, the concentration of the introduced ions present in the central portion in the thickness direction is not zero.

This suggests that in the first production method, a molten salt is introduced into the glass material 110 via the fine surface voids 138 formed on the surface of the glass material 110 by the laser irradiation and via the fine voids 158 formed inside the glass material 110, and that a substitution reaction occurs between the introduced molten salt and the virtual end face. Such an outcome has not been reported insofar as the applicant knows.

As a result of supporting this outcome, the glass article produced through the first production method, that is, the steps S110 to S140, has sufficient strength compared to that of a glass article produced through the aforementioned steps (I) to (III). Details will be described later.

According to the first production method, it is possible to obtain, after the step S130, the glass material 110 having the first main surface 112, the second main surface 114, and respective virtual end faces all of which have been chemically strengthened.

(Step S140)

Next, the glass articles are separated from the chemically strengthened glass material 110, i.e., the glass plate 175.

Figure 8:
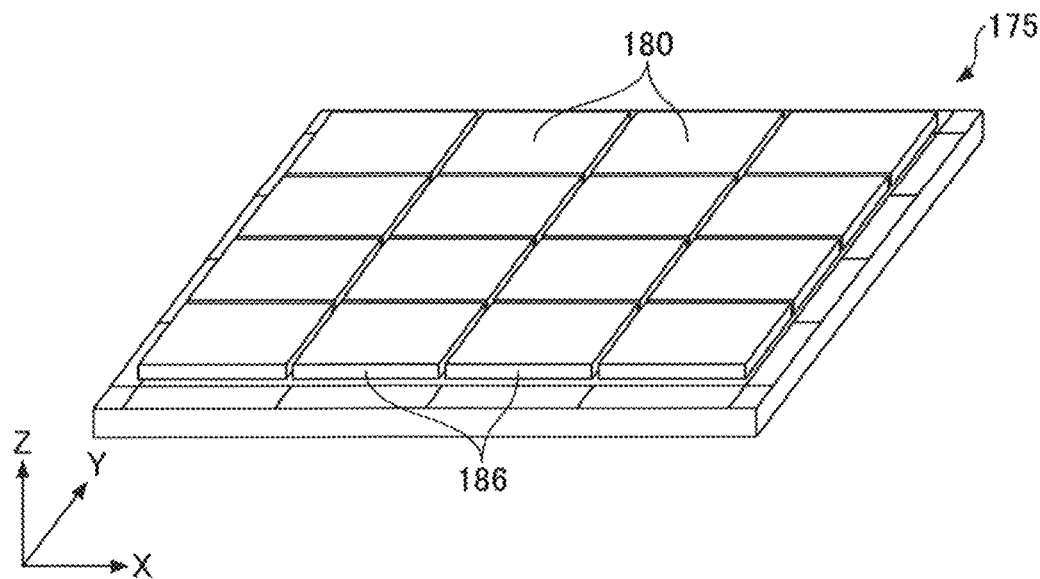
FIG. 8 is a diagram schematically illustrating a state in which two or more glass articles are separated from a glass plate.

FIG. 8 is a diagram schematically depicting a state in which a total number of 16 glass articles 180 are separated from the glass plate 175. Each of the glass articles 180 has four end faces 186.

The aforementioned virtual end faces are utilized for separating glass articles 180 from the glass plate 175. In other words, the glass pieces 160 bounded by the aforementioned virtual end faces are separated from the glass plate 175 to produce the glass articles 180. Accordingly, each of the end faces 186 of the glass article 180 corresponds to one of the aforementioned virtual end faces.

As mentioned above, it is difficult to separate the glass article from the glass plate 175, because the chemically strengthened glass material typically has the strengthened first and second main surfaces.

However, in the first production method, the virtual end faces of the glass plate 175 have, in a plane, the surface voids 138 and voids 158 that are included in the in-plane void region 130 and the corresponding internal void rows 150, respectively. As a result, when separating the glass articles 180 from the glass plate 175, these voids 138 and 158 play a role such as "perforation formed in a plane and inside" of the virtual end faces of the glass plate 175. Accordingly, in the first production method, it is possible to easily separate the glass articles 180 from the glass plate 175 by using the virtual end faces. In particular, in a case where the in-plane void region 130 is a "multiple line in-plane void region", the glass articles 180 may be separated more easily.

Note that, as described above, the in-plane void region 130 is composed of two or more voids 138, and the internal void row 150 is composed of two or more voids 158. The in-plane void region 130, the internal void row 150, and the voids 138 and 158 are different from through holes formed so as to penetrate the glass plate in the thickness direction of the glass plate, for example.

As described above, a chemical strengthening treatment is also applied to the virtual end faces of the glass plate 175. Thus, the resulting glass articles 180 also have chemically strengthened end faces 186. Hence, the first production method may be able to avoid a problem in a method in which glass articles are separated from the conventional glass material after the conventional glass material is chemically strengthened; that is, since the conventional glass material has the end faces that are not chemically strengthened, the glass articles may have insufficient strength.

A specific method for performing step S140 is not particularly specified. For example, one or more glass articles 180 may be separated from the glass plate 175 by a mechanical method or a thermal method.

Figure 9:
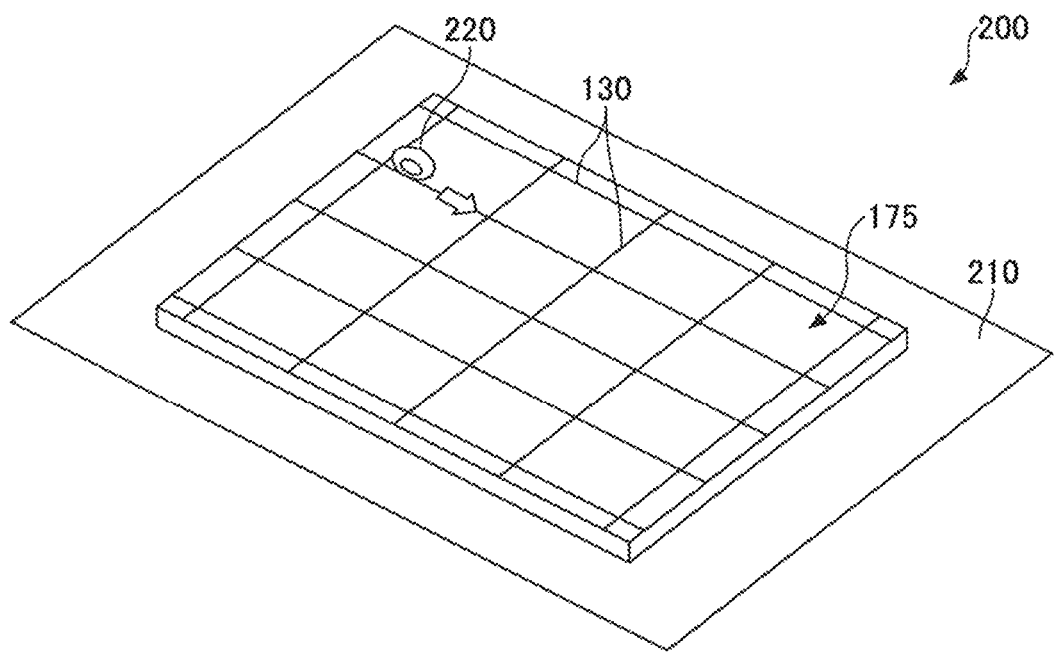
FIG. 9 is a diagram schematically depicting an example of an apparatus that may be used in separating glass articles from a glass plate in the first production method.

FIG. 9 is a diagram schematically depicting an example of an apparatus that may be used in separating glass articles from a glass plate in step S140 of the first production method. In this apparatus 200, one or more glass articles 180 may be separated from the glass plate 175 by a mechanical method.

As illustrated in FIG. 9, the apparatus 200 includes a base 210 and a roller 220. The roller 220 may move or rotate in any direction along an XY plane by instructions from a controller (not illustrated). Further, the controller may be enabled to synchronously adjust the pressing force and the moving speed of the roller 220.

In order to separate glass articles from a glass plate using the apparatus 200, a glass plate 175 is first placed on a base 210. Note that in order to prevent scratches, a protective sheet (not illustrated) may be disposed between the base 210 and the glass plate 175.

Next, the roller 220 is placed on the glass plate 175 such that a tip of the roller is in contact with the glass plate 175. A protective sheet (not illustrated) may be further disposed on the glass plate 175 in this step.

The roller 220 in this state moves, upon receiving instructions from the controller, on the glass plate 175 along the in-plane void region 130. The tip of the roller 220 has a sharp corner shape or hemispherical shape. Hence, due to the pressing force of the roller 220, the glass plate 175 is split along the virtual end faces. This operation may be repeatedly performed along each of the in-plane void regions 130 to separate one or more glass articles 180 from the glass plate 175.

In the example of FIG. 9, each in-plane void region 130 is linear. However, for example, with respect to the curved in-plane void regions 131 and 132 as illustrated in FIGS. 6 and 7, one or more glass articles 180 may be separated from the glass plate 175 by a similar operation.

Figure 10:
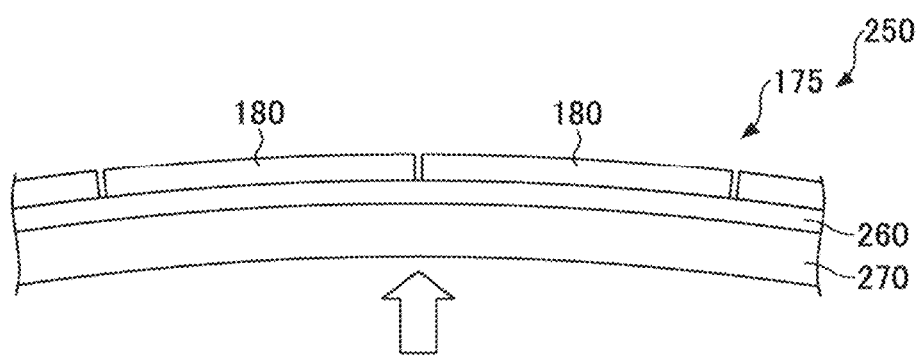
FIG. 10 is a diagram schematically depicting another example of an apparatus that may be used in separating glass articles from a glass plate in the first production method.

FIG. 10 is a diagram schematically depicting an example of another apparatus that may be used in separating glass articles from a glass plate. In this apparatus 250, one or more glass articles 180 may be separated from the glass plate 175 by a mechanical method.

As illustrated in FIG. 10, the apparatus 250 has a structure that supports the glass plate 175 along a support member 270 via a deformable sheet member 260.

The support member 270 in the apparatus 250 may be a general cylindrical roll shape when each in-plane void region is linear. The glass plate 175 is curved while conveyed on the support member 270, so that a bending moment along the in-plane void region is exerted. As a result, the in-plane void regions are split at high speed. Splitting of the in-plane void region along another direction is repeatedly performed in the next step. Further, in the case of curvilinear in-plane void regions 131 and 132 as shown in FIGS. 6 and 7, the support member 270 is formed in a flat plate shape or in a convexly curved upward shape to allow deformation of the glass plate 175 to be along the support member 270 via the deformable sheet member 260 on the support member 270, which applies a bending moment along the in-plane void region to separate one or more glass articles 180 from the glass plate 175. In this case, it is preferable to preliminarily adhere the sheet member 260 to the glass plate 175 with sufficient adhesive force in advance, and to stretch and deform the sheet member 260 at the time of separation. As a material of the sheet member 260, a flexible material such as a rubber material or the like capable of sufficiently stretching and deforming to be separated is used.

To separate one or more glass articles 180 from the glass plate 175 by a thermal method, a "surface absorption method" or an "internal absorption method" may be used.

In the "surface absorption method", the first main surface 112 of the glass plate 175 is locally heated using a heat source to generate thermal stress, thereby separating the glass articles 180 from the glass plate 175. As the heat source, for example, a laser having a relatively long wavelength (e.g., a $CO_2$ laser), a burner, a heater wire, or the like is used. Concentrating the heat from the heat source in the in-plane void region 130 generates thermal stress in the in-plane void region 130 and furthermore in the virtual end faces, thereby breaking the glass plate 175 along these virtual end faces. Thereby, the glass articles 180 may be separated.

In the "internal absorption method", a laser having a relatively short wavelength (e.g., a CO laser) is used. When such a laser is applied to the glass plate 175, the heat of the laser is absorbed inside the glass plate 175. Accordingly, the application of the laser along the in-plane void region 130 will locally generate an internal stress in the virtual end face to be broken from the other portion. As a result, the glass article 180 is separated from the glass plate 175.

In the above description, an embodiment of a separation method has been described by referring to a method of obtaining one or more glass articles 180 from one glass plate 175 as an example. However, the above-described method (mechanical method, "internal absorption method") may be performed by stacking two or more glass plates 175. In such a method, more glass articles 180 may be produced simultaneously.

To typically separate a glass article from a glass material, a glass material is cut using a glass cutter or the like. In this case, the cut end face of the glass article tends to be a "rough" end face having unevenness.

In the first production method, a cutting tool such as a glass cutter is not necessarily used for separating the glass article 180, which indicates that a relatively smooth end face 186 may be obtained when separating the glass article 180.

Note that in particular cases, such as when a smooth end face 186 is not required, the glass article 180 may be separated by cutting the glass plate 175 along the virtual end face using a glass cutter or the like. In this case, the presence of the virtual end face may also facilitate cutting of the glass plate 175 more easily than normal cutting.

Through the above steps, one or more glass articles 180 may be produced.

Note that in order to protect the end face 186 of the obtained glass article 180, a material such as a resin may be applied to the end face 186.

In the first production method, due to the above-mentioned characteristics, it is possible to significantly reduce deterioration in appearance quality of the glass article 180 and obtain a glass article 180 having sufficient strength.

As described above, one production method for producing a glass article has been described by taking the first production method as an example. However, the first production method is merely an example, and various modifications may be made when actually producing a glass article.

For example, the chemical strengthening treatment in step S130 of the first production method is not necessarily applied to both the first main surface 112 and the second main surface 114 of the glass material 110; a modified method may be considered where the chemical strengthening treatment is not applied to one of the first main surface 112 and the second main surface 114 of the glass material 110.

Further, for example, a step (additional step) of providing various characteristics to the glass plate 175 may be performed after the step S130 and before the step S140.

The additional step is not particularly specified to the following; however, for example, the additional step may be performed to add an additional characteristic such as a protection function to the surface of the glass plate 175 or to modify the surface of the glass plate 175.

Such additional steps may include, for example, a step of attaching a functional film to the first main surface 112, the second main surface and/or the end surface 116 (hereinafter collectively referred to as "exposed surface") of the glass plate 175, and a step of applying surface treatment (including surface modification) to at least a part of the exposed surface, and the like.

Examples of the surface treatment method include etching treatment, film formation treatment, printing treatment and the like. The film formation treatment may be performed using, for example, a coating method, a dipping method, a vapor deposition method, a sputtering method, a PVD method, a CVD method, or the like. Note that the surface treatment includes washing using a chemical solution.

By providing the surface treatment, for example, a wavelength selective film such as a low reflective film, a high reflective film, an IR absorbing film or a UV absorbing film, an anti-glare film, an anti-fingerprint film, an anti-fogging film, a printing film, an electronic circuit, or a multilayered film of these may be formed.

Furthermore, grooves may be formed in at least one of the main surfaces of the glass material 110 before or after step S120, or both before and after step S120, that is, before or after formation of the in-plane void region 130, or both before and after formation of the in-plane void region 130.

For example, when the in-plane void region 130 is already formed on the first main surface 112 of the glass material 110, grooves may be formed along the in-plane void region 130. Alternatively, when the in-plane void region 130 is yet to be formed on the first main surface 112 of the glass material 110, grooves may be formed along the in-plane void region 130 to be formed at a later time.

The shape of the groove is not particularly specified. For example, the groove may have a substantially V-shaped cross section, a substantially U-shaped cross section, a substantially inverted trapezoidal shape, a substantially square-recessed shape, or the like. Further, in the configuration of these grooves, an opening portion of the groove in the first main surface 112 or the second main surface 114 may be round.

In a case of forming grooves having such a cross-sectional shape, the glass article 180 obtained after step S140 has a connecting portion of the end face 186 with the first main surface 112 and/or the second main surface 114 that is chamfered or rounded. Accordingly, a post-processing step with respect to the glass article 180 may be omitted.

The depth of the groove may, for example, be less than a half of the thickness of the glass material 110. The depth of the groove is preferably 0.01 mm or more.

The tool for forming the groove may be, for example, a grindstone, a laser, or the like. In particular, from the viewpoint of accuracy and quality of the groove, laser processing is preferable.

(Glass Plate Production Method According to One Embodiment of the Present Invention)

In the following, a method for producing a glass plate according to an embodiment of the present invention will be described with reference to FIG. 11.

Figure 11:
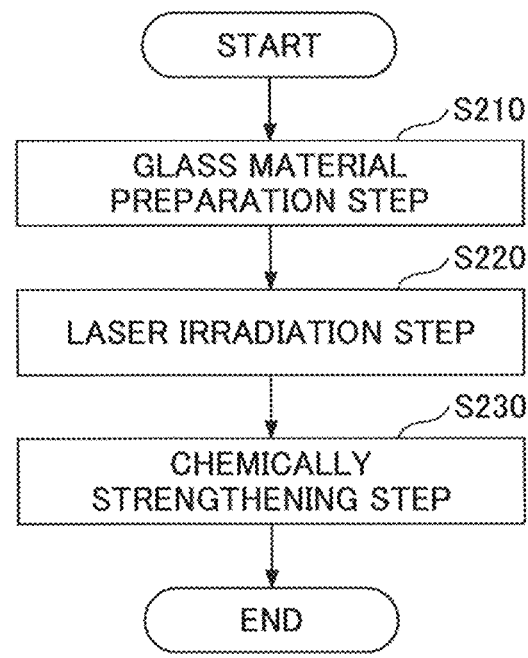
FIG. 11 is a flowchart schematically illustrating a method for producing a glass plate according to an embodiment of the present invention.

FIG. 11 is a flowchart schematically illustrating a method for producing a glass plate (hereinafter referred to as a "second production method") according to an embodiment of the present invention.

As illustrated in FIG. 11, the second production method includes a step of preparing a glass material having a first main surface and a second main surface opposite to each other (glass material preparation step) (step S210);

a step of irradiating a first main surface of the glass material with a laser to form an in-plane void region in the first main surface and to form an internal void row inside the glass material (laser irradiation step) (step S220); and a step of chemically strengthening the glass material (chemical strengthening step) (step S130); and As is apparent from FIG. 11, this second production method corresponds to the above-described first production method illustrated in FIG. 1 from which the separation step of step S140 is omitted.

That is, in this second production method, as the glass plate, a glass material having one or more virtual end faces, that is, in-plane void regions and corresponding internal void rows as illustrated in FIGS. 5 to 7 is produced.

In other words, in the present application, a "glass plate" indicates an intermediate body in steps of producing the glass articles from the glass material, that is, a processed glass material.

Such a "glass plate" is useful in a case where the steps of processing the glass material (e.g., step S210 to step S230) and the step of separating the glass article from the glass plate are performed by different persons or in different places, or when these steps are implemented at appropriate intervals in time.

It should be apparent to those skilled in the art that effects similar to those obtained in the above-described first production method may also be obtained in such a second production method. That is, in the glass plate obtained by the second production method, the virtual end face is chemically strengthened, and when the glass article is separated from the glass plate, a glass article having sufficient strength may be obtained. In addition, there is a significant control against deterioration of the quality of the obtained glass article.

(Glass Article According to One Embodiment of the Present Invention)

Next, a glass article according to an embodiment of the present invention will be described with reference to FIG. 12.

Figure 12:
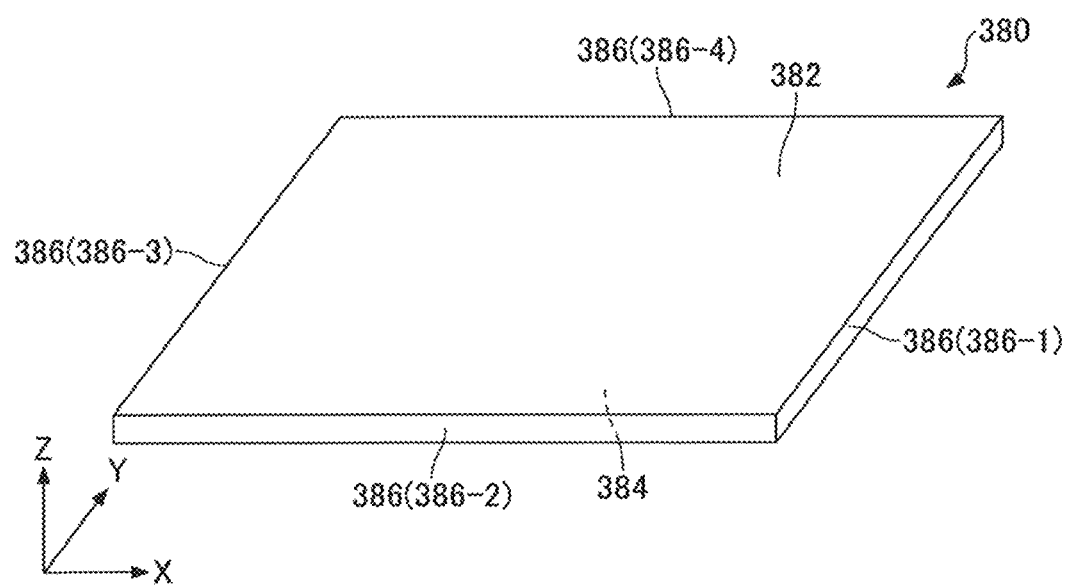
FIG. 12 is a diagram schematically illustrating a glass article according to an embodiment of the present invention.

FIG. 12 is a diagram schematically illustrating a glass article (hereinafter referred to as "first glass article") according to an embodiment of the present invention.

As illustrated in FIG. 12, a first glass article 380 has a first main surface 382 and a second main surface 384 opposite to each other, and end surfaces 386 connecting the two main surfaces. Note that the first main surface 382 corresponds to the first main surface of the surfaces opposite to each other of the glass material plate and the second main surface 384 corresponds to the second main surface of the surfaces opposite to each other of the glass material plate.

In the example of FIG. 12, the first glass article 380 has substantially rectangular main surfaces 382 and 384, and has four end surfaces 386-1 to 386-4. In addition, each of the end faces 386-1 to 386-4 extends in parallel with a thickness direction (Z direction) of the first glass article 380.

However, this configuration may merely be an example; various forms may be assumed as the configuration of the first glass article 380. For example, the first main surface 382 and the second main surface 384 may be in the shape of a circle, an ellipse, a triangle, or a polygon other than a rectangle. Further, the number of end faces 386 may be, for example, one, three, or four or more, in accordance with the configuration of the first main surface 382 and the second main surface 384. In addition, the end face 386 may extend obliquely from the Z direction (i.e., in a direction not parallel to the Z direction). In this case a "tilted" end face is obtained.

The thickness of the first glass article 380 is not particularly specified. The thickness of the first glass article 380 may be, for example, in a range of 0.03 to 6 mm. The thickness of glass articles for buildings or vehicles may be in a range of 2 to 19 mm, for example.

Note that in the first glass article 380, the first main surface 382 and the second main surface 384 are chemically reinforced. Further, the first glass article 380 has a chemically strengthened end face 386.

However, a chemically strengthened state may differ between the main surfaces 382, 384 and an end face 386, that is, a distribution state of introduced ions (alkali metal ions introduced by the chemical strengthening treatment) may differ between the main surfaces 382, 384 and an end face 386.

This difference will be described in more detail with reference to FIG. 13. Note that it is assumed that an end face 386 extends in a direction perpendicular to the main surfaces 382 and 384.

Figure 13:
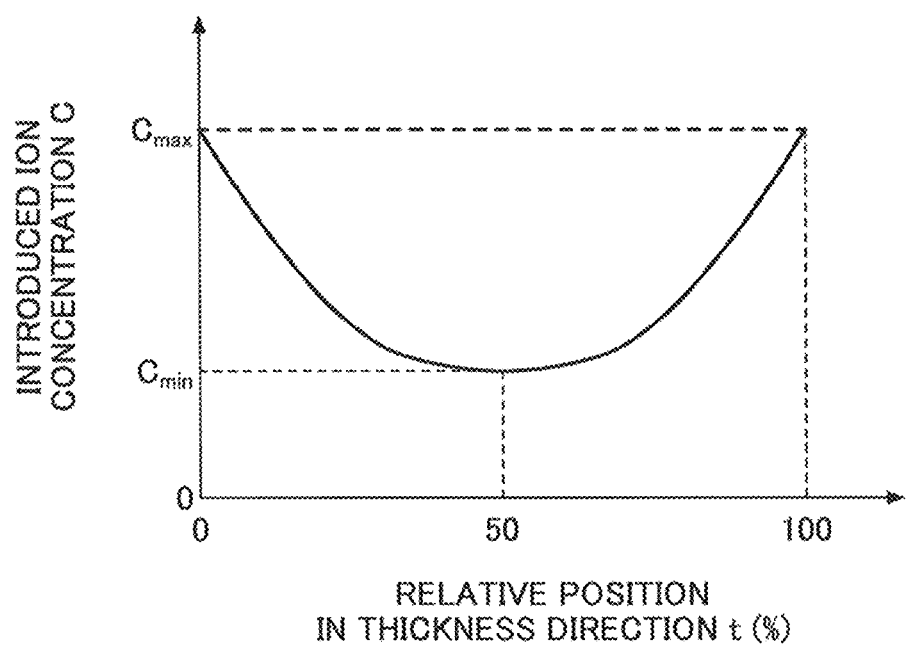
FIG. 13 is a diagram schematically illustrating a concentration profile of introduced ions in a thickness direction on one end face of a glass article according to an embodiment of the present invention.

FIG. 13 is a diagram schematically representing a concentration profile of the introduced ions in the thickness direction (Z direction) at one end face 386 (e.g., 386-1) of the first glass article 380. In FIG. 13, the horizontal axis indicates the relative position t (%) in the thickness direction, the first main surface 382 side corresponds to t=0%, and the second main surface 384 side corresponds to t=100%. The vertical axis indicates the concentration C of the introduced ions. As described above, the introduced ions indicate alkali metal ions introduced by the chemical strengthening treatment, that is, alkali metal ions to provide a compressive stress layer to the first main surface and the second main surface of the glass article for improving the strength of the main surfaces.

This concentration C is calculated by subtracting the concentration of alkali metal ions which are of the same type as the introduced ions contained in portions other than the main surfaces 382, 384 and the end surfaces 386-1 to 386-4 of the glass article 380, that is, by subtracting the concentration of alkali metal ions in the bulk portion of the glass article 380 (bulk concentration). Accordingly, the bulk concentration is approximately the same as the arithmetic mean concentration of alkali metal ions with respect to the volume of the glass material before the application of chemical strengthening treatment.

Note that the concentration profile as illustrated in FIG. 13 may be measured at each in-plane position (at any position along the Y direction) of the end face 386-1. However, insofar as the measured position is within the same end face 386-1 of the glass article 380, the tendency of the concentration profile will be almost the same regardless of the position in the end face 386-1.

As illustrated in FIG. 13, in the end face 386-1, the concentration C of the introduced ions along the thickness direction indicates a profile larger at the entire end face relative to the bulk concentration, which indicates a substantially parabolic profile in this example. That is, the concentration C of the introduced ions tends to indicate the maximum value $C_{max}$ on the first main surface 382 side (t=0%) and the second main surface 384 side (t=100%), and tends to indicate the minimum value $C_{min}$ at the central portion (t=50%) in the thickness direction. Here, the minimum value $C_{min}$>0.

Note that the shape of the concentration profile of the introduced ions varies with the thickness, material, producing conditions (conditions of chemical strengthening treatment, etc.), and the like of the first glass article 380. However, in any condition, the concentration at the entire end face is greater than the bulk concentration, and such a substantially parabolic profile is generated as one example. However, due to the effect of the chemical strengthening treatment method or the like, it is often accepted that the concentration C of the introduced ions does not match exactly at the first main surface 382 side (t=0%) and at the second main surface 384 side (t=100%). That is, it is frequently observed that the concentration C becomes C only on one of the main surfaces. The substantially parabolic profile here is different from the mathematical definition of a parabola; the concentration C of the introduced ions increases on the first main surface side and the second main surface with respect to the central portion in the thickness direction, and the introduced ion concentration in this concentration profile is higher than the bulk concentration of the glass article. Accordingly, this substantially parabolic profile indicates the concentration of introduction ions being higher than the bulk concentration of the glass article, and includes a profile of a substantially trapezoidal shape illustrating the introduced ions C exhibiting a relatively gradual change at the central portion in the thickness direction.

Note that when concentration (atomic ratio) of introduced ions normalized by silicon ions, that is, (the concentration C of the introduced ions)/(the concentration of the Si ions) is determined to be Cs, the ratio of the minimum value of Cs at the target end face to the Cs in the bulk is preferably 1.6 or more, more preferably 1.8 or more, and further preferably 2.2 or more.

In the first main surface 382 and the second main surface 384, the concentration of the introduced ions is substantially constant within a plane, and the concentration profile of such an end surface 386-1 is a distinct feature. In addition, a first glass article 380 having such a chemically strengthened end face 386 has not been recognized in the known technology.

For example, in a case where a glass article of a product shape is cut out from a glass material and the glass article is chemically strengthened, the concentration of the introduced ions at the end face of the obtained glass article is substantially constant in a plane. In that case, typically a profile as indicated by the broken line in FIG. 13 is obtained. That is, $C=C_{max}$ regardless of position. For example, when a glass article of product shape is cut out after the chemical strengthening treatment of a glass material, almost no introduced ions are detected on the cut end face of the obtained glass article. That is, $C \approx 0$.

The first glass article 380 has an end face 386 having a characteristic concentration profile of introduced ions as described above. Accordingly, the first glass article 380 has an excellent strength compared to a glass article obtained by cutting out a conventional chemically strengthened glass material.

The surface compressive stress of the first main surface 382 and the second main surface 384 of the first glass article 380 is, for example, in a range of 200 to 1000 MPa, and preferably in a range of 500 to 850 MPa. The surface compressive stress of the end surfaces 386-1 to 386-4 of the first glass article 380 has a minimum value of more than 0 MPa, for example, is in a range of 25 to 1000 MPa or more, preferably 50 to 850 MPa, and more preferably 100 to 850 MPa. Note that the surface compressive stress may be measured by for example, a surface stress measuring apparatus FSM-6000LE or FSM-7000H produced by Orihara Manufacturing Co., Ltd. using a photoelastic analysis method.

Note that the first glass article 380 may include one or two or more additional members on the first main surface 382, the second main surface 384, and/or an end surface 386.

Such additional members may be provided in the configuration of, for example, layers, membranes, films, and the like. Furthermore, such additional members may be provided on the first main surface 382, the second main surface 384, and/or an end surface 386 to develop functions such as low reflective properties and protection.

The first glass article 380 may be applied to an electronic apparatus (e.g., an information terminal apparatus such as a smartphone or a display), a cover glass of a camera or a sensor, architectural glass, glass for industrial transportation equipment, glass apparatus for biomedical use and the like.

(Glass Plate According to One Embodiment of the Present Invention)

Next, a glass plate according to an embodiment of the present invention will be described with reference to FIG. 14.

Figure 14:
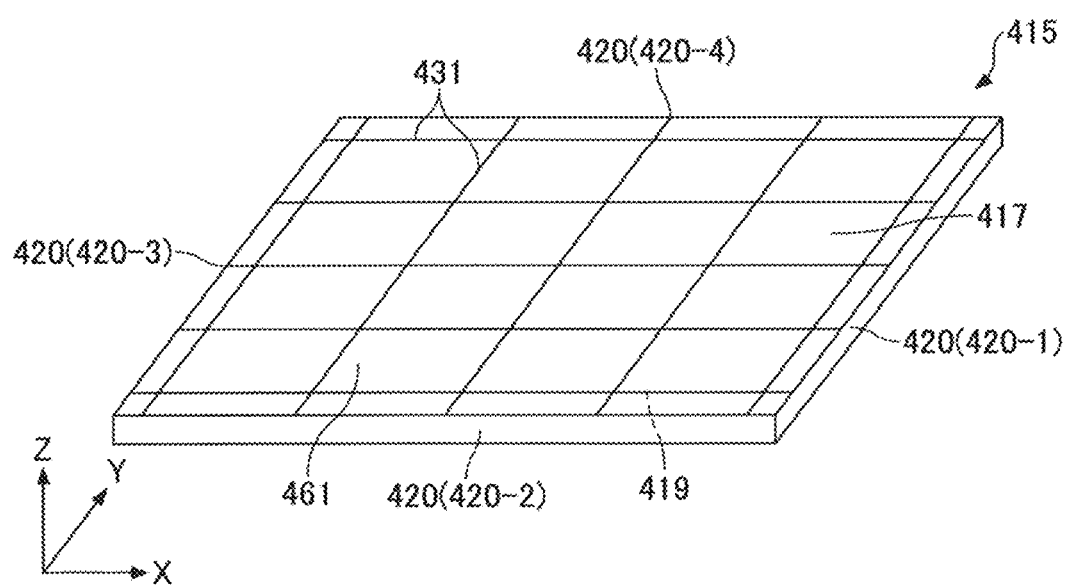
FIG. 14 is a diagram schematically illustrating a glass plate according to an embodiment of the present invention.

FIG. 14 is a diagram schematically illustrating a glass article (hereinafter referred to as "first glass plate") according to an embodiment of the present invention.

As illustrated in FIG. 14, a first glass plate 415 includes a first main surface 417 and a second main surface 419 opposite to each other, and four end surfaces 420 (420-1 to 420-4) connecting the first main surface 417 and the second main surface 419. Note that the first main surface 417 corresponds to the first main surface of the surfaces opposite to each other of the glass material plate and the second main surface 419 corresponds to the second main surface of the surfaces opposite to each other of the glass material plate.

A glass composition of the first glass plate 415 is not particularly specified insofar as the glass composition is capable of being chemically strengthened. The first glass plate 415 may be, for example, soda-lime glass, aluminosilicate glass, alkali aluminosilicate glass or the like.

The thickness of the first glass plate 415 is not particularly specified; the thickness of the glass material may be in a range of 0.1 to 6 mm, for example. The thickness of glass plates for buildings or vehicles may be in a range of 2 to 19 mm, for example. The shapes of the first main surface 417 and the second main surface 419 of the first glass plate 415 are not particularly specified. These shapes may include, for example, a rectangular shape, a circular shape, an elliptical shape or the like. Note that the first main surface 417 and the second main surface 419 are not necessarily flat and may be curved.

The first glass plate 415 has two or more in-plane void regions 431 on the first main surface 112, and two or more internal void rows (not viewable) are formed below (toward the second main surface) each in-plane void region 431. The internal void rows may extend parallel to the thickness direction (Z direction) of the first glass plate 415 or may be inclined with respect to the thickness direction of the first glass plate 415.

A portion bounded by respective in-plane void regions 431 with the corresponding internal void rows, that is, a portion bounded by the virtual end surfaces is referred to as a glass piece 461.

As is apparent from FIG. 14, the first glass plate 415 corresponds to the glass material 110 illustrated in FIG. 5 described above. Specifically, the first glass plate 415 is used as an intermediate body in a process until a glass article is produced from a glass material; in other words, the first glass plate 415 is used as a glass material before separating a glass article having a desired shape.

More specifically, in the first glass plate 415, it is possible to obtain a glass article (corresponding to the glass piece 461) by separating the glass piece 461 from the first glass plate 415 along the virtual end faces.

Such a "glass plate" is useful in a case where the step of producing the first glass plate 415 from the glass material and the step of separating the glass article from the first glass plate 415 are conducted by different persons or in different places, or in a case where these steps are performed at appropriate intervals in time.

With reference to FIGS. 15 to 18, the in-plane void regions 431 and the internal void rows included in the first glass plate 415 will be described in more detail.

Figure 15:
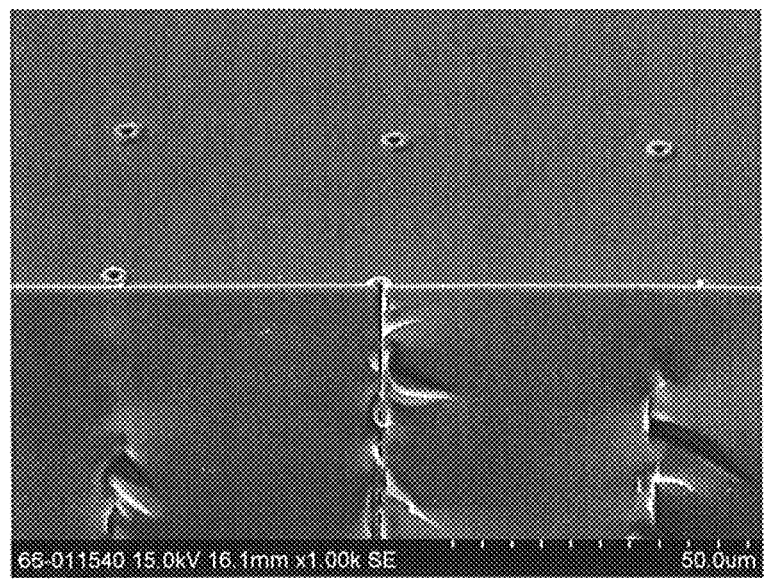
FIG. 15 is an SEM photograph illustrating examples of a first main surface and a cross section of a first glass plate.

FIG. 15 is an example of an SEM photograph including a first main surface 417 and a cross section of the first glass plate 415 depicted in FIG. 14. In FIG. 15, an upper side corresponds to the first main surface 417 of the first glass plate 415, and the lower side corresponds to the cross section of the first glass plate 415.

In the first main surface 417 of the first glass plate 415, two rows of surface voids are formed in the horizontal direction, and each row corresponds to the in-plane void region 431 illustrated in FIG. 14. In this example, each surface void has a diameter of approximately 2 μm and the distance P between adjacent surface voids is approximately 50 μm.

An altered portion (whitish ring-shaped region) having a width of approximately 1 to 2 μm is formed around each surface void. This seems to be a residual stress portion formed by the components of the first glass plate 415 melting during laser irradiation and subsequently solidifying of the melted components.

The cross section of the first glass plate 415 is substantially cut along one in-plane void region 431 with the corresponding internal void rows. Hence, this cross section corresponds to the virtual end face of the first glass plate 415. Note that to be accurate, this cross section is formed by manual cutting, and the cross section depicted does not include the leftmost surface voids. However, in FIG. 15, the configuration of the virtual end face may also be substantially identified. Hence, the cross-sectional portion in FIG. 15 will also be referred to as a virtual end face.

In FIG. 15, three internal void rows extending in vertical directions are observed in the depicted virtual end face. Referring to the most clearly observed central internal void row, two or more fine voids in this internal void row are arranged intermittently like "perforations". In the internal void example, several whisker-like cracks formed in an oblique direction, that is, the three whisker-like cracks observed in the central internal void row are due to manual cutting, and are not internal voids.

Figure 16:
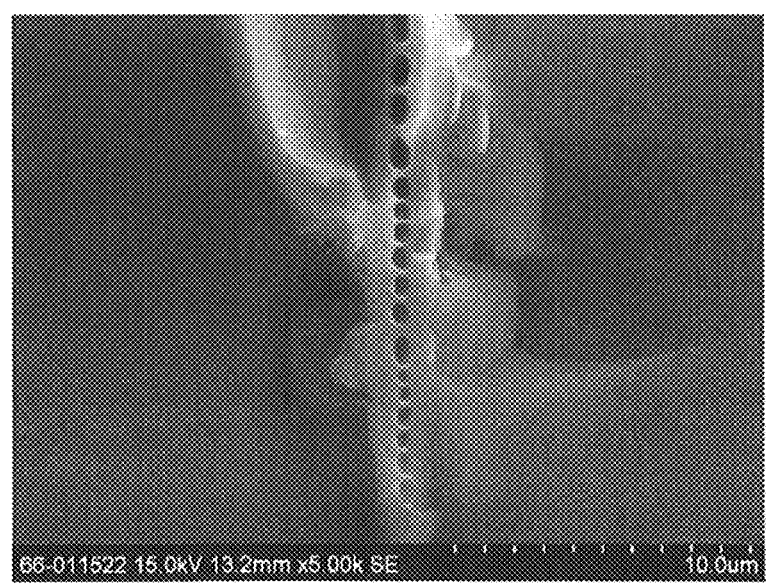
FIG. 16 is an SEM photograph illustrating an example of an internal void row in a virtual end face of a glass plate according to an embodiment of the present invention.

FIG. 16 is an example of an SEM photograph at another virtual end face corresponding to the first glass plate 415. In FIG. 16, an upper side corresponds to the first main surface 417 side of the first glass plate 415, and a lower side corresponds to the second main surface 419 side.

According to this photograph, a large number of voids are formed in a row in the virtual end face from the first main surface 417 toward the second main surface 419, thereby forming one internal void row.

In the photograph of FIG. 16, each void forming the internal void row has a maximum length (length in the longitudinal direction) of approximately 0.5 to 1.5 μm, and the shape of the void is substantially circular, substantially elliptical, substantially rectangular shape, and the like. The measure of the dividing walls between adjacent voids is approximately 0.2 to 0.5 μm.

Figure 17:
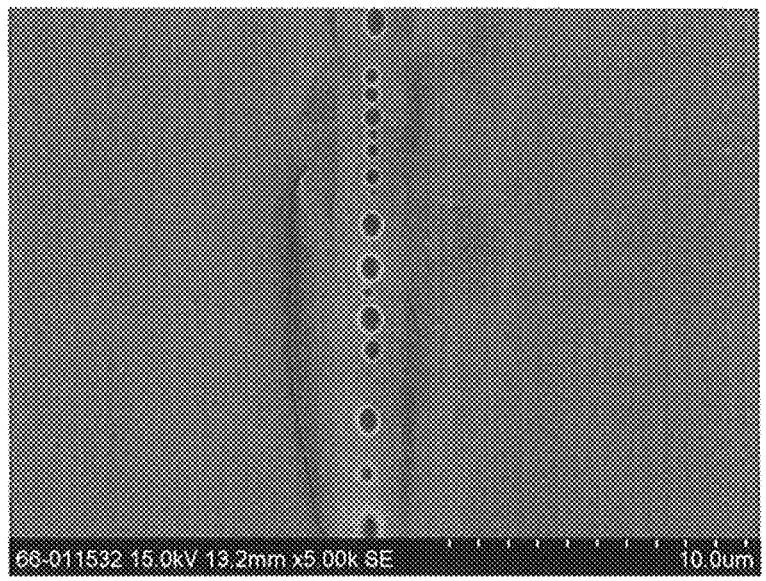
FIG. 17 is an SEM photograph illustrating an example of an internal void row in a virtual end face of a glass plate according to an embodiment of the present invention.
Figure 18:
FIG. 18 is an SEM photograph illustrating an example of an internal void row in a virtual end face of a glass plate according to an embodiment of the present invention.

FIGS. 17 and 18 are each an example of an SEM photograph at another virtual end face corresponding to the first glass plate 415.

In the example depicted in FIG. 17, one internal void row formed in the virtual end face is composed of a void having a size of approximately 0.5 to 1.5 μm. The shape of the void is substantially circular or substantially elliptical. The measure of the dividing walls between adjacent voids is approximately 0.1 to 2 µm. In the example shown in FIG. 18, one internal void row formed in the virtual end face is composed of a long and thin void having a size of approximately 3 to 6 µm. The measure of the dividing walls between adjacent voids is approximately 0.8 µm.

As described above, the configuration of the internal void rows included in the virtual end face of the first glass plate 415, and further, the configuration of a group of voids (void group) forming the first void row is not particularly specified. The configuration of the void group may variously change with the glass composition of the first glass plate 415, laser irradiation conditions, and the like. Note that microcracks may be formed along the internal void row due to the stress at the time of void formation, and the group of voids may be connected by the microcracks to the extent that the glass material is not separated along the in-plane void region. This configuration may be preferable in view of penetration of the molten salt into the glass material during chemical strengthening treatment.

Typically, however, the size of the voids forming the internal void row in the direction along the internal void row is in a range of 0.1 to 1000 µm, preferably in a range of 0.5 to 100 µm, more preferably in a range of 0.5 to 50 µm. Further, the shape of the voids forming the internal void row may be rectangular, circular, elliptical, or the like. Furthermore, the thickness of the dividing walls between adjacent voids is typically in a range of 0.1 to 10 µm.

Similarly, the size of the surface voids forming the in-plane void region 431 may variously change with the glass composition of the first glass plate 415, the laser irradiation conditions, and the like. The diameter of the surface voids is typically in a range of 0.2 to 10 µm, for example in a range of 0.5 to 5 µm. The distance P (see FIG. 3) between the centers of the adjacent surface voids is in a range of 1 to 20 µm, for example, in a range of 2 to 10 µm. The smaller the distance P between the centers of the adjacent surface voids, the easier the glass article may be separated from the first glass plate 415; however, since the number of repetitions of laser irradiation increases, given constraints on processing speeds, a high-power oscillator will be required.

Note that referring back to FIG. 14, in the first glass plate 417, the first main surface 417 and the second main surface 419 are chemically strengthened. Note that the four end faces 420 may or may not be chemically strengthened. In addition, in the first glass plate 415, the periphery of each glass piece 461, that is, the virtual end face is chemically strengthened.

Note that a chemically strengthened state, that is, a distribution state of introduced ions differs between the main surfaces 417, 419 and the virtual end faces.

That is, the introduced ions in the virtual end face are distributed along the extending direction of the internal void row as depicted in FIG. 13; that is, the introduced ions represent the concentration profile such as a half region with respect to a substantially parabolic shape or a substantially parabolic axis of symmetry.

Note that the concentration profile as illustrated in FIG. 13 does not exhibit a significant change even when the measurement position in the virtual end face is changed; the tendency of the concentration profile evaluated at any position within the same virtual end surface will be almost the same.

With respect to the first glass plate 415, in the main surface 417 and the second main surface 419, the concentration of the introduced ions is substantially constant within the plane; the concentration profile of such an end surface indicates a distinct feature. In addition, a first glass plate 415 having such a chemically strengthened virtual end face has not been recognized in the known technology.

Note that according to the inventors of the present invention, the virtual end faces of the first glass plate 415 are chemically strengthened together with the first main surface 417 and the second main surface 419, when applying a typical chemical strengthening treatment to the first glass plate 415.

Accordingly, it may be considered that during the chemical strengthening treatment of the glass material of the first glass plate 415, a molten salt is introduced into the first glass plate 415 via intermittent voids contained in the virtual end face, and the virtual end face is further chemically strengthened by the substitution reaction occurring between the introduced molten salt and the virtual end face.

The first glass plate 415 having such a feature may be used as a supply member for providing a glass article. In particular, in the first glass plate 415, the virtual end face is chemically strengthened, and the glass article obtained from the first glass plate 415 thus has chemically strengthened ends. Therefore, a glass article having sufficient strength may be provided by using the first glass plate 415. In addition, since an end face of a glass article does not appear from before chemical strengthening the first glass plate 415 until separating the glass article from the first glass plate 415, the first glass plate 415 may be handled as a large plate as compared with a glass article. Hence, the surface of the glass plate and the virtual end face of the first glass plate 415 are unlikely to be scratched, and the deterioration of the strength is significantly controlled against.

Note that the first glass plate 415 may include one or two or more additional members on at least one of the first main surface 417, the second main surface 419, and the end surface 420.

Such additional members may be provided in the configuration of, for example, layers, membranes, films, and the like. Further, since such an additional member may exhibit functions such as a low reflection function, high reflection function, wavelength selection function such as IR absorption function or UV absorption function, anti-glare function, anti-fingerprint function, anti-fog function, a printing function and a multilayer configuration function of the printing function, the additional member may be provided on at least one of the first main surface 417, the second main surface 419, and the end surface 420.

(Pre-Splitting Outcome and Countermeasures)

Next, the "pre-splitting outcome" and its countermeasures will be described.

The pre-splitting outcome herein indicates an event or an incident in which a glass material (or a glass plate) is split into two or more parts at an unintended stage prior to the actual separating step. The pre-splitting outcome tends to occur in a glass material in which a splitting line (e.g., the aforementioned in-plane void region or the like) is formed. When such a pre-splitting outcome occurs, subsequent handling of the glass plate becomes complicated; it is preferable to control against the pre-splitting outcome to occur minimally.

The following describes countermeasures for controlling against the pre-splitting outcome.

Note that this case assumes a glass plate that includes the following features:

a first main surface and a second main surface opposite to each other; and an end surface connecting the first main surface and the second main surface via a connection line, wherein the first main surface includes a two or more of splitting lines, the splitting lines include one or more product lines and one or more release lines, the product line corresponds to an outline of a glass article separated and acquired from the glass plate, the release line corresponds to a portion of the splitting line other than a portion corresponding to the product line, and the splitting lines each extend in a depth direction from the first main surface toward the second main surface.

In such a glass plate, in order to control against the pre-splitting outcomes, it is effective to adopt one of the following features as a configuration of the splitting line:

(I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass plate.

By adopting any one of these configurations, it is possible to control against the disadvantageous pre-splitting outcome.

Each configuration will be described below.

(Glass Plate for Controlling Against Pre-Splitting Outcome)

Figure 19:
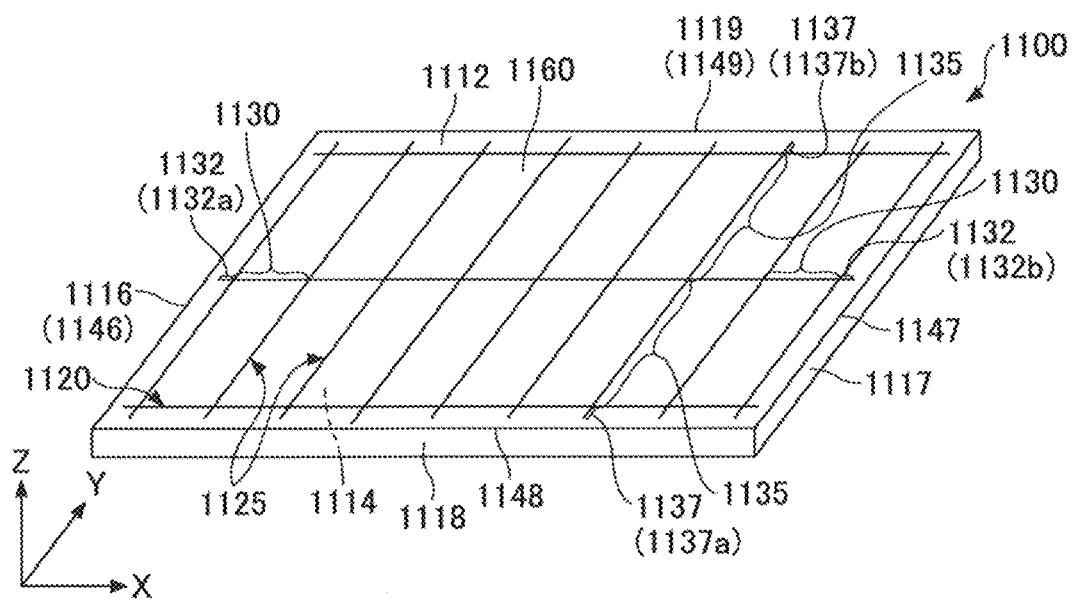
FIG. 19 is a schematic perspective diagram of a glass plate for controlling against a pre-splitting outcome.

With reference to FIG. 19, a specific configuration of the glass plate for controlling against a pre-splitting outcome will be described.

FIG. 19 is a diagram illustrating a schematic perspective diagram of such a glass plate (hereinafter referred to as "eleventh glass plate").

As illustrated in FIG. 19, an eleventh glass plate 1100 has a first main surface 1112 and a second main surface 1114. Note that in FIG. 19, the second main surface 1114 is visually unrecognized. The eleventh glass plate 1100 has four end faces 1116, 1117, 1118, and 1119 connecting the first main surface 1112 and the second main surface 1114.

The eleventh glass plate 1100 has a substantially rectangular shape in a top view. Accordingly, the first end surface 1116 and the second end surface 1117 are opposite to each other, and the third end surface 1118 and the fourth end surface 1119 are also opposite to each other.

In the following description, an adjacent (boundary) portion between the first main surface 1112 and each of the end surfaces 1116 to 1119 is referred to as a "connection line". Specifically, the first main surface 1112 and the first end surface 1116 are connected by a first connection line 1146, the first main surface 1112 and the second end surface 1117 are connected by a second connection line 1147, the first main surface 1112 and the third end surface 1118 are connected by a third connection line 1148, and the first main surface 1112 and the fourth end surface 1119 are connected by a fourth connection line 1149.

Referring back to FIG. 19, the eleventh glass plate 1100 has, on a first main surface 1112, three splitting lines 1120 extending along a longitudinal direction (X direction) and nine splitting lines 1125 extending along a width direction (Y direction).

Each of piece portions bounded by the splitting lines 1120 and 1125 corresponds to a glass article 1160 separated and acquired from the eleventh glass plate 1100 in a later separating step. According to the example illustrated in FIG. 19, in the separating step, a total number of 16 substantially rectangular glass articles 1160 may be separated and acquired from the eleventh glass plate 1100.

In the example depicted in FIG. 19, each X direction splitting line 1120 is composed of a X direction product line 1130 and a X direction release line 1132.

Note that the X direction product line 1130 refers to a part of a X direction splitting line 1120, which forms at least a part of the outline of the glass article 1160 that is separated from the first glass plate 1100. The X direction release line 1132 indicates a part of the X direction splitting line 1120 other than the product line 1130.

According to this definition, in the example of FIG. 19, one X direction splitting line 1120 has a first release line 1132a extending from the vicinity of the first connection line 1146 to the leftmost product line 1130, a total number of eight X direction product lines 1130 and a second release line 1132b extending from the rightmost product line 1130 to the vicinity of the second connection line 1147.

Similarly, a Y direction splitting line 1125 has a Y direction product line 1135 and a Y direction release line 1137. For example, in the example of FIG. 19, one Y direction splitting line 1125 has a second release line 1137a extending from the vicinity of a third connection line 1148 to the lowermost product line 1135 and a total number of two Y direction product lines 1135 and a second release line 1137b extending from the uppermost product line 1135 to the vicinity of a fourth connection line 1149.

The eleventh glass plate 1100 has chemically strengthened first main surface 1112 and second main surface 1114, and chemically strengthened first end surface 1116, second end surface 1117, third end surface 1118 and fourth end surface 1119. Further, the eleventh glass plate 1100 has the above-mentioned features. That is, in a cut surface of the glass article 1160 obtained by cutting the eleventh glass plate 1100 along the product lines 1130 and 1135, a concentration profile of predetermined alkali metal ions from the first main surface 1112 to the second main surface 1114 indicates a substantially parabolic profile exhibiting concentration of the alkali metal ions higher toward the first main surface 1112 side and the second main surface 1114 side. Further, in the cut surface, the concentration of the alkali metal ions is higher than the bulk concentration of the eleventh glass plate 1100.

Note that the eleventh glass plate 1100 has the characteristic (I) illustrated in the above-mentioned part of (pre-splitting outcome and its countermeasures).

That is, the eleventh glass plate 1100 includes the X direction release lines 1132 (1132a, 1132b) and the Y direction release lines 1137 (1137a, 1137b) that are not connected to corresponding connection lines 1146 to 1149.

As a result, neither the X-direction splitting lines 1120 nor the Y-direction splitting lines 1125 completely traverse the first main surface 1112.

For example, in the example depicted in FIG. 19, a first end (i.e., a first X direction release line 1132a) of the X direction splitting line 1120 is present in the vicinity of the first connection line 1146, and a second end (i.e., a second X direction release line 1132b) of the X direction splitting line 1120 is present in the vicinity of the second connection line 1147. Further, a first end (i.e., a first Y direction release line 1137*a*) of the Y direction splitting line 1125 is present in the vicinity of the third connection line 1148, and a second end (i.e., a second Y direction release line 1137*b*) of the Y direction splitting line 1125 is present in the vicinity of the fourth connection line 1149.

Note that "the splitting line (or release line) is present in the vicinity of the connection line" indicates that a tip of the splitting line (or release line) closest to the connection line present on an extension of the splitting line (or release line) is located at a distance within 5 mm (excluding 0 mm) from the connection line, and preferably at a distance within 3 mm (excluding 0 mm) from the connection line.

In a case where the eleventh glass plate 1100 having such features is used, even when stress is applied to the eleventh glass plate 1100, specifically to the splitting lines 1120 and 1125, at an unintended stage, it is possible to significantly control against allowing the splitting lines 1120 and 1125 to completely traverse from one connection line to another connection line on the first main surface 1112.

As a result, in the eleventh glass plate 1100, a pre-splitting outcome, in which the eleventh glass plate 1100 is split at an unintended stage, may be significantly controlled against.

For example, a pre-splitting outcome may be controlled against in a step of chemically strengthening the glass material having the splitting lines 1120 and 1125 in producing the eleventh glass plate 1100.

(Splitting Lines 1120 and 1125)

In the following, the splitting lines 1120 and 1125 will be described in more detail.

The X direction product lines 1130 and the Y direction product lines 1135 are formed by laser irradiation. That is, the X direction product lines 1130 and the Y direction product lines 1135 correspond to laser modified regions. As a laser that may be used for forming such laser modified regions, a short pulsed-laser with a pulse width of femtosecond order to nanosecond order, i.e., $1.0 \times 10^{-15}$ to $9.9 \times 10^{-9}$ seconds may be given.

In contrast, the X direction release lines 1132 and the Y direction release lines 1137 are not necessarily formed by laser irradiation.

For example, the X direction release lines 1132 and the Y direction release lines 1137 may be formed by a machining process using a glass cutter and a grinding stone. Note that when the X direction release lines 1132 and the Y direction release lines 1137 are formed by laser irradiation similar to the X direction product lines 1130 and the Y direction product lines 1135, one splitting line 1120, 1125 may be formed at a time. Hence, efficient laser irradiation may be performed to reduce the production cost.

With respect to the depth direction, it is preferable that the X direction product lines 1130 and the Y direction product lines 1135 extend from the first main surface 1112 to the second main surface 1114. In this case, the glass articles 1160 may be easily separated from the eleventh glass plate 1100 in a separating-acquiring step.

Meanwhile, the X direction release lines 1132 and/or the Y direction release lines 1137 do not necessarily have to extend from the first main surface 1112 to the second main surface 1114. For example, the X direction release lines 1132 and/or the Y direction release lines 1137 may be terminated in the vicinity of the second main surface 1114 and may extend from the first main surface 1112 to the vicinity of the second main surface 1114. By having such a configuration, the pre-splitting outcome may be controlled against more reliably.

The above description illustrates the features of the eleventh glass plate 1100 by giving a case in which the splitting lines 1120 and 1125 are substantially linear. The above-described case is merely an example; the splitting lines 1120 and 1125 may be curved. Alternatively, the splitting lines 1120 and 1125 may be formed by a combination of a straight line and a curved line.

The above description further illustrates a case in which the outline of the glass article 1160 has a substantially rectangular shape and the single glass article 1160 is composed of multiple (four) product lines 1130 and 1135. The outline of the glass article 1160 is not necessarily substantially rectangular. The number of product lines forming one glass article 1160 is also not particularly specified. For example, it is assumed that the product line forms one closed loop. In this case, the number of product lines forming one glass article 1160 is one.

(Additional Features)

Next, additional features of the eleventh glass plate 1100 other than the above-described features will be described.

In the above description, the splitting lines 1120 and 1125 may substantially be composed of continuous laser modified regions (corresponding to the above-described in-plane void regions; the same applies hereinafter).

In a case where the release lines 1132 and 1137 are formed by laser irradiation, at least one release line 1132 and 1137 may have a "missing" part of the laser modification region.

This configuration will be described with reference to FIG. 20.

Figure 20:
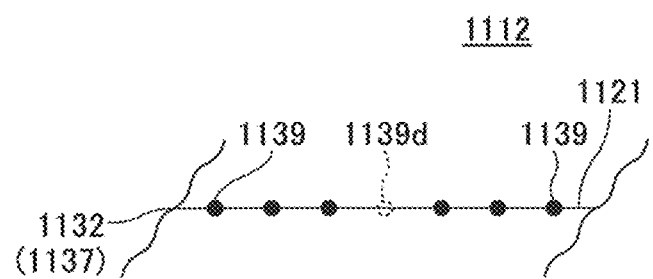
FIG. 20 is a schematic partial enlarged view of a release line formed on a first main surface of a glass plate.

FIG. 20 is a diagram schematically depicting a partial enlarged view of a release line 1132 (or release line 1137, hereinafter the same) formed on the first main surface 1112 of the eleventh glass plate 1100.

As described above, the release line 1132 is formed by laser irradiation and has a surface void row, that is, a laser modification region.

As illustrated in FIG. 20, in the laser modified region 1121, microscopically, a large number of surface voids 1139 are arranged linearly at equal intervals or at non-equal intervals. Note that adjacent surface voids 1139 may be connected to each other to form a larger surface void in some cases. Further, this connection may be repeated to sometimes result in forming substantially "linear" surface voids.

In FIG. 20, each of the surface voids 1139 on the first main surface 1112 is depicted as a circle; this circular shape is only an example. The surface void 1139 may have various shapes, such as a circle, an ellipse, and a rounded rectangle, in accordance with laser irradiation and scanning conditions.

Note that the release line 1132, which is the laser modified region 1121, has a missing part 1139*d* at a position where the surface void 1139 should originally be formed, and the surface void 1139 does not reside in this missing part 1139*d*.

When such a missing part 1139*d* is intentionally provided in the release line 1132, a surface void 1139 is formed by irradiating the missing part 1139*d* with a laser at a later necessary timing to thereby "complete" the release line 1132.

Accordingly, in the eleventh glass plate 1100 on which the release line 1132 having such a missing part 1139*d* is formed, it is possible to more reliably control against the pre-splitting outcome during handling. In addition, in the subsequent separating-acquiring step of the glass article 1160, it is possible to easily separate and acquire the glass article 1160 by irradiating the missing part 1139*d* with a laser.

(Another Glass Plate for Controlling Against Pre-Splitting Outcome)

Figure 21:
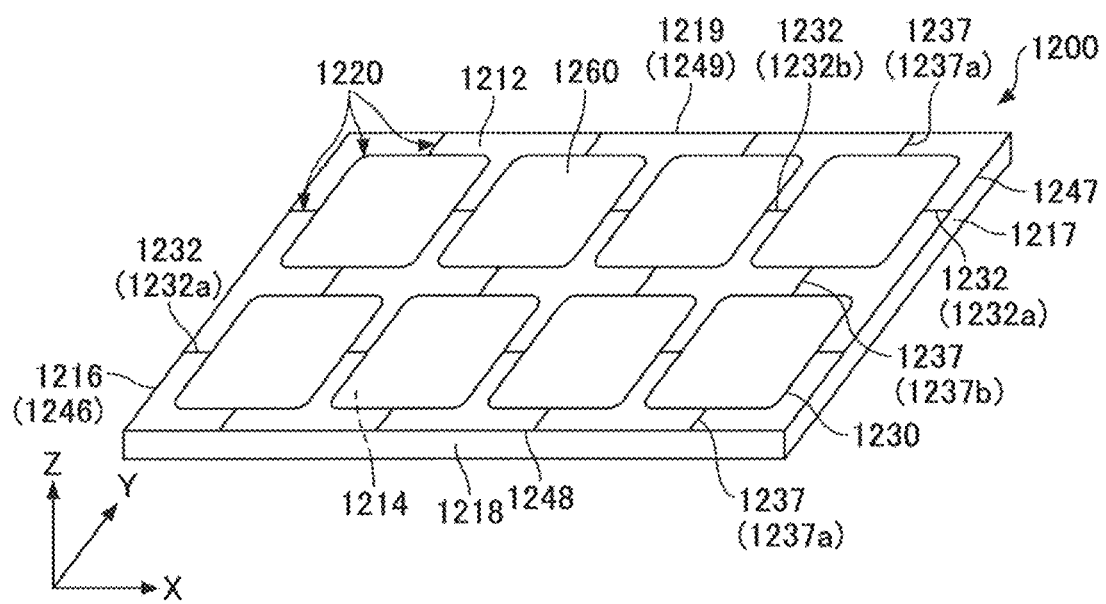
FIG. 21 is another schematic perspective diagram of a glass plate for controlling against a pre-splitting outcome.

Next, with reference to FIG. 21, a specific configuration of another glass plate for controlling against a pre-splitting outcome will be described. FIG. 21 is a schematic perspective diagram of such a glass plate (hereinafter referred to as "twelfth glass plate") for controlling against a pre-splitting outcome.

As illustrated in FIG. 21, a twelfth glass plate 1200 has a first main surface 1212 and a second main surface 1214. Note that in FIG. 21, the second main surface 1214 is not viewable. The twelfth glass plate 1200 has four end faces 1216, 1217, 1218, and 1219 connecting the first main surface 1212 and the second main surface 1214.

The twelfth glass plate 1200 has a substantially rectangular shape in a top view. Accordingly, the first end surface 1216 and the second end surface 1217 are opposite to each other, and the third end surface 1218 and the fourth end surface 1219 are also opposite to each other.

As described above, the first main surface 1212 and the first end surface 1216 are connected by a first connection line 1246, the first main surface 1212 and the second end surface 1217 are connected by a second connection line 1247, the first main surface 1212 and the third end surface 1218 are connected by a third connection line 1248, and the first main surface 1212 and the fourth end surface 1219 are connected by a fourth connection line 1249.

Referring back to FIG. 21, the twelfth glass plate 1200 has multiple splitting lines 1220 on a first main surface 1212. The splitting lines 1220 include a product line 1230, a release line 1232 extending in an X direction, and a release line 1237 extending in a Y direction.

In FIG. 21, the product line 1230 has a substantially rectangular shape with rounded corners, and a total number of eight glass articles 1260 (i.e., 2 vertically×4 horizontally) may be separated from the twelfth glass plate 1200. Note that this is merely an example; the configuration of the product line 1230, the number of the separable glass articles 1260, and the like are not particularly specified.

In the example illustrated in FIG. 21, the release lines 1232 in the X direction (hereinafter referred to as "X direction release line(s) 1232") include first release lines 1232a (a total number of four), one end of which is not connected to the product line 1230, and second release lines 1232b (a total number of six), each of which connects the adjacent product lines 1230. The first release line 1232a has one end connected to the product line 1230 and the other end connected to the corresponding connection line 1246 or 1247.

In addition, the release lines 1237 in the Y direction (hereinafter referred to as "Y direction release line(s) 1237") include first release lines 1237a (a total number of eight), one end of which is not connected to the product line 1230, and second release lines 1237b (a total number of four), each of which connects the adjacent product lines 1230. The first release line 1237a has one end connected to the product line 1230 and the other end connected to the corresponding connection line 1248 or 1249.

The twelfth glass plate 1200 has first main surface 1212 and second main surface 1214 that are chemically strengthened, and first end surface 1216, second end surface 1217, third end surface 1218 and fourth end surface 1219 that are chemically strengthened. Further, the twelfth glass plate 1200 has the above-mentioned features.

That is, in a cut surface of the glass article 1260 obtained by cutting the twelfth glass plate 1200 along the product lines 1230 and 1235, a concentration profile of predetermined alkali metal ions from the first main surface 1212 to the second main surface 1214 indicates a parabolic profile exhibiting concentration of the alkali metal ions higher toward the first main surface 1212 side and the second main surface 1214 side. Further, in the cut surface, the concentration of the alkali metal ions is higher than the bulk concentration of the twelfth glass plate 1200.

Note that the twelfth glass plate 1200 has the features illustrated in (I) and (i) of the above-mentioned part of (pre-splitting outcome and its countermeasures).

That is, in the twelfth glass plate 1200, the first X direction release line 1232a has a first end portion connected to the first connection line 1246 or the second connection line 1247 on the first main surface 1212. Further, the first Y direction release line 1237a has a first end portion connected to the third connection line 1248 or the fourth connection line 1249.

Note that the first X direction release line 1232a has a second end portion connected to the product line 1230 such that further extension of the first X direction release line 1232a is prevented by the product line 1230. Likewise, the first Y direction release line 1237a has a second end portion connected to the product line 1230 such that further extension of the first Y direction release line 1237a is prevented by the product line 1230.

Note that the meaning of the phrase "further extension of the release line is prevented" indicates that when a virtual extrapolation line of the first release line is drawn at the intersection of the first release line and the product line, the extrapolation line of the first release line does not substantially match the product line.

Figure 22:
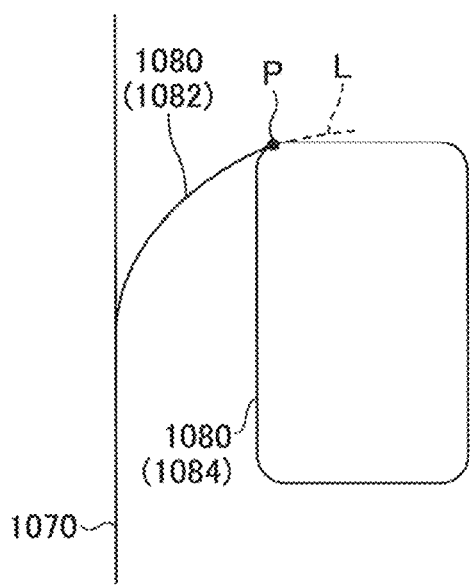
FIG. 22 is a diagram schematically illustrating an example of a relationship between a release line and a product line.

As illustrated in an example of the splitting line 1080 in FIG. 22, when a virtual extrapolation line L with respect to the release line 1082 having one end connected to the connection line 1070 is drawn from an intersection point P of the release line 1082 with the product line 1084, the extrapolation line L substantially matches the product line 1084 at least in the vicinity of the intersection point P. Hence, the configuration of such a splitting line 1080 fails to indicate that "further extension of the release line 1082 is prevented" by the product line 1084.

Figure 23:
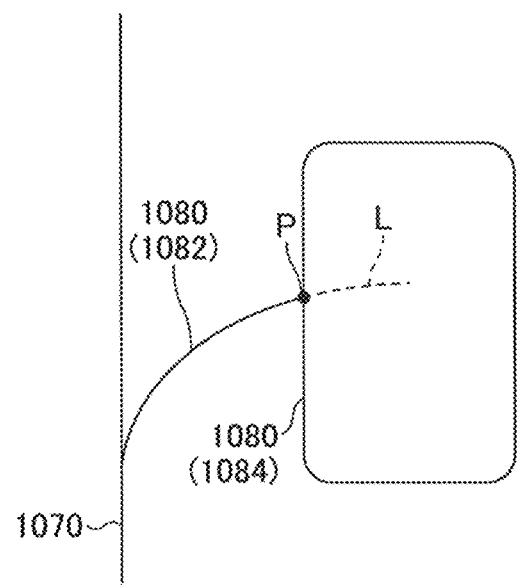
FIG. 23 is a diagram schematically illustrating another example of a relationship between a release line and a product line.

In an example of the splitting line 1080 in FIG. 23, when a virtual extrapolation line L with respect to the release line 1082 having one end connected to the connection line 1070 is drawn from an intersection point P of the release line 1082 with the product line 1084, the extrapolation line L does not substantially match the product line 1084 at least in the vicinity of the intersection point P. Hence, the configuration of such a splitting line 1080 indicates that "further extension of the release line 1082 is prevented" by the product line 1084.

Referring back to FIG. 21, in the twelfth glass plate 1200, the first X direction release lines 1232a are each arranged such that further extension is prevented by corresponding intervening product lines 1230.

In this case, a combination of the first X direction release line 1232a, an (X component of) the product line 1230, and the second X direction release line 1232b will not form a "continuous line segment" penetrating from one connection line (e.g., 1246) to another connection line (e.g., 1247).

Likewise, the Y direction release lines 1237 are each arranged such that further extension is prevented by corresponding intervening product lines 1230.

In this case, a combination of the first Y direction release line 1237a, a (Y component of) the product line 1230, and the second Y direction release line 1237b will not form a "continuous line segment" penetrating from one connection line (e.g., 1248) to another connection line (e.g., 1249).

Thus, in the twelfth glass plate 1200, even when stress is applied to the splitting lines of the twelfth glass plate 1200, the splitting lines are controlled so as not to completely traverse from one connection line to another connection line on the first main surface 1212.

As a result, in the twelfth glass plate 1200, the pre-splitting outcome, in which the twelfth glass plate 1200 is split at an unintended stage, may be significantly controlled against.

For example, a pre-splitting outcome may be controlled against in a step of chemically strengthening the glass material having the splitting lines 1220 in producing the twelfth glass plate 1200.

Figure 24:
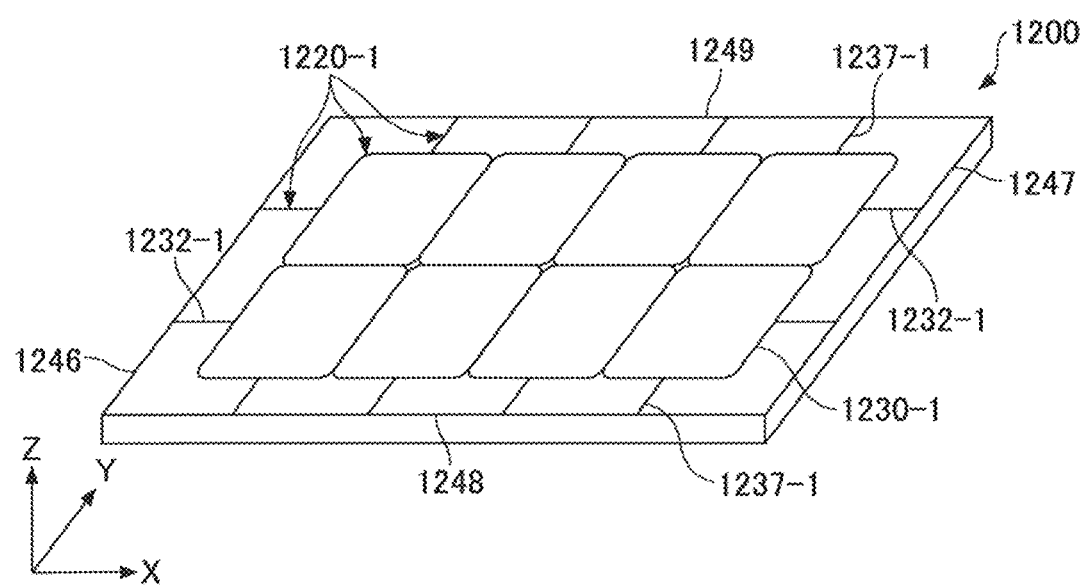
FIG. 24 is a diagram illustrating an aspect of a splitting line in a glass plate for controlling against a pre-splitting outcome.
Figure 25:
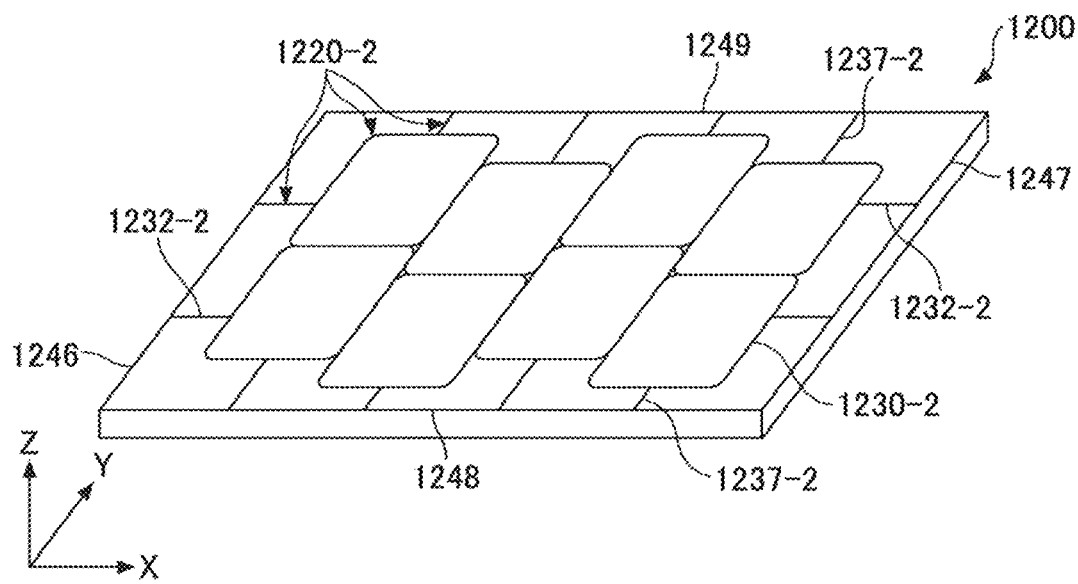
FIG. 25 is a diagram illustrating an aspect of a splitting line in a glass plate for controlling against a pre-splitting outcome.
Figure 26:
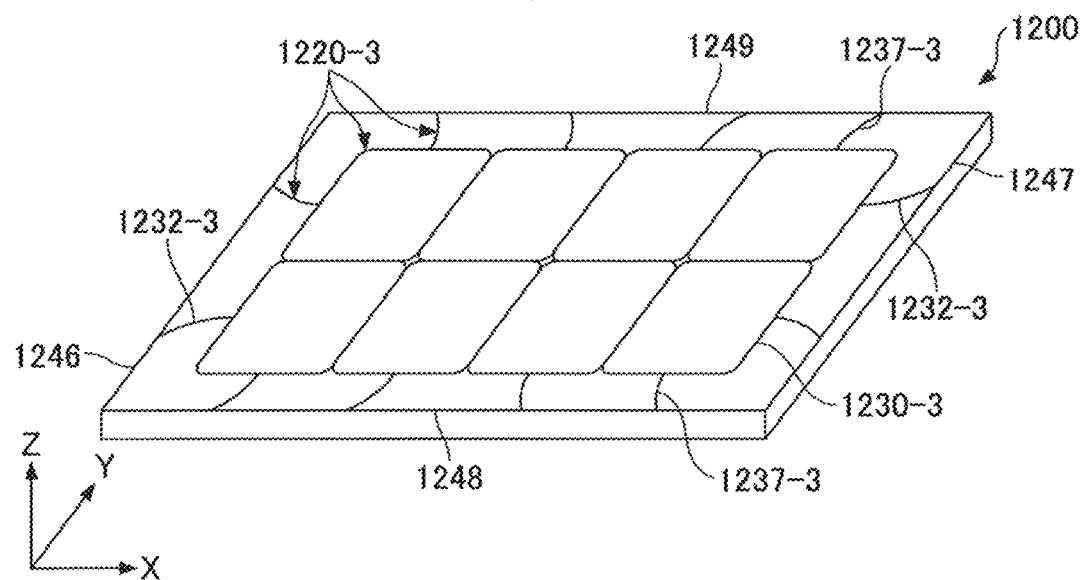
FIG. 26 is a diagram illustrating an aspect of a splitting line in a glass plate for controlling against a pre-splitting outcome.

Note that a configuration of the splitting lines 1220 for obtaining such an effect is not limited to the arrangement illustrated in FIG. 21. For example, the splitting lines may have configurations as illustrated in FIGS. 24 to 26 below.

In the example illustrated in FIG. 24, the splitting lines 1220-1 include a product line 1230-1, a release line 1232-1 extending in an X direction (hereinafter referred to as "X direction release line 1232-1"), and a release line 1237-1 extending in a Y direction (hereinafter referred to as "Y direction release line 1237-1").

The product lines 1230-1 are arranged such that adjacent product lines share one side in contact with each other. Hence, one end of the release line 1232-1 extending in the X direction is connected to the connection line 1246 or 1247, and the other end of the release line 1232-1 is connected to the product line 1230-1. That is, in this example, there is no second release line 1232b as illustrated in FIG. 21.

Hence, one end of the release line 1237-1 extending in the Y direction is connected to the connection line 1248 or 1249, and the other end of the release line 1237-1 is connected to the product line 1230-1. That is, in this example, there is no second release line 1237b as illustrated in FIG. 21.

In the example illustrated in FIG. 25, which is similar to the example of FIG. 24, splitting lines 1220-2 include a product line 1230-2, a release line 1232-2 extending in an X direction (hereinafter referred to as "X direction release line 1232-2"), and a release line 1237-2 extending in a Y direction (hereinafter referred to as "Y direction release line 1237-2").

Note that unlike the example of FIG. 24, the product lines 1230-2 adjacent in the X direction have mutually different height levels (zigzag height arrangement). Hence, although release lines 1232-2 extending in the X direction have substantially the same length, the release lines 1237-2 extending in the Y direction each have a length differing from that of the adjacent release line 1237-2.

In an example illustrated in FIG. 26, which is similar to the example of FIG. 24, splitting lines 1220-3 include a product line 1230-3, a release line 1232-3 substantially extending in an X direction (hereinafter referred to as "X direction release line 1232-3"), and a release line 1237-3 substantially extending in a Y direction (hereinafter referred to as "Y direction release line 1237-3").

Note that unlike the example of FIG. 24, in this example, the X direction release line 1232-3 and/or the Y direction release line 1237-3 are composed of curved lines.

As described above, there may be various configurations of splitting lines 1220.

These examples are merely examples, and various configurations may be put forward besides those illustrated above.

For example, in the splitting lines 1220 illustrated in FIG. 21, the X direction release lines 1232 and/or the Y direction release lines 1237 may be formed in a curved line. Likewise, in the splitting lines 1220-2 illustrated in FIG. 25, the X direction release lines 1232-2 and/or the Y direction release lines 1237-2 may be formed in a curved line.

Further, as described in the configuration of the eleventh glass plate 1100, in the first X direction release lines 1232a (FIG. 21), 1232-1 (FIG. 24), 1232-2 (FIG. 25) and 1232-3 (FIG. 26), one end portion is not necessarily connected to the corresponding connection line and may be terminated in the vicinity of the corresponding connection line.

Further, in the first Y direction release lines 1237a (FIG. 21), 1237-1 (FIG. 24), 1237-2 (FIG. 25) and 1237-3 (FIG. 26), one end portion is not necessarily connected to the corresponding connection line and may be terminated in the vicinity of the corresponding connection line.

Further, in the release lines illustrated in FIGS. 21 to 26, at least one release line may have a "missing" portion as described above.

Furthermore, the release lines 1232a and 1237a in FIG. 21, the release lines 1232-1 and 1237-1 in FIG. 24, and the release lines 1232-2 and 1237-2 in FIG. 25 are arranged such that one end is not connected to a corner of the product line or in the vicinity of the corner, but is connected to one side of the corresponding product line. In this case, the pre-splitting outcome is less likely to occur relative to the case where the release line is connected to a corner of the product line.

(Still Another Glass Plate for Controlling Against Pre-Splitting Outcome)

Next, with reference to FIG. 27, a specific configuration of still another glass plate for controlling against a pre-splitting outcome will be described.

Figure 27:
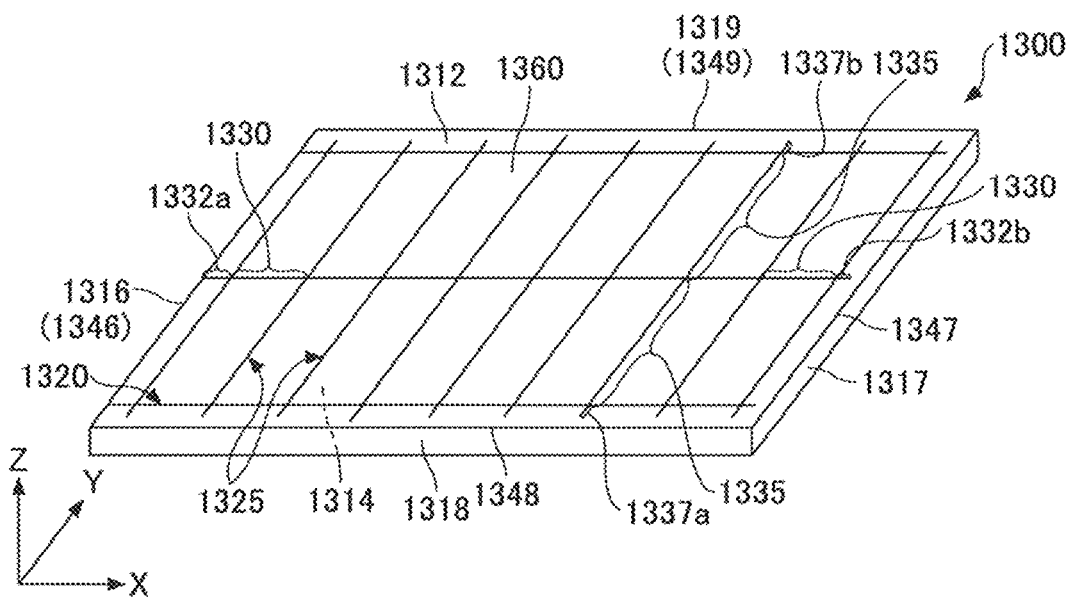
FIG. 27 is still another schematic perspective diagram of a glass plate for controlling against a pre-splitting outcome.

FIG. 27 is a schematic perspective diagram of such a glass plate (hereinafter referred to as "thirteenth glass plate") for controlling against a pre-splitting outcome.

As illustrated in FIG. 27, a thirteenth glass plate 1300 has a first main surface 1312 and a second main surface 1314. Note that in FIG. 27, the second main surface 1314 is not viewable. Further, the thirteenth glass plate 1300 has four end faces 1316, 1317, 1318, and 1319 connecting the first main surface 1312 and the second main surface 1314.

The thirteenth glass plate 1300 has a substantially rectangular shape in a top view. Accordingly, the first end surface 1316 and the second end surface 1317 are opposite to each other, and the third end surface 1318 and the fourth end surface 1319 are also opposite to each other.

The first main surface 1312 and the first end surface 1316 are connected by a first connection line 1346, the first main surface 1312 and the second end surface 1317 are connected by a second connection line 1347, the first main surface 1312 and the third end surface 1318 are connected by a third connection line 1348, and the first main surface 1312 and the fourth end surface 1319 are connected by a fourth connection line 1349.

The thirteenth glass plate 1300 has, on a first main surface 1312, three splitting lines 1320 extending along a longitudinal direction (X direction) and nine splitting lines 1325 extending along a width direction (Y direction).

Each of piece portions bounded by the splitting lines 1320 and 1325 corresponds to a glass article 1360 separated and acquired from the thirteenth glass plate 1300 in a later separating step. According to the example illustrated in FIG. 27, in the separating step, a total number of 16 substantially rectangular glass articles 1360 may be separated and acquired from the thirteenth glass plate 1300.

The X direction splitting lines 1320 include a first X direction release line 1332a, two or more X direction product lines 1330, and a second X direction release line 1332b. Likewise, the Y direction splitting lines 1325 include a first Y direction release line 1337a, two or more Y direction product lines 1335, and a second Y direction release line 1337b.

The thirteenth glass plate 1300 has first main surface 1312 and second main surface 1314 that are chemically strengthened, and first end surface 1316, second end surface 1317, third end surface 1318 and fourth end surface 1319 that are chemically strengthened. Further, the thirteenth glass plate 1300 has the above-mentioned features.

That is, in a cut surface of the glass article 1360 obtained by cutting the thirteenth glass plate 1300 along the product lines 1330 and 1335, a concentration profile of predetermined alkali metal ions from the first main surface 1312 to the second main surface 1314 indicates a substantially parabolic profile exhibiting concentration of the alkali metal ions higher toward the first main surface 1312 side and the second main surface 1314 side. Further, in the cut surface, the concentration of the alkali metal ions is higher than the bulk concentration of the thirteenth glass plate 1300.

Note that the thirteenth glass plate 1300 has the features illustrated in (I) and (ii) of the above-mentioned part of (glass plate for controlling against pre-splitting outcome).

That is, in the thirteenth glass plate 1300, the first X direction release line 1232a has a first end portion connected to the first connection line 1346 on the first main surface 1312. Further, the first X direction release line 1332a has a second end portion connected to the product line 1330 such that further extension of the first X direction release line 1332a is prevented by the X direction product line 1330.

In other words, the first X direction release lines 1332a have a configuration as illustrated in FIG. 22; that is, the first X direction release lines 1332a are arranged on the first main surface 1312 such that an extrapolation line extending from the second end portion of the first X direction release line 1332a matches the X direction product line 130.

In addition, the X direction splitting lines 1320 composed of a first X direction release line 1332a, two or more X direction product lines 1330, and a second X direction release line 1332b form, as a whole, continuous line segments along the extendable direction of the release line 1332a.

Furthermore, this continuous component, i.e., the X direction splitting line 1320, does not traverse from the first connection line 1346 to the second connection line 1347 on the first main surface 1312.

In the thirteenth glass plate having such a configuration, the same effects as those of the eleventh glass plate 1100 and the twelfth glass plate 1200 may be obtained. That is, in the thirteenth glass plate having such a configuration, even when stress is applied to the splitting lines 1320 and 1325 of the twelfth glass plate 1312, the splitting lines are significantly controlled so as not to completely traverse from one connection line to another connection line on the first main surface 1312.

As a result, in the thirteenth glass plate 1300, the pre-splitting outcome, in which the twelfth glass plate 1300 is split at an unintended stage, may be significantly controlled against.

For example, a pre-splitting outcome may be controlled against in a step of chemically strengthening the glass material having the splitting lines 1320 and 1325 in producing the thirteenth glass plate 1300.

(Glass Plate Production Method for Controlling Against Pre-Splitting Outcome)

Next, with reference to FIGS. 28 to 31, a production method of a glass plate for controlling against a pre-splitting outcome will be described.

Figure 28:
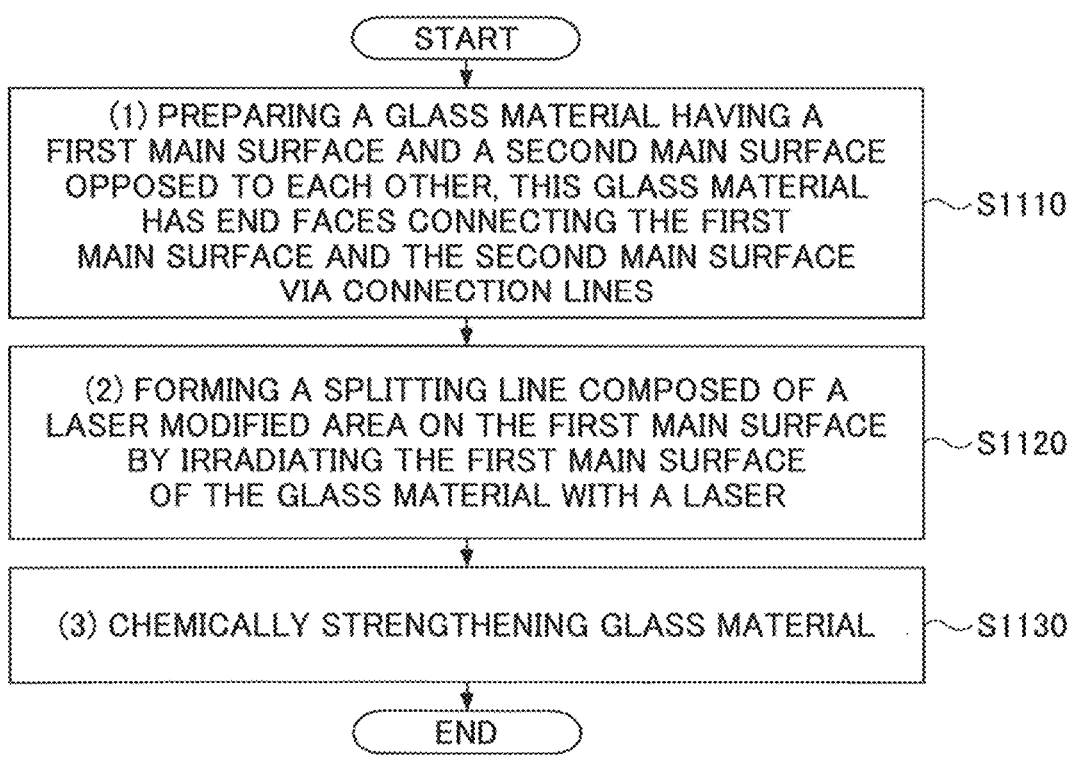
FIG. 28 is a flowchart schematically illustrating an example of a glass plate production method for controlling against a pre-splitting outcome.

FIG. 28 is a flowchart schematically illustrating a method for producing a glass plate (hereinafter referred to as an "eleventh production method") according to an embodiment of the present invention.

As illustrated in FIG. 28, the eleventh production method includes (1) preparing a glass material having a first main surface and a second main surface opposite to each other, the glass material having end faces connecting the first main surface and the second main surface via connection lines (step S1110);

(2) forming a splitting line composed of a laser modified region on the first main surface by irradiating the first main surface of the glass material with a laser (step S1120); and (3) chemically strengthening the glass material (step S1130).

Respective steps will be described in detail below.

(Step S1110)

First, a glass material is prepared. The glass material has a first main surface, a second main surface and end surfaces connecting the first main surface and second main surface.

The details of the glass material are as illustrated in step S110 in the first production method described above. In the following description, it is assumed, as an example, that the glass material has a rectangular shape.

Figure 29:
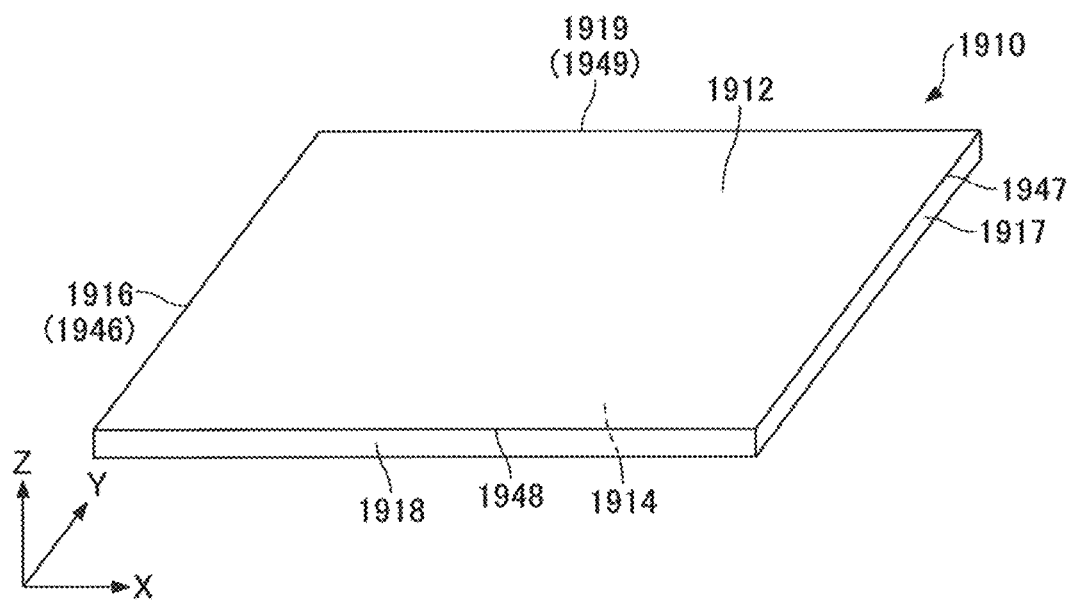
FIG. 29 is a perspective view schematically illustrating an example of a glass material used in a glass plate production method.

FIG. 29 is a schematic perspective diagram of such a rectangular glass material.

As illustrated in FIG. 29, a glass material 1910 has a first main surface 1912, a second main surface 1914, and four end surfaces 1916 to 1919.

Each of the end faces 1916 to 1919 and the first main surface 1912 are joined via a connection line. More specifically, the first main surface 1912 and the first end surface 1916 are joined via a first connection line 1946, the first main surface 1912 and the second end surface 1917 are joined via a second connection line 1947, the first main surface 1912 and the third end surface 1918 are joined via a third connection line 1948, and the first main surface 1912 and the fourth end surface 1919 are joined via a fourth connection line 1949.

(Step S1120)

Next, the glass material 1910 is irradiated with a laser. As a result, a splitting line is formed on the first main surface 1912 of the glass material 1910.

Figure 30:
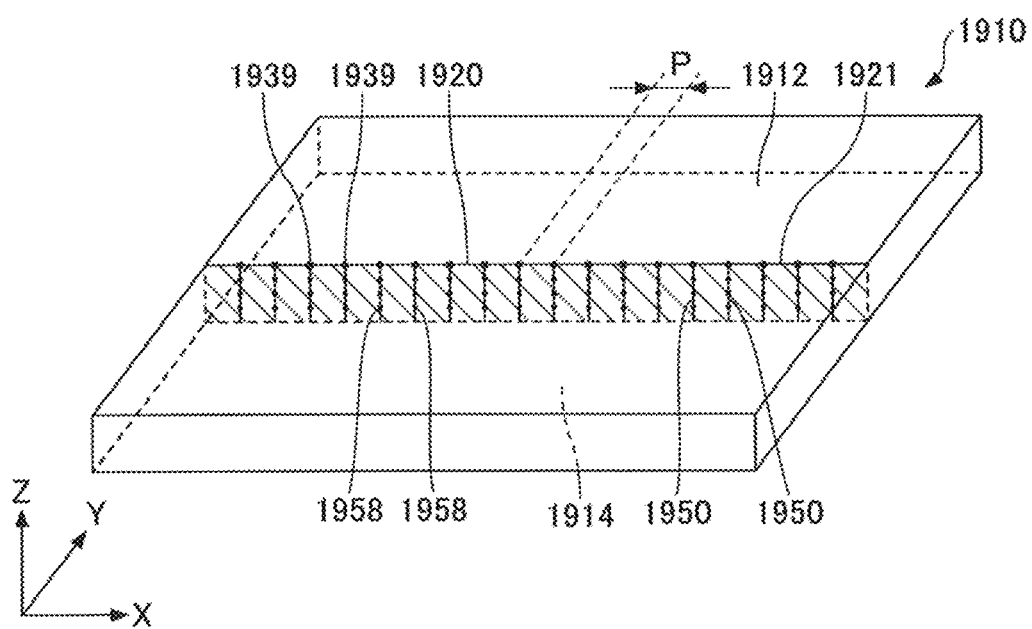
FIG. 30 is a diagram schematically illustrating an example of a splitting line formed in a glass material and extending in an X direction.

FIG. 30 is a diagram schematically illustrating an example of the splitting line 1920 formed on the glass material 1910 and extending in an X direction.

As depicted in FIG. 30, the splitting line 1920 in the X direction is formed by a laser modification region 1921. The laser modified region 1921 is formed by arranging a large number of surface voids 1939 linearly.

In the example depicted in FIG. 30, the respective surface voids 1939 within the laser modified region 1921 are arranged at equal intervals of a pitch P. The pitch P may, for example, be in a range of 2 to 10 μm. However, this range is merely an example, and the surface voids 1939 may be arranged at non-equal intervals.

Further, as described above, each surface void 1939 is not necessarily circular as depicted in FIG. 30. The shape of the surface void 1939 may take various configurations in accordance with laser irradiation and scanning conditions.

With respect to a depth direction (Z direction) of the glass material 1910, the splitting line 1920 extends from the first main surface 1912 toward the second main surface 1914. Hence, two or more internally modified rows 1950 extending along the depth direction are formed under the respective surface voids 1939, which form the laser modified region 1921 on the first main surface 1912. Each of the internally modified rows 1950 is composed of two or more voids 1958 arranged in the depth direction.

Similar to the surface void 1939, the void 1958 does not necessarily have a circular shape as depicted in FIG. 30. The shape of the void 1958 may take various forms in accordance with laser irradiation and scanning conditions.

As a laser that may be used for forming such a splitting line 1920, a short pulsed-laser with a pulse width of femtosecond order to nanosecond order, i.e., $1.0 \times 10^{-15}$ to $9.9 \times 10^{-9}$ seconds may be given. Such a short pulsed-laser may further preferably be of a burst of pulses because internal voids may be efficiently formed. The mean power at the irradiation time of such a short pulsed-laser is, for example, 30 W or more. When this mean power of the short pulsed-laser is less than 10 W, sufficient voids may fail to be formed. As an example of laser light with a burst of pulses, a laser burst having a pulse number of 3 to 10 may be applied to form one internal void row; the laser power is approximately 90% of the power rating (50 W), the burst frequency is approximately 60 kHz, and the burst time width is 20 picoseconds to 165 nanoseconds. As a time width of the burst, a preferable range may be from 10 to 100 nanoseconds.

As a laser irradiation method, a method using self-convergence of beam based on the Kerr effect, a method using a Gaussian-Bessel beam together with axicon lens, or a method using a linear focusing beam with aberration lens may be used. In any case, the irradiation conditions of the laser may not particularly be specified insofar as the splitting line 1920 may be formed.

For example, when a laser burst apparatus (Patent Document 2) is used, the size and the number of the surface voids 1939 in an in-plane direction and the size and the number of the voids 1958 in the depth direction may be controlled to some extent by appropriately changing the irradiation conditions of a laser.

Figure 31:
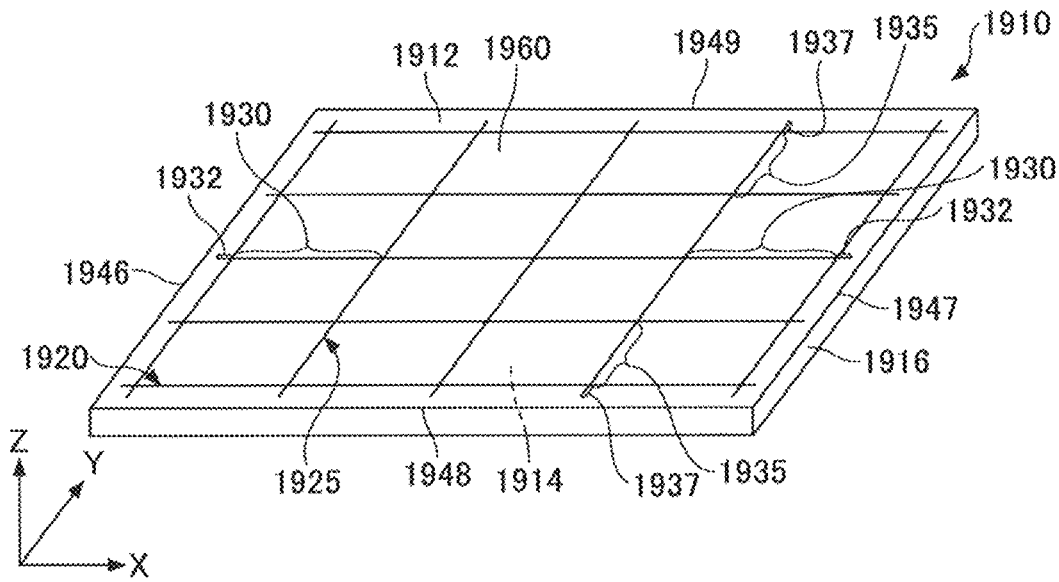
FIG. 31 is a diagram schematically illustrating an example of a configuration of a splitting line formed in a glass material.

FIG. 31 is a diagram schematically illustrating an example of a configuration of a splitting line formed on a glass material 1910.

As depicted in FIG. 31, a part of a splitting line 1920 in the X direction corresponds to product lines 1930 in the X direction, and a remaining part of the splitting line 1920 in the X direction corresponds to release lines 1932 in the X direction.

Likewise, a part of a splitting line 1925 in the Y direction corresponds to product lines 1935 in the Y direction, and a remaining part of the splitting line 1925 in the Y direction corresponds to release lines 1937 in the Y direction.

Note that in the glass material 1910 obtained by the eleventh production method, none of the X direction splitting lines 1920 extend from the first connection line 1946 to the second connection line 1947. Likewise, none of the Y direction splitting lines 1925 extend from the third connection line 1948 to the fourth connection line 1949.

That is, in the glass material 1910 having such splitting lines 1920 and 1925, even when stress is applied to the splitting lines 1920 and 1925 of the glass material 1910 at an unintended stage, it is possible to significantly control against allowing the splitting lines 1920 and 1925 to completely traverse from one connection line to another connection line on the first main surface 1912.

(Step S1130)

Next, in step S1130, the glass material 1910 is chemically strengthened.

A specific method of the chemical strengthening treatment has been described in step S130 in the first production method described above.

In the eleventh production method, the occurrence of the pre-splitting outcome is significantly controlled against during the chemical strengthening treatment of the glass material 1910 due to the aforementioned features.

Further, in the eleventh production method, it is possible to provide a glass plate resistant to the pre-splitting in a step subsequent to step S1130.

Note that, as described above, at least one of the release lines 1932 and 1937 formed in the step (2) may have a missing part where no surface void is present within an entire length range.

In addition, at least one of the release lines 1932 and 1937 may not penetrate to the second main surface 1914 of the glass material 1910.

For example, an eleventh glass plate 1100 as depicted in FIG. 19 may be produced by the eleventh production method illustrated in FIG. 28. Alternatively, the glass plates depicted in FIG. 21, FIG. 24 to FIG. 26, and FIG. 27 may be produced by changing the configurations of the splitting lines 1920 and 1925, for example.

(Another Glass Plate Production Method for Controlling Against Pre-Splitting Outcome)

Next, with reference to FIG. 32, another production method of a glass plate for controlling against a pre-splitting outcome will be described.

Figure 32:
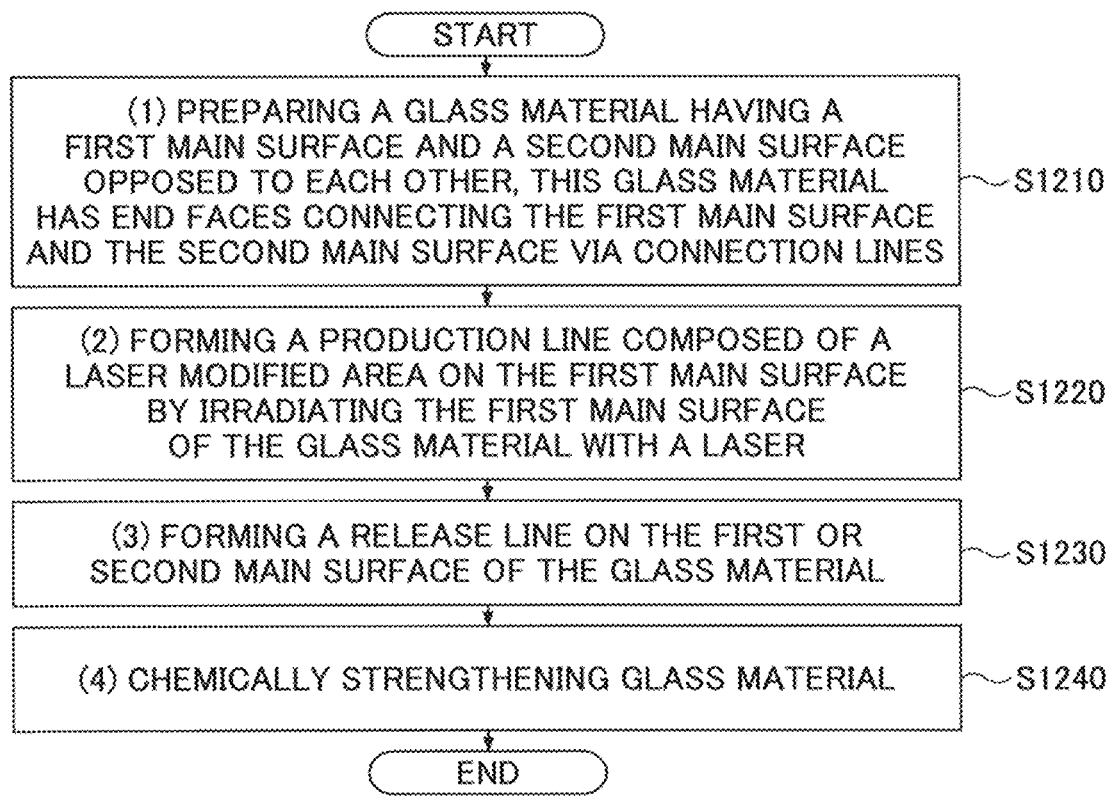
FIG. 32 is a flowchart schematically illustrating an example of another glass plate production method for controlling against a pre-splitting outcome.

FIG. 32 is a flowchart schematically illustrating another method for producing a glass plate to control against a pre-splitting outcome (hereinafter referred to as a "twelfth production method") according to an embodiment of the present invention.

As illustrated in FIG. 32, the twelfth production method includes (1) preparing a glass material having a first main surface and a second main surface opposite to each other, the glass material having end faces connecting the first main surface and the second main surface via connection lines (step S1210);

(2) forming a product line composed of a laser modified region on the first main surface by irradiating the first main surface of the glass material with a laser (step S1220);

(3) forming a release line on the first or second main surface of the glass material (step S1230); and (4) chemically strengthening the glass material (step S1240).

Note that step S1210 in the twelfth production method is the same as step S1110 in the aforementioned eleventh production method. Step S1240 is as described above. The following illustrates steps S1220 and S1230.

(Step S1220)

In step S1220, the glass material prepared in step S1210 is irradiated with a laser. As a result, a product line is formed on the first main surface of the glass material.

For the configuration and structure of the product line, the descriptions stating the splitting line and the product line in the aforementioned eleventh production method may be referenced.

(Step S1230)

After step S1220, a release line is formed on the first main surface of the glass material. The release line extends from the first main surface to the second main surface. Alternatively, the release line may be formed on the second main surface of the glass material and may extend from the second main surface to the first main surface.

The tool for forming the release line is not particularly specified. The release line may be formed by a machining process using a separation tool such as a glass cutter, for example.

Then, in step S1240, the glass material is chemically strengthened.

Note that in the twelfth production method, the release line is formed so as to satisfy any of the following:

(I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material.

Hence, even when a stress is applied to the glass plate produced by the twelfth production method at an unintended stage, it is possible to significantly control against allowing the splitting line to completely traverse from one connection line to another connection line on one surface.

In the twelfth production method, the occurrence of the pre-splitting outcome is significantly controlled against during the chemical strengthening treatment of the glass material. Further, in the twelfth production method, it is possible to provide a glass plate resistant to the pre-splitting in a step subsequent to step S1240.

(Still Another Glass Plate Production Method for Controlling Against Pre-Splitting Outcome)

Next, with reference to FIG. 33, still another production method of a glass plate for controlling against a pre-splitting outcome will be described.

Figure 33:
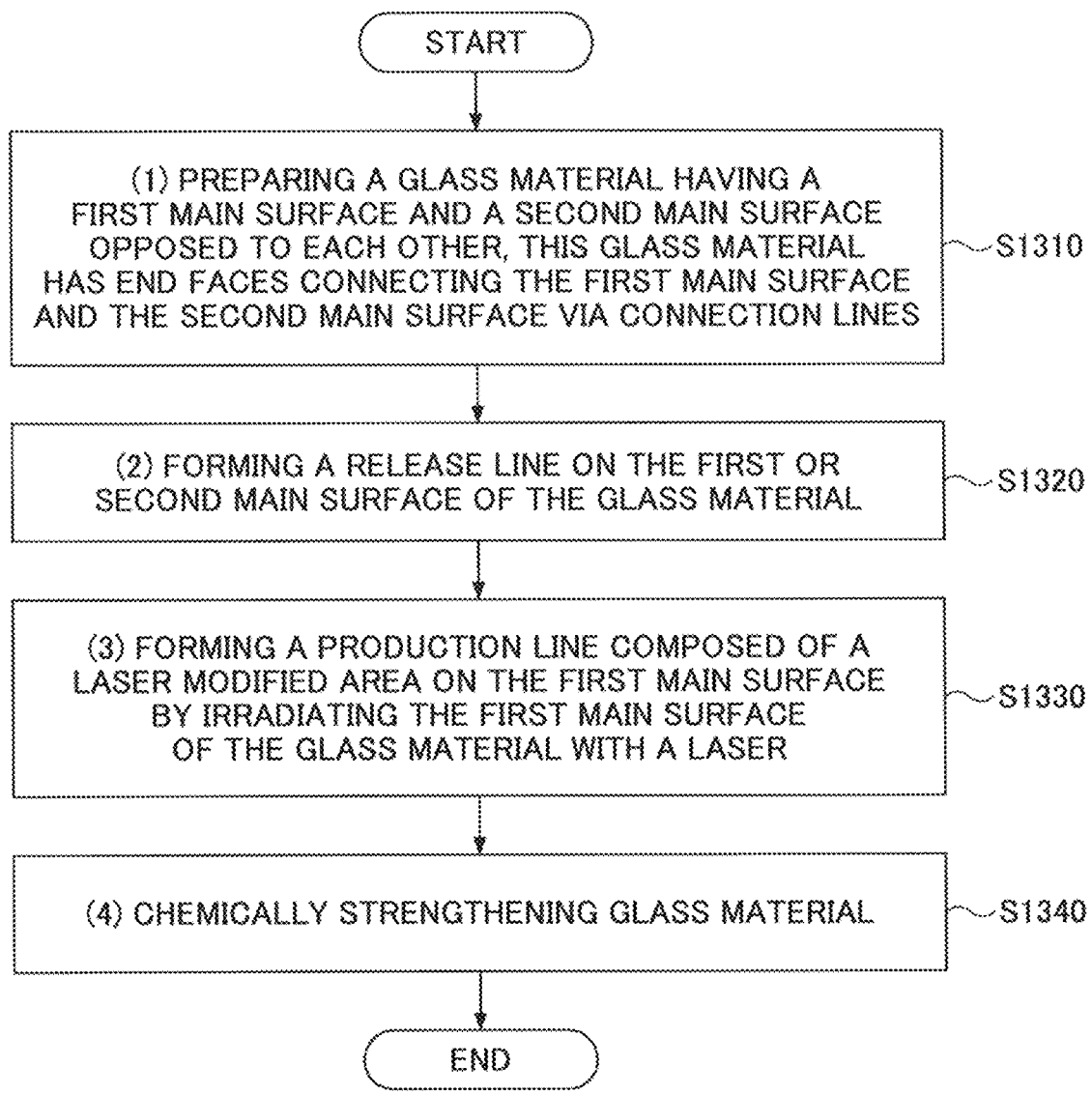
FIG. 33 is a flowchart schematically illustrating still another example of another glass plate production method for controlling against a pre-splitting outcome.

FIG. 33 is a flowchart schematically illustrating still another method for producing a glass plate to control against a pre-splitting outcome (hereinafter referred to as a "thirteenth production method") according to an embodiment of the present invention.

As illustrated in FIG. 33, the thirteenth production method includes (1) preparing a glass material having a first main surface and a second main surface opposite to each other, the glass material having end faces connecting the first main surface and the second main surface via connection lines (step S1310);

(2) forming a release line on the first or second main surface of the glass material (step S1320); and (3) forming a product line composed of a laser modified region on the first main surface by irradiating the first main surface of the glass material with a laser (step S1330); and (4) chemically strengthening the glass material (step S1340).

In the thirteenth production method, the order of the release line forming step (step S1320) and the product line forming step (step S1330) is reversed, as compared with the twelfth production method described above. Note that steps S1310, S1320, and S1330 are the same as steps S1210, S1230, and S1220 in the twelfth production method, respectively.

Hence, it may be clear that in such a thirteenth production method, it is possible to provide a glass plate resistant to the pre-splitting outcome.

In still another production method of the glass plate for controlling against the pre-splitting outcome, as one step after the step (step S1110) of preparing a glass raw material plate of FIG. 28, the product line and the release line may be formed simultaneously or alternately.

Up to this point, a description is given of the splitting lines having both the product line and release line; this configuration is resistant to the pre-splitting outcome. Besides this, as a configuration resistant to the pre-splitting outcome, the following glass plate production method may be given as one embodiment of the present invention as depicted in FIG. 11.

Such a glass plate production method includes (1) preparing a glass material having a first main surface and a second main surface opposite to each other, the glass material having end faces connecting the first main surface and the second main surface via connection lines;

(2) forming at least a product line composed of a laser modified region on the first main surface by irradiating the first main surface of the glass material with a laser; and (3) chemically strengthening the glass material.

In order to separate glass articles from the glass plate obtained through this produced method, the first main surface of the glass plate are irradiated with a laser to form a new release line composed of a laser modified region on the first main surface and subsequently glass articles are separated from the glass plate using the above-described separation tool.

This indicates that a new release line is formed after chemical strengthening the glass plate and before separating the glass articles from the glass plate by employing this glass plate production method. Thus, it is possible to provide a glass plate that is more resistant to a pre-splitting outcome in a period from before chemical strengthening the glass plate and until before separation of glass articles.

EXAMPLES

Next, examples of the present invention will be described.

Samples of various glass articles were produced by the following method and characteristics of the produced glass articles were evaluated.

(Production Method of Sample A)

A glass substrate made of aluminosilicate glass having a length L of 100 mm in length and width, and a thickness t of 1.3 mm was prepared. The glass substrate corresponds to a glass material. For the glass substrate, a raw material plate before chemical strengthening of Dragontrail (registered trademark) was used. Hence, a glass composition of the glass substrate is the same as that of Dragontrail except for the alkali metal component substituted by the chemical strengthening treatment. The glass substrate was irradiated with a laser from a direction of the main surface side to form two or more in-plane void regions in the vertical direction and the horizontal direction.

For the laser, a laser burst (number of bursts: 3) produced by Rofin (Germany), which is capable of emitting a short pulsed-laser of picosecond order, was used. The power of the laser was 90% of the power rating (50 W). The frequency of one burst of the laser was 60 kHz, the pulse width was 15 picoseconds, and one burst width was 66 ns.

In addition, the number of times of laser irradiation was set to only once in each in-plane void region (accordingly, 1-pass laser irradiation). In each in-plane void region, the center-to-center distance P between the centers of the adjacent surface voids was set to 5 μm.

Figure 34:
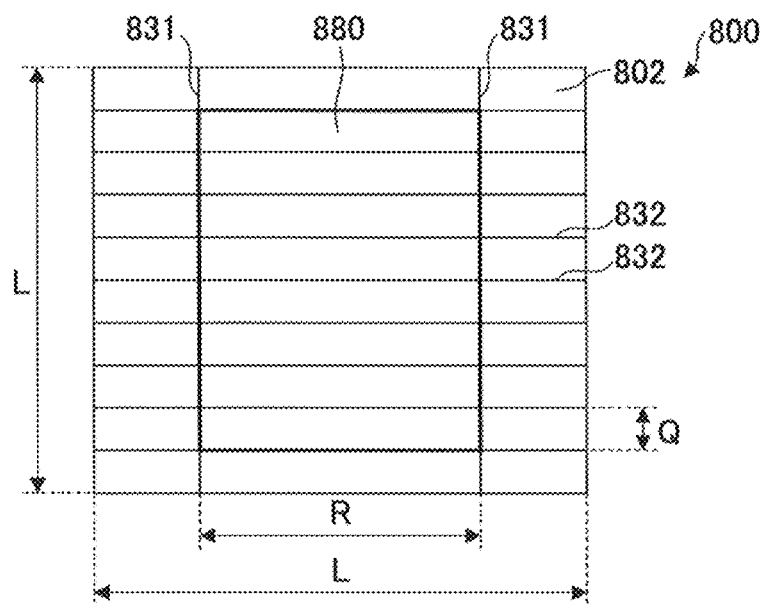
FIG. 34 is a diagram illustrating a relationship between a glass substrate and acquired samples in Examples.

As illustrated in FIG. 34, in a first main surface 802 of the glass substrate 800, two in-plane void regions 831 were formed in the vertical direction and nine in-plane void regions 832 were formed in the horizontal direction. An interval R between the in-plane void regions 831 in the vertical direction was 60 mm and an interval Q between the in-plane void regions 832 in the horizontal direction was 10 mm.

Note that the laser was irradiated in a direction perpendicular to the first main surface 802. Accordingly, internal void rows formed under the in-plane void regions 831 and 832 extend substantially in parallel with a thickness direction of the glass substrate 800.

Next, a chemical strengthening treatment was applied to the obtained glass substrate 800.

The chemical strengthening treatment was conducted by immersing the entire glass substrate 800 in potassium nitrate molten salt. The treatment temperature was 435° C., and the treatment time was 1 hour.

The result of the chemical strengthening treatment indicated no pre-splitting in the glass substrate.

Next, a total number of 8 samples 880 was obtained from the center portion (thick frame portion in FIG. 34) of one glass substrate 800 by pushing and separating the glass substrate 800 along the respective in-plane void regions 831 and 832. Each sample 880 had a length (see a length R in FIG. 34) of approximately 60 mm and a width (see length Q in FIG. 34) of approximately 10 mm. Each of the four end faces of each sample 880 corresponded to the aforementioned virtual end face. When the end faces of each sample were visually observed, defects such as scratches were not identified.

Each of the samples 880 produced in this method is referred to as a sample A.

(Production Method of Sample B)

A glass substrate similar to the glass substrate used in the sample A was cut after formation of an in-plane void regions and internal void rows under the same laser conditions as in the sample A to thereby obtain two or more samples each having a length of 60 mm and a width of 10 mm. Thereafter, each sample was chemically strengthened to prepare a sample B. The conditions of the chemical strengthening treatment were the same as in those of the sample A described above.

Note that some samples produced by this sample B production method had scratches on the end faces, which indicates that the samples produced by this sample B production method included some defective samples. Thus, samples B were prepared by visually screening only intact samples. The chemical strengthening treatment was applied to the cut samples; such scratches were thus expected to have formed during the process before the chemical strengthening treatment was applied to the cut samples.

(Production Method of Sample C)

A sample C was produced using the same glass substrate as the glass substrate used in the sample A. In a case of a sample C, a chemical strengthening treatment was directly applied to the glass substrate without laser irradiation, to produce a sample C. The conditions of the chemical strengthening treatment were the same as in those of the sample A described above.

Thereafter, the chemically strengthened glass substrate was cut under the same laser conditions as those of the sample A to thereby obtain two or more samples C having a length of 60 mm and a width of 10 mm.

Note that some samples produced by this sample C production method had scratches on the end faces, which indicates that the samples produced by this sample C production method included some samples that were not intact. Thus, samples C were prepared by visually screening only intact samples. Such scratches are assumed to have formed due to the difficulty in cutting the chemically strengthened glass substrate.

(Evaluation)

The samples A to C produced as described above were evaluated as follows.

(Stress Distribution Evaluation)

The stress distribution of the end faces of the sample A to C was evaluated. This stress was mainly due to chemical strengthening treatment. For the evaluation, a birefringence imaging system (abrio: produced by CRi Inc., USA) was used. In each sample, an evaluation target surface was an end face having a length of 60 mm and a thickness of 1.3 mm (hereinafter referred to as a "first end face").

Figure 35:
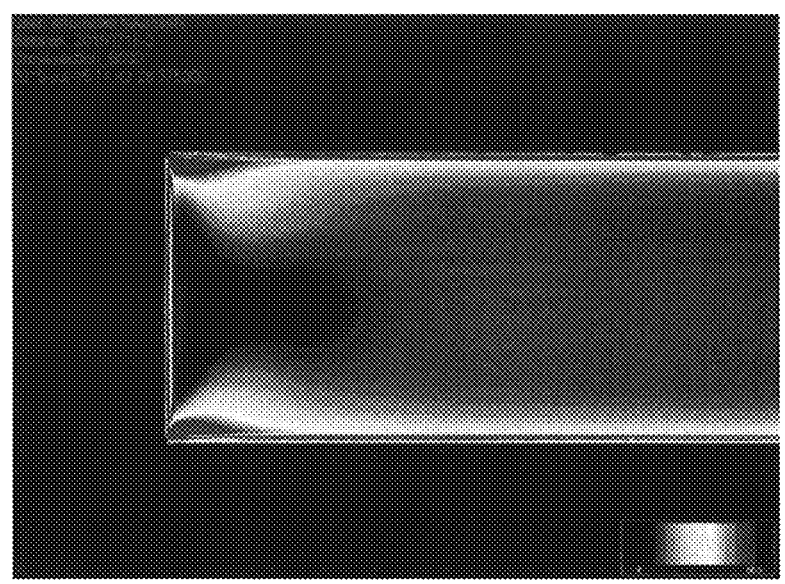
FIG. 35 is a diagram depicting an in-plane stress distribution result measured on a first end face of a sample A.
Figure 36:
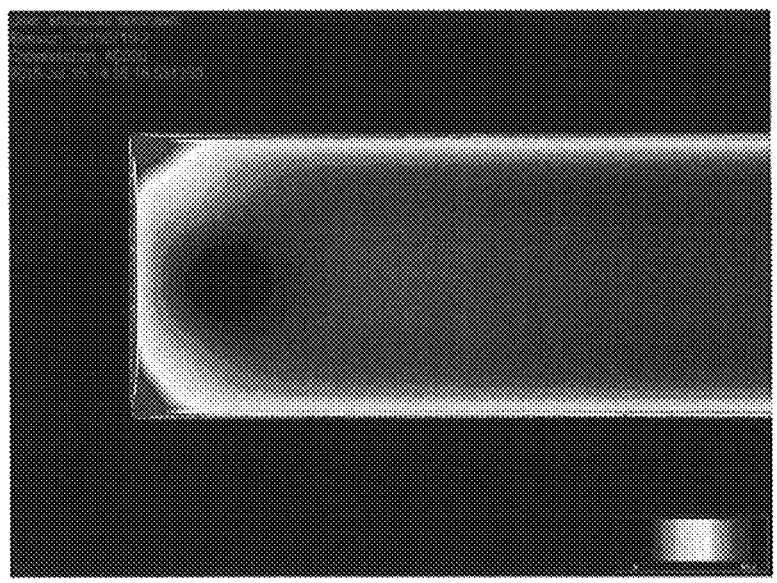
FIG. 36 is a diagram depicting an in-plane stress distribution result measured on a first end face of a sample B.
Figure 37:
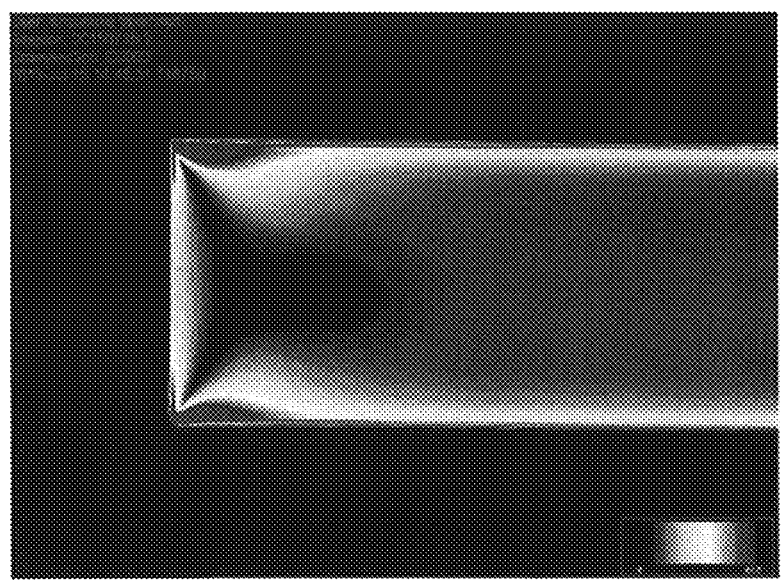
FIG. 37 is a diagram depicting an in-plane stress distribution result measured on a first end face of a sample C.

FIGS. 35 to 37 illustrate in-plane stress distribution results measured with the first end faces of samples A to C, respectively. Note that because FIGS. 35 to 37 are illustrated only in black-and-white, the stress distribution may not be fully clear. A relatively small tensile stress occurs in the central region on the right side of the figure and a tensile stress smaller than that in the central region on the right side of the figure occurs in the dense region from the left side end portion toward the right side of the figure, and the compression stress increases as the image portion gets darker (the region outside the white portion) in the vicinity of the upper left corner portion and the lower left corner portion and on the left end portion.

In addition, the apparatus used acquired data including not only information on the evaluation target surface but also information on the depth direction of the evaluation target surface (in this evaluation, a part corresponding to Q=10 mm). Hence, this evaluation may provide a result of integration of the stress values up to 10 mm in the depth direction from the evaluation target surface.

As depicted in FIG. 35, in the sample A, three outer surfaces, that is, upper and lower two main surfaces, and an end face having a width of 10 mm×a thickness of 1.3 mm (hereinafter referred to as "second end face") have large compressive stress. Specifically, the "second end face" has a large compressive stress throughout the entire thickness direction regardless of the position.

Further, as depicted in FIG. 36, in the sample B, a large compressive stress is present in all three outer surfaces.

In contrast, as depicted in FIG. 37, in the sample C, although a large compressive stress is present in the two upper and lower main surfaces, there is substantially no compressive stress in many portions of the second end face, particularly in the center in the thickness direction.

As described above, the results indicate that the second end face of the sample A had compressive stress almost equal to that of the end face of the sample B throughout the entire thickness direction.

(Analysis of Potassium Ions)

Next, the potassium ion concentration at the first end face was analyzed using each of samples A to C. Specifically, a line analysis using the EDX method (Energy Dispersive X-ray Spectrometry) was performed on the first end face of each sample.

Figure 38:
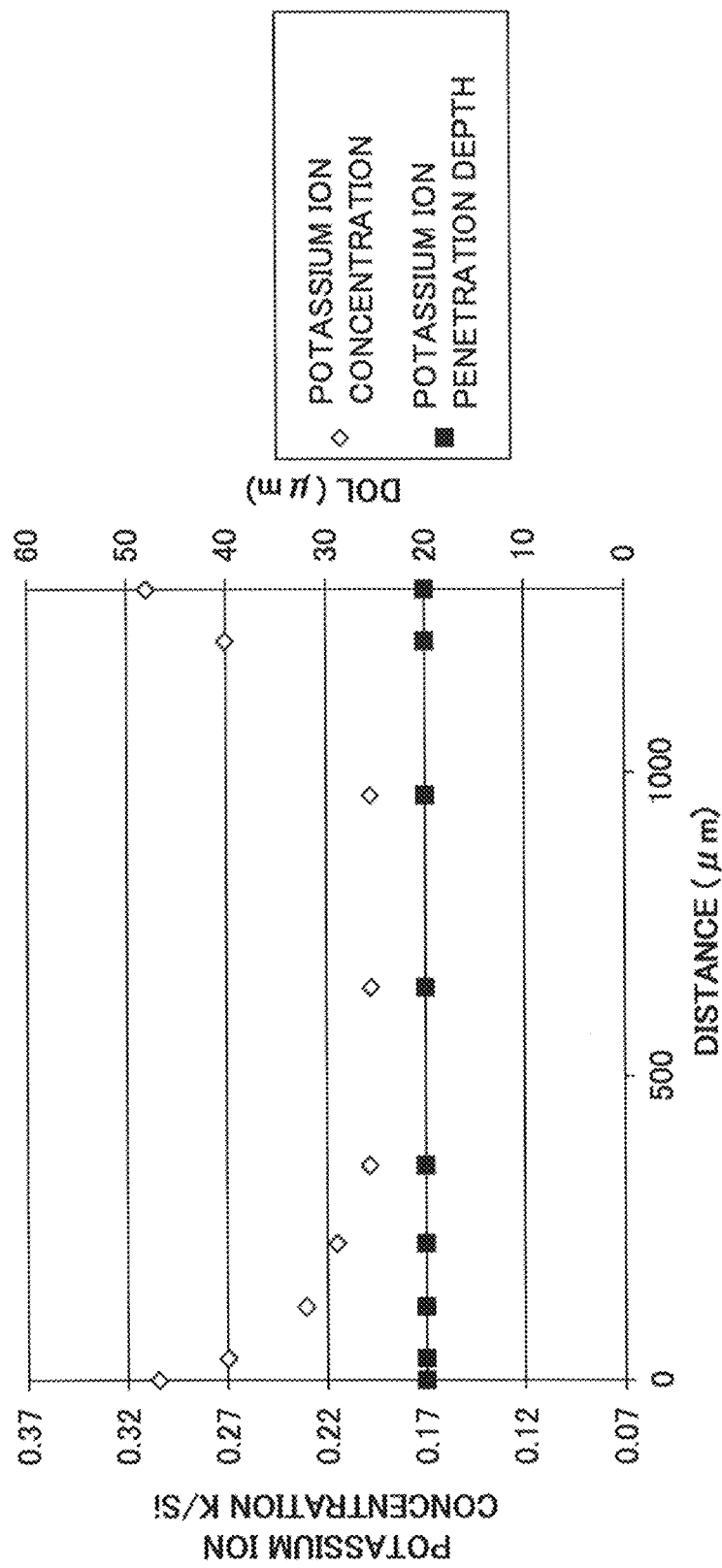
FIG. 38 is a graph illustrating results of a potassium ion concentration analysis obtained in a sample A.
Figure 39:
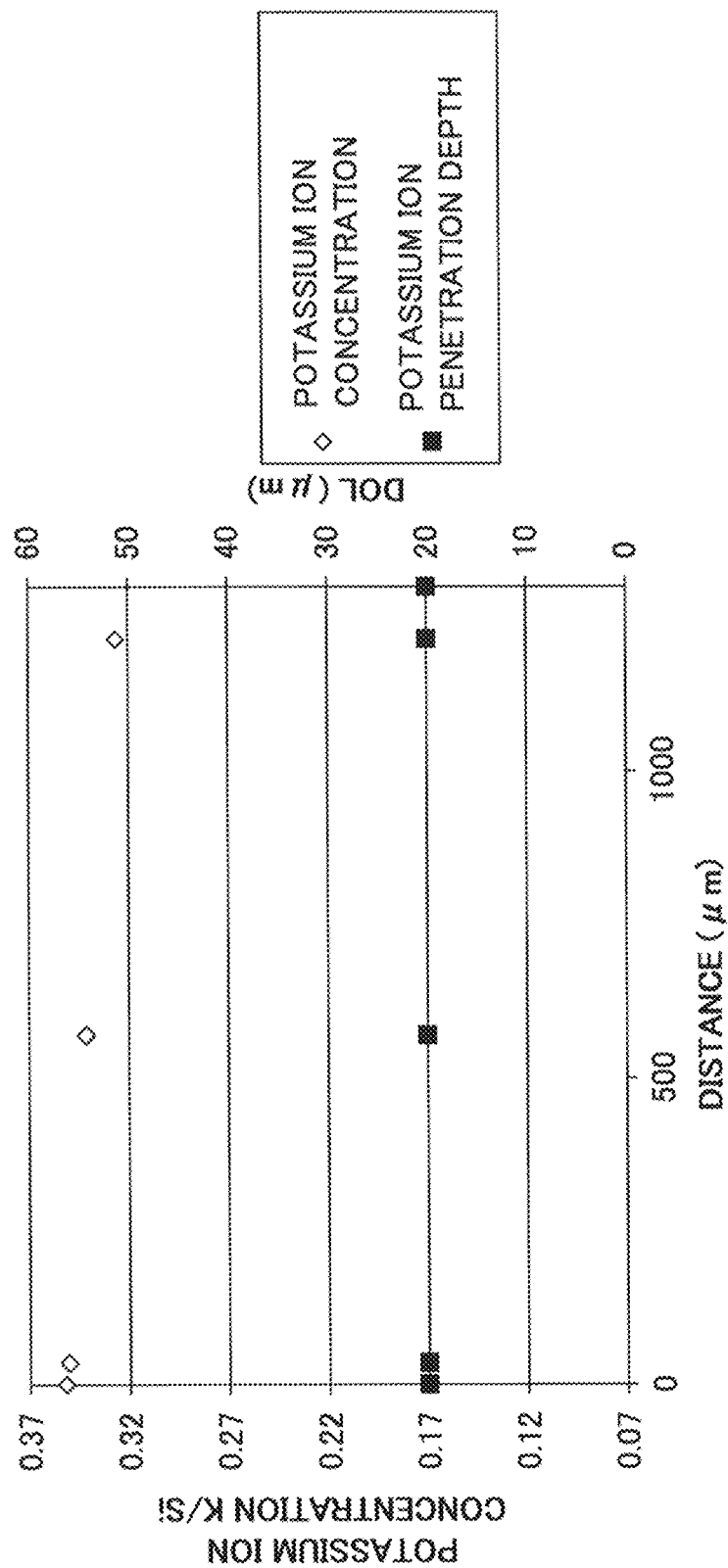
FIG. 39 is a graph illustrating results of a potassium ion concentration analysis obtained in a sample B.
Figure 40:
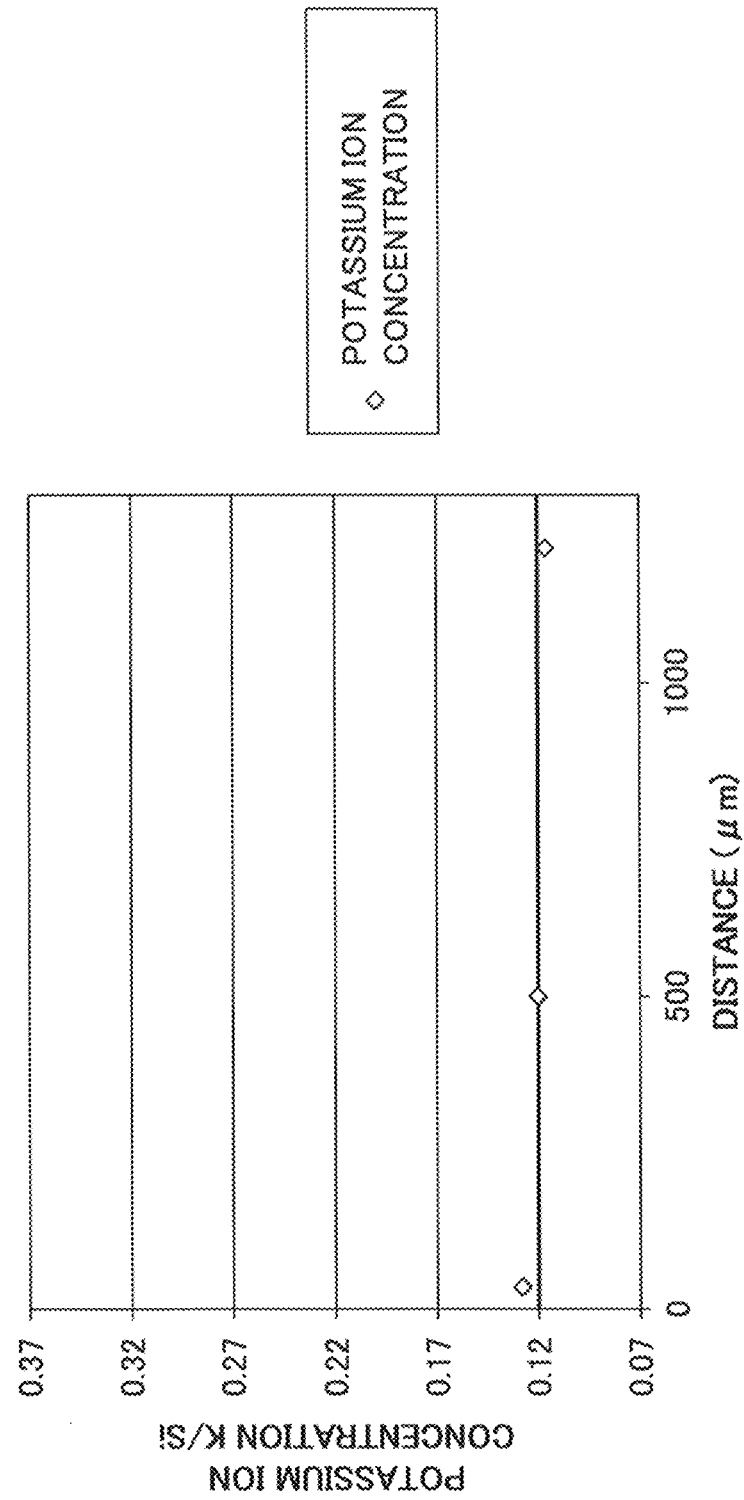
FIG. 40 is a graph illustrating results of a potassium ion concentration analysis obtained in a sample C.

FIG. 38 to FIG. 40 illustrate the results of the concentration analysis obtained for respective samples. In these figures, the horizontal axis is the distance from the first main surface at the first end surface, and this distance varies from 0 (the first main surface) to 1300 μm (the second main surface). The vertical axis (left axis) is the concentration (atomic ratio) of potassium ions normalized by silicon ions. In FIG. 38 and FIG. 39, the profile of penetration depth of potassium ions is indicated on the right vertical axis for reference. This penetration depth represents a penetration depth of potassium ions in a direction perpendicular to the first end face measured by the EDX method. That is, this value represents the penetration depth of potassium ions in the depth direction from the first end face measured at each position along the direction of the distance defined as described above at the first end face.

These analyses were performed at several positions on the first end face of each sample, but the results obtained were nearly the same.

The results of FIG. 38 indicate that in the sample A, the concentration of potassium ions at the first end face indicates a substantially parabolic profile along the second main surface from the first main surface. That is, the potassium ion concentration tends to be high on the first main surface side and the second main surface side, and low in the middle portion between the two main surfaces.

Note that the potassium ion concentration (K/Si) originally contained in the glass substrate used for producing the sample A is 0.118 as a bulk concentration, that is, approximately 0.12. In contrast, in the profile of FIG. 38, the minimum value of potassium ion concentration (value at a depth of approximately 650 μm) is 0.19 to 0.20. Hence, in the sample A, potassium ions may be introduced throughout the first end face. Note that this is clear because the penetration depth of potassium ions does not depend greatly on the distance from the first main surface, and the potassium ions are introduced up to approximately 20 μm even at the position of the distance of 650 μm. The ratio of the minimum value of K/Si of the profile to the bulk concentration of K/Si is 1.6.

FIG. 39 illustrates the analysis results of the sample B. In the sample B, the first end face is chemically strengthened similar to the first main surface and the second main surface. Hence, the potassium ion concentration does not depend on the distance on the horizontal axis, and indicates a substantially constant high value at any distance.

In contrast, as illustrated in FIG. 40, in the sample C, a sample is cut out after the chemical strengthening treatment is applied to the glass substrate. As a result, almost no potassium ions are introduced into the first end face. That is, regardless of the distance of the horizontal axis, the concentration of potassium ions originally contained in the glass substrate is equal to 0.12.

Thus, the results of the sample A indicate that potassium ions were introduced to the end face despite the fact that the sample was obtained after the chemical strengthening treatment.

(Strength Evaluation)

Next, the strength was evaluated by a 4-point bending test using each of samples A to C.

The 4-point bending test was conducted in the following two methods (flat bending test and longitudinal bending test).

(Flat Bending Test)

Figure 41:
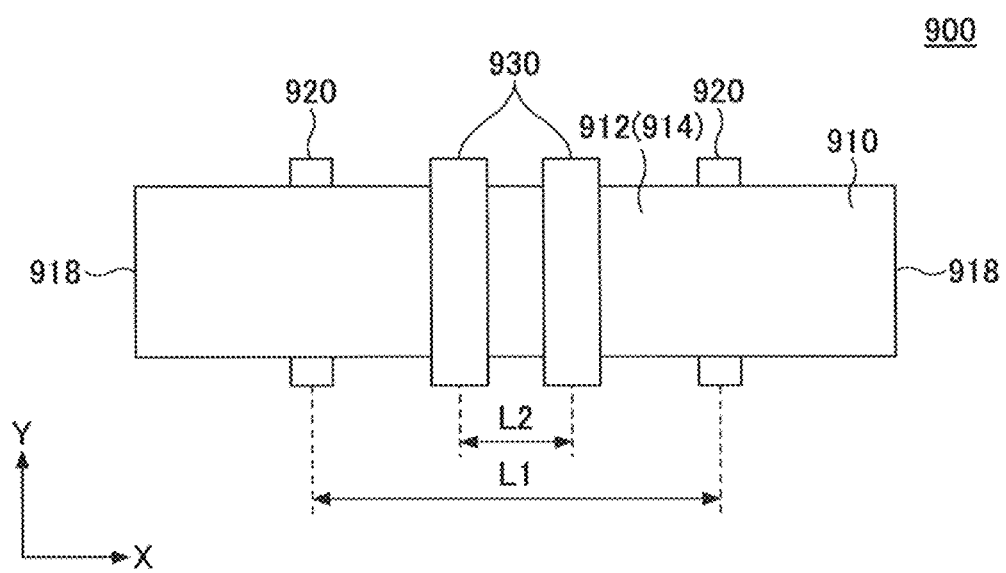
FIG. 41 is a diagram schematically illustrating a configuration of a flat bending test apparatus.

FIG. 41 schematically depicts a configuration of a flat bending test apparatus.

As depicted in FIG. 41, the flat bending test apparatus 900 includes a pair of fulcrum members 920 and a pair of load members 930. The distance L1 between the centers of the fulcrum members 920 is 30 mm, and the distance L2 between the centers of the load members 930 is 10 mm. The fulcrum members 920 and the load members 930 each have a sufficiently long full length (length in Y direction) as compared with the thickness (10 mm) of a sample to be tested.

In the test, a sample 910 is horizontally placed on the two fulcrum members 920. The sample 910 is arranged such that each of second end faces 918 of the sample 910 has an equal distance from the center of the fulcrum members 920. In addition, the sample 910 is arranged such that the first main surface 912 or the second main surface 914 faces downward.

Next, the two loading members 930 are placed above the sample 910 such that the center between the loading members 980 corresponds to the center of the sample 910.

Next, a load is applied to the sample 910 from the top of the sample 910 by pressing the load members 930 against the sample 910. The head speed is 5 mm/min. In the test, the temperature in the room is approximately 23° C. and the relative humidity is approximately 60%. According to such a test, the maximum tensile stress obtained from the load when the sample 910 is broken is defined as a flat bending rupture stress.

(Longitudinal Bending Test)

Figure 42:
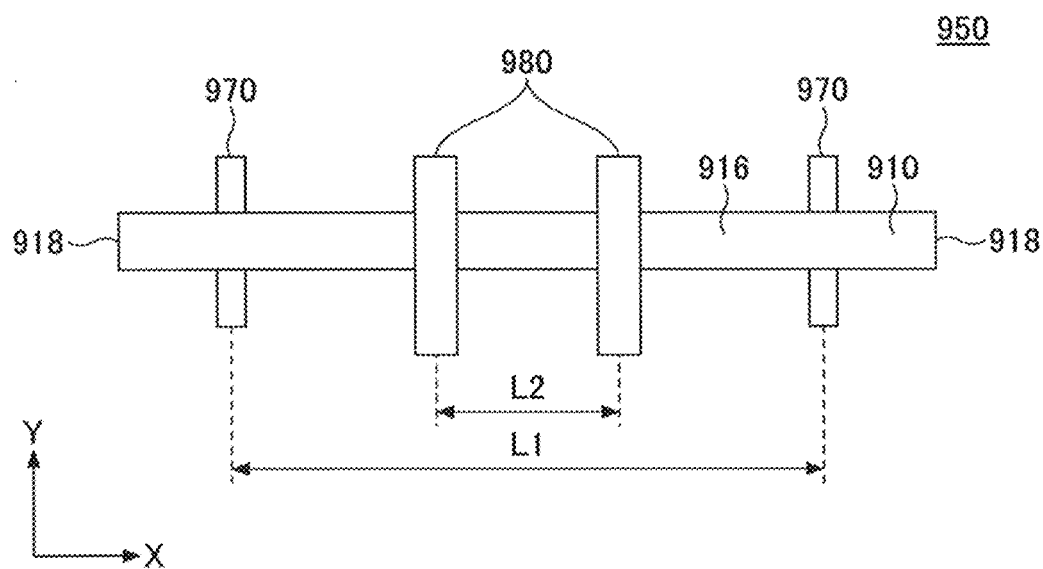
FIG. 42 is a diagram schematically illustrating a configuration of a longitudinal bending test apparatus.

FIG. 42 schematically depicts a configuration of a longitudinal bending test apparatus.

As depicted in FIG. 42, a longitudinal bending test apparatus 950 includes a pair of fulcrum members 970 and a pair of load members 980. The distance L1 between the centers of the fulcrum members 970 is 50 mm, and the distance L2 between the centers of the load members 980 is 20 mm. The fulcrum members 970 and the load members 980 each have a sufficiently long full length (length in Y direction) as compared with the thickness (1.3 mm) of a sample to be tested.

In the test, a sample 910 is horizontally placed on the two fulcrum members 970. The sample 910 is arranged such that each of second end faces 918 of the sample 910 has an equal distance from the center of the fulcrum members 970. Further, the sample 910 is arranged such that a first end face 916 faces upward. The sample 910 is supported so as not to fall over. To support the sample, the sample 910 is arranged such that friction will not be generated between the sample 910 and members for supporting the sample 910.

Next, the two loading members 980 are placed above the sample 910 such that the center between the loading members 980 corresponds to the center of the sample 910.

Next, a load is applied to the sample 910 from the top of the sample 910 by pressing the load members 980 against the sample 910. The head speed is 1 mm/min. In the test, the temperature in the room is approximately 23° C. and the relative humidity is approximately 60%. According to such a test, the maximum tensile stress obtained from the load when the sample 910 is broken is defined as a longitudinal bending rupture stress.

(Test Results)

Figure 43:
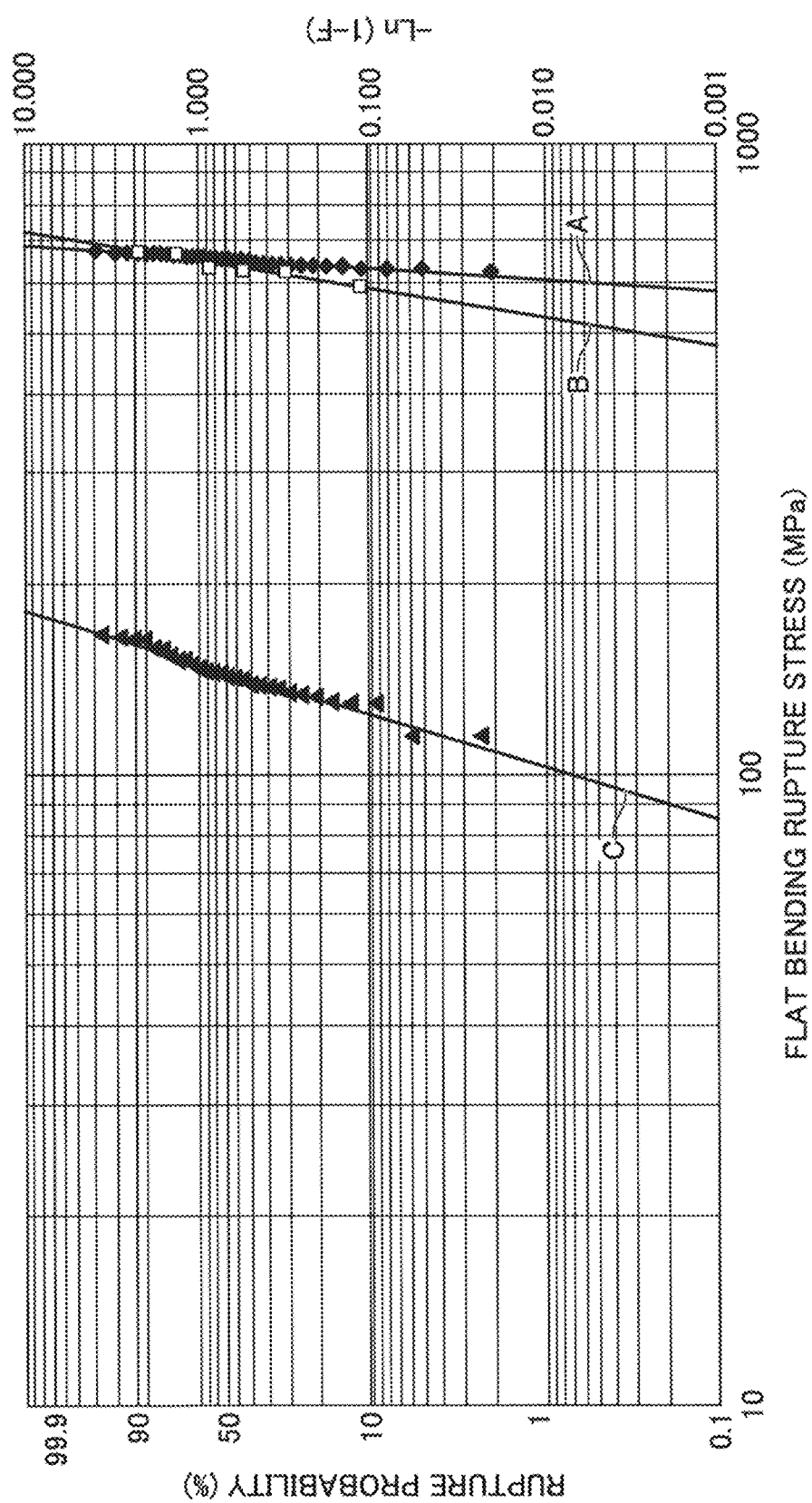
FIG. 43 is a diagram (Weibull distribution diagram) illustrating results of a flat bending test obtained for each sample.

FIG. 43 illustrates the summarized results of the flat bending test (Weibull distribution map) obtained in the samples A to C. The straight line fitting to the Weibull plot in each sample in the figure was obtained by the least squares method.

FIG. 43 illustrates that the sample C exhibited an insufficiently high rupture stress to indicate insufficient strength. In contrast, the sample A and sample B exhibited nearly the same sufficient strength.

In general, the slope of a straight line in a Weibull distribution map correlates with the variability between samples. In other words, the slope of the straight line becomes steeper as the variability between samples decreases.

In the result shown in FIG. 43, the slope of the straight line of the sample A is steeper than that of the sample B. Thus, in sample A, variability in strength between samples may be smaller than the variability in strength between samples in sample B. The reason for this is that in the sample A, since the internal void rows acting as the end portions are covered with the glass itself during the chemical strengthening treatment, scratches are less likely to be formed and the variability in strength is reduced.

Figure 44:
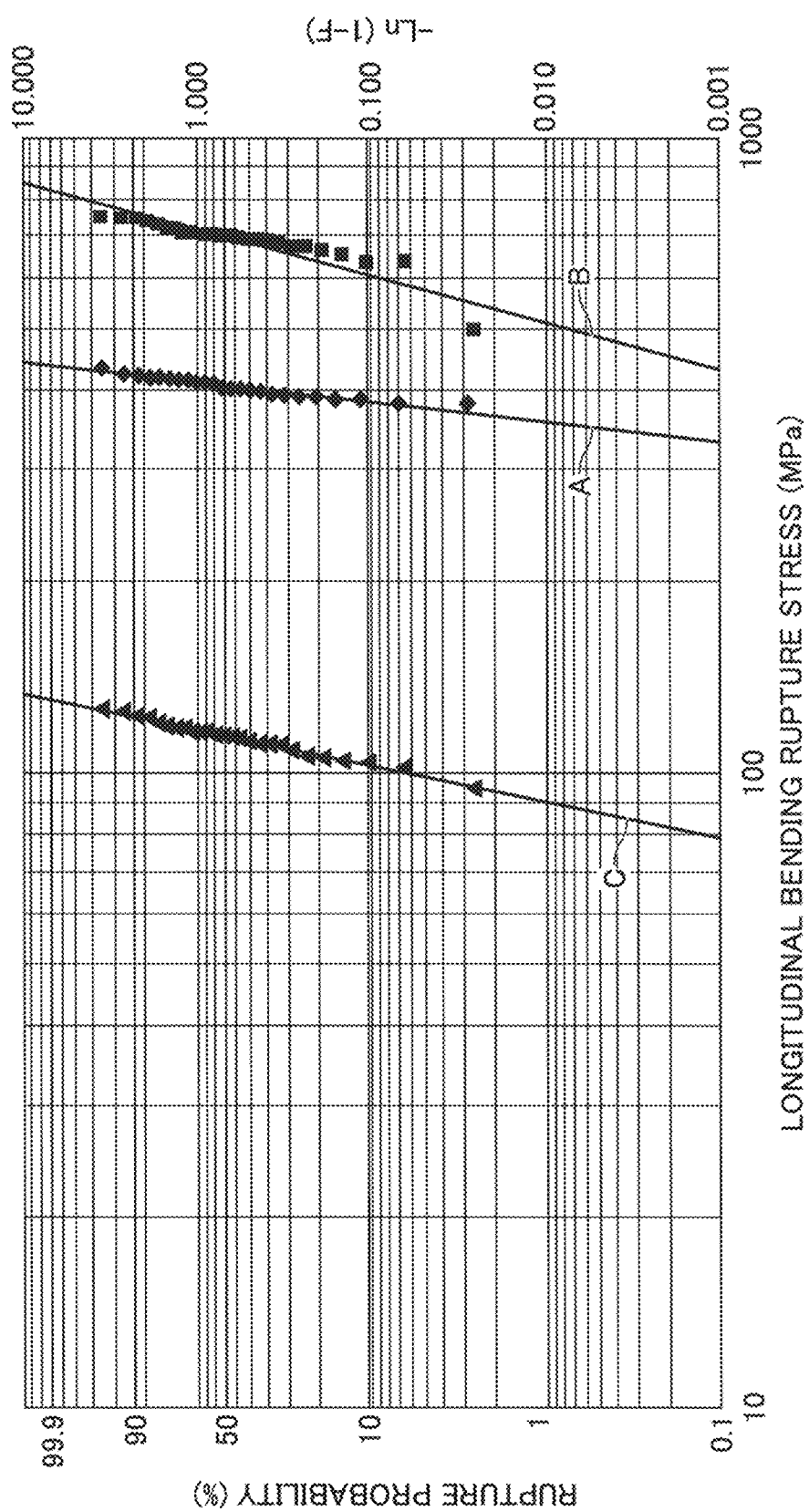
FIG. 44 is a diagram (Weibull distribution diagram) illustrating results of a longitudinal bending test obtained for each sample.

Next, FIG. 44 illustrates the summarized results of the longitudinal bending test (Weibull distribution map) obtained in the samples A to C. The straight line fitting to the Weibull plot in each sample in the figure was obtained by the least squares method.

FIG. 44 illustrates that the sample C exhibited an insufficiently high rupture stress to indicate insufficient strength. In contrast, the sample A and sample B exhibited sufficient strength. The rupture stress of sample A is slightly lower than the rupture stress of sample B because there is a difference in the potassium ion concentration between the two due to the chemical strengthening treatment at the first end face described above.

Further, as described above, the slope of the straight line of the sample A is steeper than that of the sample B; hence, the variability in strength between the samples in the sample A is smaller than that in the sample B. The reason for this is that in the sample A, since the internal void rows acting as the end portions are covered with the glass itself during the chemical strengthening treatment, scratches are less likely to be formed and the variability in strength is reduced.

As described above, in the sample A, potassium ions were introduced into the end face during the chemical strengthening treatment of the glass substrate, and as a result, the sample A exhibited sufficient strength.

Another Example 1

Next, other examples of the present invention will be described.
(Preparation of Sample)
As a sample, the aforementioned sample A was used. As illustrated in FIG. 38, in this sample, the penetration depth of alkali metal ions is constant at approximately 20 regardless of the distance from the first main surface at the first end surface. In the following, the sample used in this example is specifically referred to as "sample D".
(Measurement of Surface Roughness of First End Surface)
The surface roughness (arithmetic average roughness Ra) of the first end face of the sample D was measured. The arithmetic mean roughness Ra was measured using Surfcom 1400D produced by Tokyo Seimitsu Co., Ltd. in accordance with JIS B 0601 (2013). The measurement length was set to 8.0 mm along the longitudinal direction of the first end face. The cutoff value of the λc outline curve filter was set to 0.8 mm. The measurement speed was set to 0.3 mm/sec.

Note that the measurements were performed using twelve samples D. The measurements were made at three points for each sample.

(Measurement of Crack Depth of First End Surface)
A crack depth of the first end face of the sample D was measured by the following method. The measurement direction of the crack depth was set to a direction perpendicular to the first end face.

In order to facilitate observation of cracks before measurement, sample D was etched under the following conditions.
(1) Preparation of Etchant
The etchant was prepared by mixing 100 ml of 46.0 mass % hydrofluoric acid (HF) and 1000 ml of 36 mass % hydrochloric acid (HCl) in 900 ml of water.
(2) Etching Treatment
The sample D was immersed in the etchant prepared in (1) for 1 minute and isotropic etching of approximately 3 μm was performed.
(3) Brush Polishing
After the etching, the sample D was subjected to brush polishing to remove residues.

For the measurement of the crack depth, a scanning confocal laser microscope (LEXT OLS 3000: manufactured by Olympus Corporation) was used.

The measurement was performed in a substantially central region (a region with 36 mm in the longitudinal direction× 1.3 mm in the thickness direction) on the first end face of the sample D.

Among the observed cracks, the depth of the deepest crack was taken as an apparent crack depth $D_0$ of the sample D. Note that the actual crack depth (referred to as $D_1$) was calculated by adding the length reduced by brush polishing to this $D_0$. Note that this actual crack depth $D_1$ is a value including the effect due to the etching treatment described above.
(Evaluation)
The evaluation results of the surface roughness of the first end face and the crack depth $D_1$ obtained for each of twelve samples D are summarized in Table 1. In Table 1, the pitch between the surface voids in the in-plane void region of the first main surface in each sample D is illustrated for reference.

TABLE 1

| No. | PITCH BETWEEN SURFACE VOIDS (μm) | ARITHMETICAL MEAN ROUGHNESS Ra (μm) | | | | CRACK DEPTH (μm) |
| --- | --- | --- | --- | --- | --- | --- |
| | | 1 | 2 | 3 | MEAN VALUE | |
| 1 | 4.0 | 0.53 | 0.54 | 0.55 | 0.54 | 5.18 |
| 2 | 4.0 | 0.53 | 0.54 | 0.56 | 0.55 | 3.83 |
| 3 | 4.0 | 0.56 | 0.57 | 0.56 | 0.57 | 5.10 |
| 4 | 4.0 | 0.57 | 0.53 | 0.56 | 0.56 | 5.22 |
| 5 | 4.0 | 0.57 | 0.58 | 0.58 | 0.58 | 5.07 |
| 6 | 4.0 | 0.58 | 0.58 | 0.59 | 0.58 | 4.53 |
| 7 | 5.0 | 0.51 | 0.55 | 0.54 | 0.54 | 4.74 |
| 8 | 5.0 | 0.56 | 0.61 | 0.60 | 0.59 | 4.75 |
| 9 | 5.0 | 0.53 | 0.55 | 0.58 | 0.56 | 5.11 |
| 10 | 5.0 | 0.55 | 0.55 | 0.54 | 0.55 | 5.40 |
| 11 | 5.0 | 0.57 | 0.59 | 0.57 | 0.58 | 4.45 |
| 12 | 5.0 | 0.51 | 0.54 | 0.57 | 0.54 | 5.45 |

Table 1 indicates that the arithmetic mean roughness Ra (the mean) in each sample D is in a range of 0.5 to 0.6 μm and the crack depth $D_1$ is 5.5 μm or less.

The crack depth D1 indicated in Table 1 is the value of the largest crack found in an observation target region of the first end face. In practice, there may be cracks having a larger crack depth $D_1$ in (an unobserved region of) the first end face.

The obtained result may be regarded as the mean of the crack depth $D_1$ obtained under a condition where the number of samples was 12 and the standard deviation was 0.47 μm observed in the region with 36 mm in the longitudinal direction and 1.3 mm in the thickness direction of the first end face.

There is experimental data indicating that the crack depth is approximately 7 μm or more regardless of the composition of the glass in a case of grinding the end face of the glass by a conventional method, for example, with a #1000 diamond grindstone or a coarse diamond grindstone higher than the #1000 diamond grindstone.

Hence, this result obtained indicates that the crack depth is significantly controlled against in the cracks present in the first end face, compared with the cracks in the end face polished by the conventional diamond grindstone.

Note that the crack depth of the end face described in FIG. 12 of Patent Document 1 mentioned above is approximately 10 times the crack depth measured in the sample D in this case. Accordingly, in Patent Document 1, the crack depth in the direction perpendicular to the end face seems to be deeper than the penetration depth of alkali metal ions in the direction perpendicular to the end face.

As described above, the result indicates that the surface roughness of the first end face of the sample D was significantly small, and the crack depth in the direction perpendicular to the first end face of the sample D was shallower than the penetration depth of the alkali metal ions.

This result may be consistent with the result of the strength evaluation on the sample A described above. Further, the surface roughness of the first end face was measured by applying a chemical strengthening treatment after laser irradiation, and separating the sample D. Hence, the end face may be considered as being smooth and having an excellent appearance quality despite the end face being not polished or the like.

Another Example 2

Three types of samples E, F and G were produced by the method as illustrated in the above-mentioned (Production Method of Sample A).

Note that the sample E was produced from a glass substrate (glass material) having a thickness t of 0.5 mm, and the sample F was produced from a glass substrate (glass material) having a thickness t of 0.85 mm. In contrast, the sample G was produced from a glass substrate (glass material) having a thickness t of 1.3 mm. That is, the sample G was produced by the same method as sample A.

As described above, these samples E to G were subjected to a step of applying a chemical strengthening treatment on a glass material in the course of production; however, in any of the samples, no separation of the sample from the glass material was observed immediately after the chemical strengthening treatment.

For each of samples E to G, the potassium ion concentration at the above-mentioned "first end face" was analyzed using the EPMA method (Electron Probe Micro Analyzer).

The analysis was conducted at the following three points on the first end face:

Any position corresponding to the first main surface of the glass material, that is, any position corresponding to one side of the 60 mm length (referred to as "measurement region 1");

Any position moved from the position corresponding to the first main surface of the glass material by ¼ of the thickness along the thickness direction of the sample (the direction toward the second main surface of the glass material) ("measurement region 2"); and Any one position (referred to as "measurement region 3") moved from the position corresponding to the first main surface of the glass material by ½ of the thickness along the thickness direction of the sample.

Table 2 below represents the analyzed results of potassium concentration obtained in each of the measurement regions of samples E to G.

TABLE 2

| SAMPLE | THICKNESS (mm) | Cs MEASUREMENT REGION 1 | Cs MEASUREMENT REGION 2 | Cs MEASUREMENT REGION 3 | PENETRATION DEPTH OF POTASSIUM IONS (μm) | Cs RATIO |
|---|---|---|---|---|---|---|
| E | 0.5 | 0.205 | 0.178 | 0.161 | 30 | 2.2 |
| F | 0.85 | 0.205 | 0.165 | 0.165 | 30 | 2.2 |
| G | 1.3 | 0.205 | 0.204 | 0.132 | 30 | 1.8 |

The potassium ion concentration is indicated by the concentration (atomic ratio) of potassium ion normalized by silicon ions, that is, Cs. To be accurate, the potassium ion concentration is maximized in the vicinity of the surface at a position slightly toward the depth direction orthogonal to the surface of each of the measurement regions (the width direction of the sample) of the corresponding measurement region. Hence, the Cs value at the position where the analysis value of K (potassium ion) is the maximum, which is in the vicinity of the surface for each measurement region, is applied as Cs in the corresponding measurement region.

Note that the value of Cs obtained by the EPMA method may be different from the result of the aforementioned EDX method. Note that there is no effect in the evaluation of the profile.

Table 2 also indicates the penetration depth values of potassium ions in the respective measurement regions. This penetration depth represents the penetration depth along the depth direction (the width direction of the sample) such that there is no change in potassium ion concentration depth from the first end face.

Furthermore, Table 2 indicates the ratio of Cs in each measurement region to the bulk Cs (hereinafter referred to as "Cs ratio") calculated in the measurement region 3.

The results in Table 2 indicate that in samples E to G, potassium ions are introduced to the entire first end face and the concentration of potassium ions represents a profile of concentration increased from the central portion of the thickness toward the first main surface. Furthermore, the results indicate that the potassium ion concentration at the first end face was 1.8 times greater than the potassium ion concentration (bulk concentration) originally contained in the sample.

The present disclosures non-exhaustively include the subject matter set out in the following clauses:

Clause 1. A glass plate production method comprising:

(1) preparing a glass material having a first main surface and a second main surface opposite to each other, the glass material having end faces connecting the first main surface and the second main surface;

(2) forming a splitting line composed of a laser modified region on the first main surface by irradiating the first main surface of the glass material with a laser; and (3) chemically strengthening the glass material having the splitting line formed therein, wherein in the step (2), the splitting line is composed of one product line or two or more product lines, and one release line or two or more release lines, the product line corresponding to an outline of a glass article separated from the glass material, the release line corresponding to a portion of the splitting line other than a portion corresponding to the product line, and the splitting line extends in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material.

Clause 2. The glass plate production method according to Clause 1, wherein the laser modified region has surface voids on the first main surface, and at least one release line is formed so as to have a missing part having no surface void within an entire length range on the first main surface.

Clause 3. The glass plate production method according to Clause 1, wherein at least one release line is formed so as not to penetrate to the second main surface.

Clause 4. The glass plate production method according to Clause 1, further comprising:

separating one glass article or two or more glass articles from the glass material after the step (3).

Clause 5. A glass plate production method comprising:

(1) preparing a glass material having a first main surface and a second main surface opposite to each other, the glass material having end faces connecting the first main surface and the second main surface;

(2) forming a product line composed of a laser modified region on the first main surface by irradiating the first main surface of the glass material with a laser;

(3) forming a release line on the first main surface or the second main surface of the glass material before the step (2) or after the step (2); and (4) chemically strengthening the glass material having the product line and the release line, wherein in the step (2), the product line corresponds to an outline of a glass article separated from the glass material, the release line corresponds to a portion of the splitting line other than a portion corresponding to the product line, the product line extends in a depth direction from the first main surface toward the second main surface, and the release line extends in a depth direction from the first main surface to the second main surface or from the second main surface to the first main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, and the continuous line segments do not traverse from the first connection line to another connection line on the first main surface of the glass material.

Clause 6. The glass plate production method according to Clause 5, further comprising:

separating one glass article or two or more glass articles from the glass material after the step (4).

Clause 7. The glass plate production method according to Clause 1, wherein the release line has a curved portion or is composed substantially of a straight line.

Clause 8. The glass plate production method according to Clause 1, wherein the outlines of two adjacent glass articles do not overlap each other, and at least one release line is present between the outlines of the two adjacent glass articles.

Clause 9. The glass plate production method according to Clause 1, wherein the outlines of two adjacent glass articles partially overlap each other.

Clause 10. A glass plate comprising:

a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, the continuous line segments do not traverse from the first connection line to another connection line on the first main surface of the glass plate, and a cut surface of a glass article obtained by cutting the glass plate along the product line has a compression stress layer formed by chemical strengthening treatment.

Clause 11. A glass plate comprising:

a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, the continuous line segments do not traverse from the first connection line to another connection line on the first main surface of the glass plate, a cut surface of a glass article obtained by cutting the glass plate along the product line has a concentration profile of predetermined alkali metal ions from the first main surface to the second main surface indicating concentration of the predetermined alkali metal ions being higher than bulk concentration of the glass plate, and the predetermined alkali metal ions provide a compression stress layer to the first main surface and the second main surface to increase strength of the first main surface and the second main surface.

Clause 12. A glass plate comprising:

a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, the continuous line segments do not traverse from the first connection line to another connection line on the first main surface of the glass plate, a cut surface of a glass article obtained by cutting the glass plate along the product line has a concentration profile of predetermined alkali metal ions from the first main surface to the second main surface indicating concentration of the predetermined alkali metal ions becoming higher toward the first main surface and the second main surface of the glass plate, compared with a central portion in a thickness of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

Clause 13. A glass plate comprising:

a first main surface and a second main surface opposite to each other; and an end surface connecting the first main surface and the second main surface, wherein the first main surface includes a plurality of splitting lines, the splitting lines each include one product line or two or more product lines, and one release line or two or more release lines, the product line corresponding to an outline of a glass article separated from the glass plate, the release line corresponding to a portion of the splitting line other than a portion corresponding to the product line, and the splitting lines each extend in a depth direction from the first main surface toward the second main surface, wherein when a boundary between the first main surface and the end surface and a boundary between the second main surface and the end surface are each referred to as a connection line, and (I) when none of the release lines are connected to the connection line on the first main surface, or (II) when a first end portion of a first release line is connected to a first connection line on the first main surface, and (i) the first release line has a second end portion connected to the product line such that further extension of the first release line is prevented by the product line, or (ii) the second end portion of the first release line is connected to the product line in a configuration other than (i), the first release line, one product line or two or more product lines, and one second release line or two or more second release lines form continuous line segments along an extendable direction of the first release line as a whole, the continuous line segments do not traverse from the first connection line to another connection line on the first main surface of the glass plate, a cut surface of a glass article obtained by cutting the glass plate along the product line has a substantially parabolic concentration profile of predetermined alkali metal ions from the first main surface to the second main surface indicating concentration of the predetermined alkali metal ions becoming higher toward the first main surface and the second main surface of the glass plate, the predetermined alkali metal ions provide a compression stress layer to the first main surface and the second main surface to increase strength of the first main surface and the second main surface, and the concentration profile of the cut surface indicates concentration of the alkali metal ions being higher than bulk concentration of the glass plate.

Clause 14. The glass plate according to according to Clause 10, wherein the release line has a curved portion or is composed substantially of a straight line.

Clause 15. The glass plate according to Clause 10, wherein the product line is composed of a laser modified region.

Clause 16. The glass plate according to Clause 15, wherein the laser modified region has surface voids on the first main surface, and the laser modified region further has voids along a depth direction from the first main surface.

Clause 17. The glass plate according to Clause 10, wherein at least one release line is composed of a laser modified region.

Clause 18. The glass plate according to Clause 17, wherein the release line composed of the laser modified region has a missing part where no surface void is present within an entire length range on the first main surface.

Clause 19. The glass plate according to Clause 10, wherein the release line is composed of a laser modified region.

Clause 20. The glass plate according to Clause 10, wherein at least one release line is formed so as not to penetrate to the second main surface.

Clause 21. The glass plate according to Clause 10, wherein the outlines of two adjacent glass articles do not overlap each other, and at least one release line is present between the outlines of the two adjacent glass articles.

Clause 22. The glass plate according to Clause 10, wherein the outlines of two adjacent glass articles partially overlap each other.

REFERENCE SIGNS LIST 110 glass material
112 first main surface
114 second main surface
116 end face
130, 131, 132 in-plane void region
138 surface void
138A, 138B surface void row
150 internal void row
158 void
160, 161, 162 glass piece
170 virtual end face
175 glass plate
180 glass article
186 end face
200 apparatus
210 base
220 roller
250 apparatus
260 sheet member
270 support member
380 first glass article
382 first main surface
384 second main surface
386 (386-1 to 386-4) end face
415 first glass plate
417 first main surface
419 second main surface
420 (420-1 to 420-4) end face
431 in-plane void region
461 glass piece
800 glass substrate
802 first main surface
831, 832 in-plane void region
880 sample
900 flat bending test apparatus
910 sample
912 first main surface
914 second main surface
918 second end face
920 fulcrum member
930 load member
950 longitudinal bending test apparatus
916 first end face
918 second end face
970 fulcrum member
980 load member
1070 connection line
1080 splitting line
1082 release line
1084 product line
1100 eleventh glass plate
1112 first main surface
1114 second main surface
1116 first end face
1117 second end face
1118 third end face
1119 fourth end face
1120 x direction splitting line
1121 laser modified region
1125 y direction splitting line
1130 product line in X direction
1132 X direction release line
1132a first X direction release line
1132b first X direction release line
1135 product line in Y direction
1137 Y direction release line
1137a first Y direction release line
1137b first Y direction release line
1139 surface void 1139d missing part
1146 first connection line
1147 second connection line
1148 third connection line
1149 fourth connection line
1160 glass article
1200 second glass plate
1212 first main surface
1214 second main surface
1216 first end face
1217 second end face
1218 third end face
1219 fourth end face
220 splitting line
1220-1 to 1220-3 splitting line
1230 product line
1230-1 to 1230-3 product line
1232 X direction release line
1232a first X direction release line
1232b second X direction release line
1232-1 to 1232-3 X direction release line
1237 Y direction release line
1237a first Y direction release line
1237b second Y direction release line
1237-1 to 1237-3 Y direction release line
1246 first connection line
1247 second connection line
1248 third connection line
1249 fourth connection line
1260 glass article
1300 third glass plate
1312 first main surface
1314 second main surface
1316 first end face
1317 second end face
1318 third end face
1319 fourth end face
1320 x direction splitting line
1325 y direction splitting line
1330 product line in X direction
1332a first X direction release line
1332b second X direction release line
1335 product line in Y direction
1337a first Y direction release line
1337b second Y direction release line
1346 first connection line
1347 second connection line
1348 third connection line
1349 fourth connection line
1360 glass article
1910 glass material
1912 first main surface
1914 second main surface
1916 first end face
1917 second end face
1918 third end face
1919 fourth end face
1920 splitting line in X direction
1921 laser modified region
1925 splitting line in Y direction
1930 product line in X direction
1932 X direction release line
1935 product line in Y direction
1937 Y direction release line
1939 surface void
1946 first connection line
1947 second connection line
1948 third connection line
1949 fourth connection line
1950 internal modified row
1958 void

What is claimed is:

1. A glass plate production method comprising:
irradiating a glass material which has a first main surface and a second main surface opposite to each other, with a laser to form an in-plane void region having a plurality of surface voids arranged on the first main surface and a plurality of internal void rows each having at least one internal void apart from a surface void arranged from the in-plane void region toward the second main surface of the glass material; and
chemically strengthening the glass material having the plurality of internal void rows formed therein by penetrating alkali metal ions to the glass material,
wherein the plurality of internal void rows are different from through holes formed so as to penetrate the glass material in a thickness direction of the glass material, and
the surface void and the at least one internal void in the internal void row are not continuous or connected to each other except via optional microcracks.

2. The glass plate production method according to claim 1,
wherein in the in-plane void region, an interval between adjacent voids falls within a range of 3 to 10 μm.

3. The glass plate production method according to claim 1,
wherein in the irradiating,
after the in-plane void region is formed by a first-pass laser irradiation, at least one laser irradiation is additionally repeated along the in-plane void region to form the plurality of internal void rows from the first main surface toward the second main surface of the glass material.

4. The glass plate production method according to claim 1,
wherein the irradiating further comprises
forming, after forming the in-plane void region, a groove along the in-plane void region in at least one of the first main surface and the second main surface; or
forming, before forming the in-plane void region, a groove along the in-plane void region in at least one of the first main surface and the second main surface along the in-plane void region formed thereafter.

5. A glass article production method comprising:
producing a glass plate by the glass plate production method according to claim 1, the glass plate having a third main surface corresponding to the first main surface of the glass material and a fourth main surface corresponding to the second main surface of the glass material; and
separating one glass article, or two or more glass articles from the glass plate along the in-plane void region and the plurality of internal void rows.

6. The glass article production method according to claim 5,
wherein in the separating,
the one glass article or two or more glass articles are obtained by one or more processes selected from the group consisting of a) applying a pressing force along the in-plane void region to the glass plate, b) deforming the glass plate to convexly curve the third main surface or the fourth main surface, and c) applying a tensile stress to the glass plate due to thermal stress along the in-plane void region.

7. The glass plate production method according to claim 1, wherein each of the plurality of the voids has a diameter of 1 to 5 μm.

8. The glass plate production method according to claim 1, wherein the irradiating further comprises forming a plurality of surface voids on the second main surface such that each of the internal void rows has one surface void on the first main surface, at least one internal void and one surface void on the second main surface.

* * * * *